US010917158B2

(12) United States Patent
Islam et al.

(10) Patent No.: US 10,917,158 B2
(45) Date of Patent: Feb. 9, 2021

(54) SYSTEM AND METHOD FOR BEAM SWITCHING AND REPORTING

(71) Applicant: QUALCOMM Incorporated, San Diego, CA (US)

(72) Inventors: Muhammad Nazmul Islam, Edison, NJ (US); Bilal Sadiq, Basking Ridge, NJ (US); Tao Luo, San Diego, CA (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/488,401

(22) Filed: Apr. 14, 2017

(65) Prior Publication Data

US 2017/0346543 A1 Nov. 30, 2017

Related U.S. Application Data

(60) Provisional application No. 62/343,798, filed on May 31, 2016, provisional application No. 62/342,174, filed on May 26, 2016.

(51) Int. Cl.
*H04M 1/00* (2006.01)
*H04B 7/08* (2006.01)
(Continued)

(52) U.S. Cl.
CPC .......... *H04B 7/0814* (2013.01); *H01Q 1/245* (2013.01); *H04B 7/0404* (2013.01);
(Continued)

(58) Field of Classification Search
CPC . H04B 7/0814; H04B 7/0404; H04W 74/085; H04W 74/0858
(Continued)

(56) References Cited

U.S. PATENT DOCUMENTS 4,776,277 A 10/1988 Fiedler et al.
4,893,815 A 1/1990 Rowan
(Continued)

FOREIGN PATENT DOCUMENTS

CN 105556869 A 5/2016
EP 2882110 A1 6/2015
(Continued)

OTHER PUBLICATIONS

International Search Report and Written Opinion—PCT/US2017/027969—ISA/EPO—dated Jul. 19, 2017.
(Continued)

*Primary Examiner* — April G Gonzales

(57) ABSTRACT

A user equipment (UE) may be configured to perform a random access channel (RACH) procedure with a base station. As part of the RACH procedure, the base station may transmit a contention resolution message to the UE. The UE may receive, from the base station, the contention resolution message. The contention resolution message may indicate at least a beam index corresponding to a beam, such as a transmit beam of the base station. The UE may determine whether the beam index is applicable to the UE. The UE may communicate with the base station through the beam corresponding to the beam index when the beam index is applicable to the UE. For example, the UE may send an acknowledgement message to the base station, and the base station and UE may switch to a beam corresponding to the beam index after communication of the acknowledgement message.

29 Claims, 33 Drawing Sheets

(51) Int. Cl.

| | | |
|---|---|---|
| *H04B 7/06* | (2006.01) | |
| *H04W 16/28* | (2009.01) | |
| *H04B 7/0417* | (2017.01) | |
| *H04W 40/24* | (2009.01) | |
| *H04W 28/02* | (2009.01) | |
| *H01Q 1/24* | (2006.01) | |
| *H04B 7/0404* | (2017.01) | |
| *H04B 7/0452* | (2017.01) | |
| *H04W 74/08* | (2009.01) | |

(52) U.S. Cl.
CPC ......... *H04B 7/0417* (2013.01); *H04B 7/0452* (2013.01); *H04B 7/061* (2013.01); *H04B 7/0617* (2013.01); *H04B 7/0623* (2013.01); *H04B 7/0626* (2013.01); *H04B 7/0628* (2013.01); *H04B 7/0634* (2013.01); *H04B 7/0639* (2013.01); *H04B 7/0695* (2013.01); *H04W 16/28* (2013.01); *H04W 28/0231* (2013.01); *H04W 40/248* (2013.01); *H04W 74/0833* (2013.01); *H04W 74/0858* (2013.01)

(58) Field of Classification Search
USPC ...................................................... 455/562.1
See application file for complete search history.

(56) References Cited

U.S. PATENT DOCUMENTS

| | | | |
|---|---|---|---|
| 5,050,501 A | 9/1991 | Barditch et al. | |
| 5,198,612 A | 3/1993 | Myers | |
| 5,813,278 A | 9/1998 | Schabdach et al. | |
| 6,037,899 A | 3/2000 | Weber | |
| 6,766,950 B2 | 7/2004 | Hall | |
| 6,903,676 B1 | 6/2005 | Frady et al. | |
| 6,923,404 B1 | 8/2005 | Liu et al. | |
| 7,146,170 B2* | 12/2006 | Davidson | H01Q 1/246 455/446 |
| 7,310,537 B2* | 12/2007 | Wichman | H04B 7/0408 455/277.1 |
| 7,400,606 B2* | 7/2008 | Padovani | H04W 16/12 370/335 |
| 7,478,595 B1 | 1/2009 | Herr et al. | |
| 7,645,643 B2 | 1/2010 | Hiramoto | |
| 8,055,303 B2* | 11/2011 | Wild | H01Q 1/246 370/329 |
| 8,220,392 B1 | 7/2012 | Maldonado et al. | |
| 8,315,657 B2* | 11/2012 | van Rensburg | H04B 7/024 455/13.1 |
| 8,477,634 B2* | 7/2013 | Yi | H04W 74/002 370/242 |
| 8,515,409 B2 | 8/2013 | Ramo et al. | |
| 8,600,441 B2* | 12/2013 | Xu | H04B 7/022 455/17 |
| 8,750,933 B2* | 6/2014 | Song | H04B 7/0408 455/562.1 |
| 8,885,569 B2 | 11/2014 | Dinan | |
| 8,913,582 B1* | 12/2014 | Zhang | H04W 24/02 370/235 |
| 8,939,056 B1 | 1/2015 | Neal, III et al. | |
| 9,078,268 B2* | 7/2015 | Jung | H04W 72/08 |
| 9,203,497 B2* | 12/2015 | Kim | H04B 7/0469 |
| 9,234,728 B2 | 1/2016 | Akcasu et al. | |
| 9,306,646 B2* | 4/2016 | Park | H04B 7/0456 |
| 9,456,359 B2* | 9/2016 | Kim | H04L 5/0057 |
| 9,473,269 B2* | 10/2016 | Walton | H04B 7/2643 |
| 9,500,454 B1 | 11/2016 | Decker et al. | |
| 9,527,596 B1 | 12/2016 | Adams | |
| 9,698,884 B2* | 7/2017 | Guey | H04W 74/0833 |
| 9,705,581 B2* | 7/2017 | Guey | H04L 27/2607 |
| 9,738,383 B2 | 8/2017 | Adams | |
| 9,823,070 B2 | 11/2017 | Stephens, Jr. | |
| 10,027,397 B2 | 7/2018 | Kim | |
| 2003/0228865 A1 | 12/2003 | Terry | |
| 2004/0204111 A1* | 10/2004 | Ylitalo | H04W 16/28 455/562.1 |
| 2005/0051667 A1 | 3/2005 | Arlton et al. | |
| 2005/0096090 A1* | 5/2005 | Nagaraj | H01Q 1/246 455/562.1 |
| 2005/0136980 A1* | 6/2005 | Kim | H01Q 1/246 455/562.1 |
| 2006/0030364 A1* | 2/2006 | Olesen | H04B 7/0617 455/562.1 |
| 2007/0009859 A1 | 1/2007 | Preston et al. | |
| 2007/0099578 A1* | 5/2007 | Adeney | H04B 7/10 455/69 |
| 2008/0130764 A1* | 6/2008 | Xia | H04B 7/0695 375/259 |
| 2008/0170523 A1* | 7/2008 | Han | H04B 7/0413 370/310 |
| 2008/0276821 A1 | 11/2008 | Stancil | |
| 2008/0300055 A1 | 12/2008 | Lutnick et al. | |
| 2009/0023401 A1 | 1/2009 | Grandhi et al. | |
| 2009/0053678 A1 | 2/2009 | Falkenhayn et al. | |
| 2009/0196203 A1 | 8/2009 | Taira et al. | |
| 2009/0217836 A1 | 9/2009 | Dietrich et al. | |
| 2010/0054200 A1* | 3/2010 | Tsai | H04B 7/0408 370/329 |
| 2010/0093270 A1 | 4/2010 | Bass | |
| 2010/0147177 A1 | 6/2010 | Van Stratum | |
| 2010/0232311 A1 | 9/2010 | Zhang et al. | |
| 2011/0174922 A1 | 7/2011 | Berman et al. | |
| 2011/0305161 A1* | 12/2011 | Ekpenyong | H04L 1/0031 370/252 |
| 2012/0211589 A1 | 8/2012 | Uzman | |
| 2012/0286951 A1 | 11/2012 | Hess et al. | |
| 2013/0039345 A1 | 2/2013 | Kim et al. | |
| 2013/0040682 A1* | 2/2013 | Chang | H01Q 1/243 342/368 |
| 2013/0072243 A1 | 3/2013 | Yu et al. | |
| 2013/0083774 A1 | 4/2013 | Son et al. | |
| 2013/0121185 A1 | 5/2013 | Li et al. | |
| 2013/0155847 A1* | 6/2013 | Li | H04W 24/04 370/225 |
| 2013/0223251 A1 | 8/2013 | Li et al. | |
| 2013/0229307 A1* | 9/2013 | Chang | H01Q 1/246 342/372 |
| 2013/0265866 A1* | 10/2013 | Yi | H04W 74/0841 370/216 |
| 2013/0286960 A1* | 10/2013 | Li | H04W 72/042 370/329 |
| 2013/0301454 A1* | 11/2013 | Seol | H04B 7/088 370/252 |
| 2013/0301567 A1 | 11/2013 | Jeong et al. | |
| 2014/0010178 A1* | 1/2014 | Yu | H04W 74/0833 370/329 |
| 2014/0120926 A1 | 5/2014 | Shin et al. | |
| 2014/0163664 A1 | 6/2014 | Goldsmith | |
| 2014/0177607 A1* | 6/2014 | Li | H04B 7/0695 370/336 |
| 2014/0192917 A1* | 7/2014 | Nam | H04L 1/0026 375/267 |
| 2014/0233516 A1* | 8/2014 | Chun | H04W 24/08 370/329 |
| 2014/0254515 A1* | 9/2014 | Kim | H04W 74/0833 370/329 |
| 2014/0284422 A1 | 9/2014 | Sapir | |
| 2014/0323143 A1* | 10/2014 | Jung | H04B 7/0617 455/452.1 |
| 2014/0328266 A1* | 11/2014 | Yu | H04L 5/0053 370/329 |
| 2014/0341048 A1* | 11/2014 | Sajadieh | H04L 25/03305 370/252 |
| 2014/0341310 A1 | 11/2014 | Rahman et al. | |
| 2014/0376466 A1* | 12/2014 | Jeong | H04W 74/0833 370/329 |
| 2015/0009951 A1* | 1/2015 | Josiam | H04L 25/0224 370/330 |
| 2015/0043673 A1 | 2/2015 | Lee et al. | |
| 2015/0049824 A1* | 2/2015 | Kim | H04B 7/0456 375/267 |

(56) References Cited

U.S. PATENT DOCUMENTS

| | | | |
|---|---|---|---|
| 2015/0063488 A1* | 3/2015 | Dinan | H04B 7/0456 375/267 |
| 2015/0124738 A1* | 5/2015 | Ramakrishna | H04L 5/0048 370/329 |
| 2015/0128823 A1 | 5/2015 | Akcasu et al. | |
| 2015/0208443 A1* | 7/2015 | Jung | H04W 72/04 370/329 |
| 2015/0230263 A1* | 8/2015 | Roy | H04W 16/28 455/452.2 |
| 2015/0236774 A1* | 8/2015 | Son | H04B 7/0628 375/267 |
| 2015/0289147 A1* | 10/2015 | Lou | H04B 7/0413 370/329 |
| 2016/0011318 A1 | 1/2016 | Cohen | |
| 2016/0080064 A1* | 3/2016 | Kim | H04B 7/0456 370/281 |
| 2016/0091285 A1 | 3/2016 | Mason | |
| 2016/0134352 A1* | 5/2016 | Stirling-Gallacher | H04L 1/00 370/329 |
| 2016/0142189 A1* | 5/2016 | Shin | H04B 7/0626 370/329 |
| 2016/0150435 A1* | 5/2016 | Baek | H04B 7/0608 370/252 |
| 2016/0183234 A1* | 6/2016 | Sung | H04W 72/046 370/329 |
| 2016/0190707 A1* | 6/2016 | Park | H01Q 1/246 370/334 |
| 2016/0191137 A1* | 6/2016 | Song | H04B 7/0632 370/329 |
| 2016/0192401 A1* | 6/2016 | Park | H04W 74/0833 370/329 |
| 2016/0236638 A1 | 8/2016 | Lavie et al. | |
| 2016/0277091 A1* | 9/2016 | Kim | H04B 7/0478 |
| 2016/0338033 A1 | 11/2016 | Xiao et al. | |
| 2017/0069214 A1 | 3/2017 | Dupray et al. | |
| 2017/0086195 A1 | 3/2017 | Yum et al. | |
| 2017/0111886 A1 | 4/2017 | Kim et al. | |
| 2017/0146324 A1 | 5/2017 | McFadyen | |
| 2017/0195998 A1* | 7/2017 | Zhang | H04B 7/086 |
| 2017/0202029 A1 | 7/2017 | Qi et al. | |
| 2017/0215117 A1 | 7/2017 | Kwon et al. | |
| 2017/0302355 A1 | 10/2017 | Islam et al. | |
| 2017/0302414 A1 | 10/2017 | Islam et al. | |
| 2017/0324459 A1 | 11/2017 | Koskela et al. | |
| 2017/0331577 A1* | 11/2017 | Parkvall | H04L 5/0053 |
| 2017/0346534 A1 | 11/2017 | Islam et al. | |
| 2017/0346535 A1 | 11/2017 | Islam et al. | |
| 2017/0346539 A1 | 11/2017 | Islam et al. | |
| 2017/0346544 A1 | 11/2017 | Islam et al. | |
| 2017/0346545 A1 | 11/2017 | Islam et al. | |
| 2018/0027522 A1 | 1/2018 | Lee et al. | |
| 2018/0097547 A1 | 4/2018 | Turtinen et al. | |
| 2018/0132217 A1 | 5/2018 | Stirling-Gallacher | |
| 2018/0183507 A1 | 6/2018 | Franz et al. | |
| 2018/0198499 A1 | 7/2018 | Park et al. | |
| 2018/0206132 A1 | 7/2018 | Guo et al. | |
| 2018/0219603 A1 | 8/2018 | Park et al. | |
| 2018/0279218 A1 | 9/2018 | Park et al. | |
| 2018/0279239 A1 | 9/2018 | Si et al. | |
| 2018/0279297 A1 | 9/2018 | Nogami et al. | |
| 2018/0351624 A1 | 12/2018 | Hakola et al. | |
| 2019/0115967 A1 | 4/2019 | Islam et al. | |

FOREIGN PATENT DOCUMENTS

| | | |
|---|---|---|
| EP | 2887558 A1 | 6/2015 |
| JP | 2014524705 A | 9/2014 |
| JP | 2015530018 A | 10/2015 |
| KR | 20150101750 A | 9/2015 |
| WO | 2015109153 A1 | 7/2015 |
| WO | 2015141072 A1 | 9/2015 |
| WO | 2016044991 A1 | 3/2016 |
| WO | 2016044994 A1 | 3/2016 |
| WO | 2016115711 A1 | 7/2016 |
| WO | 2016179804 A1 | 11/2016 |

OTHER PUBLICATIONS

Gupta H., et al., "Beam Steerable Antenna Design for Directional MAC Layer for Next Generation Networks" International Journal of Electronics and Communication Technology, IJECT, vol. 2, Issue. 4, Oct.-Dec. 2011, pp. 185-188.

Jeong C., et al., "Random Access in Millimeter-Wave Beamforming Cellular Networks: Issues and Approaches", Millimeter-Wave Communications for 5G IEEE Communications Magazine, Jan. 2015, pp. 180-185.

Huawei et al., "UL SRS Design for CSI Acquisition and Beam Management", 3GPP TSG RAN WG1 Meeting #88bis, 3GPP Draft; R1-1704241, Spokane, USA Apr. 3-7, 2017, 16 Pages.

ZTE et al., "Beam Management for DL Control Channel", 3GPP TSG RAN WG1 NR Ad-Hoc Meeting, 3GPP Draft; R1-1700131, Spokane, USA, Jan. 16-20, 2017, pp. 1-6.

"3rd Generation Partnership Project, Technical Specification Group, Radio Access Network, Evolved Universal Terrestrial Radio Access (E-UTRA), Physical layer procedures (Release 13)", 3GPP Standard, 3gpp TS 36.213, 3rd Generation Partnership Project (3gpp), Mobile Competence Centre, 650, Route Des Lucioles, F-96921, Sophia-Antipolis, Cedex, France, vol. RAN WG1, No. V13.0.0, Jan. 5, 2016, XP051047450, pp. 7-224.

* cited by examiner

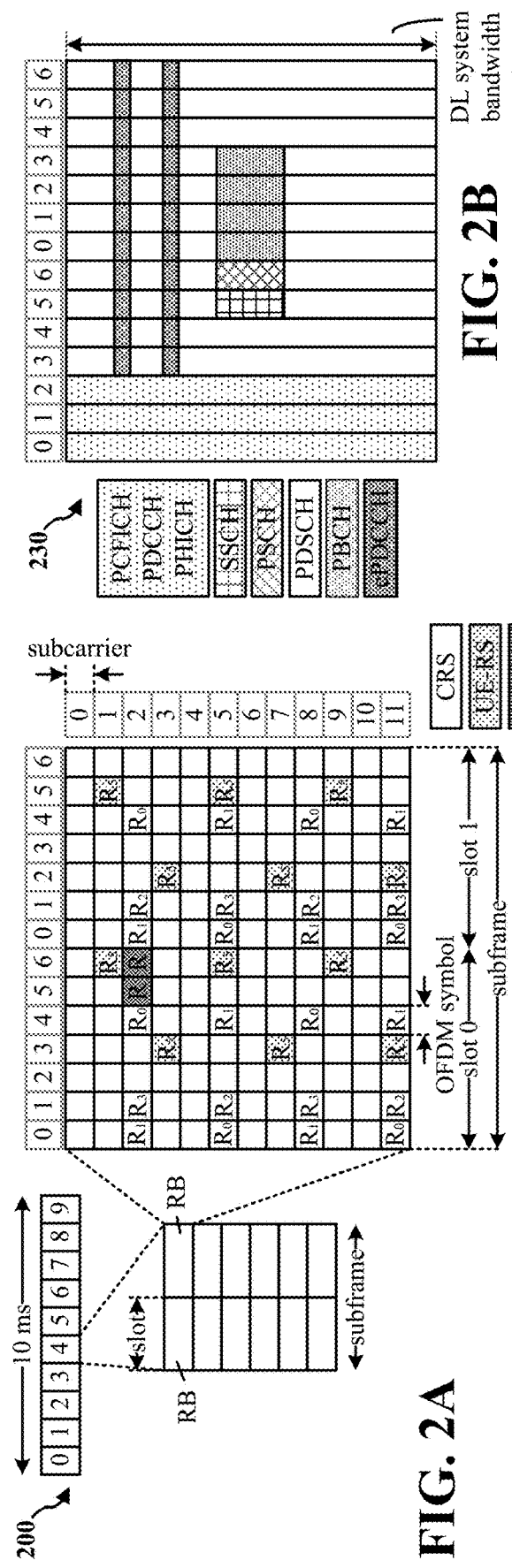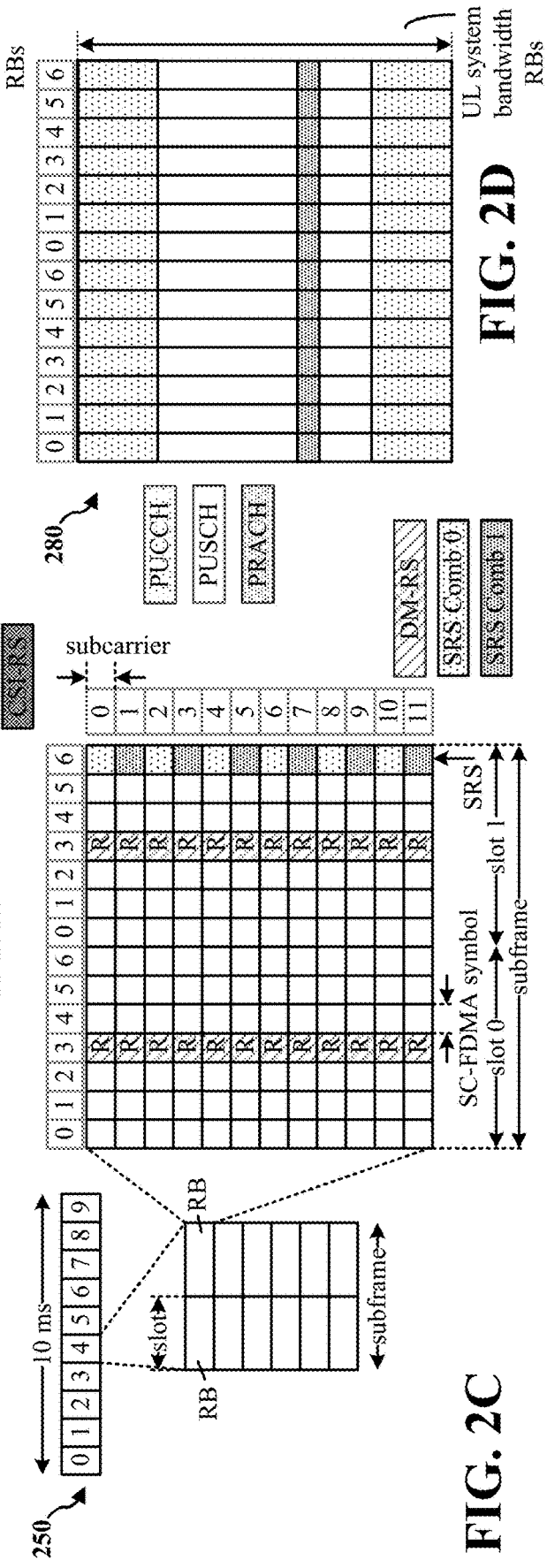

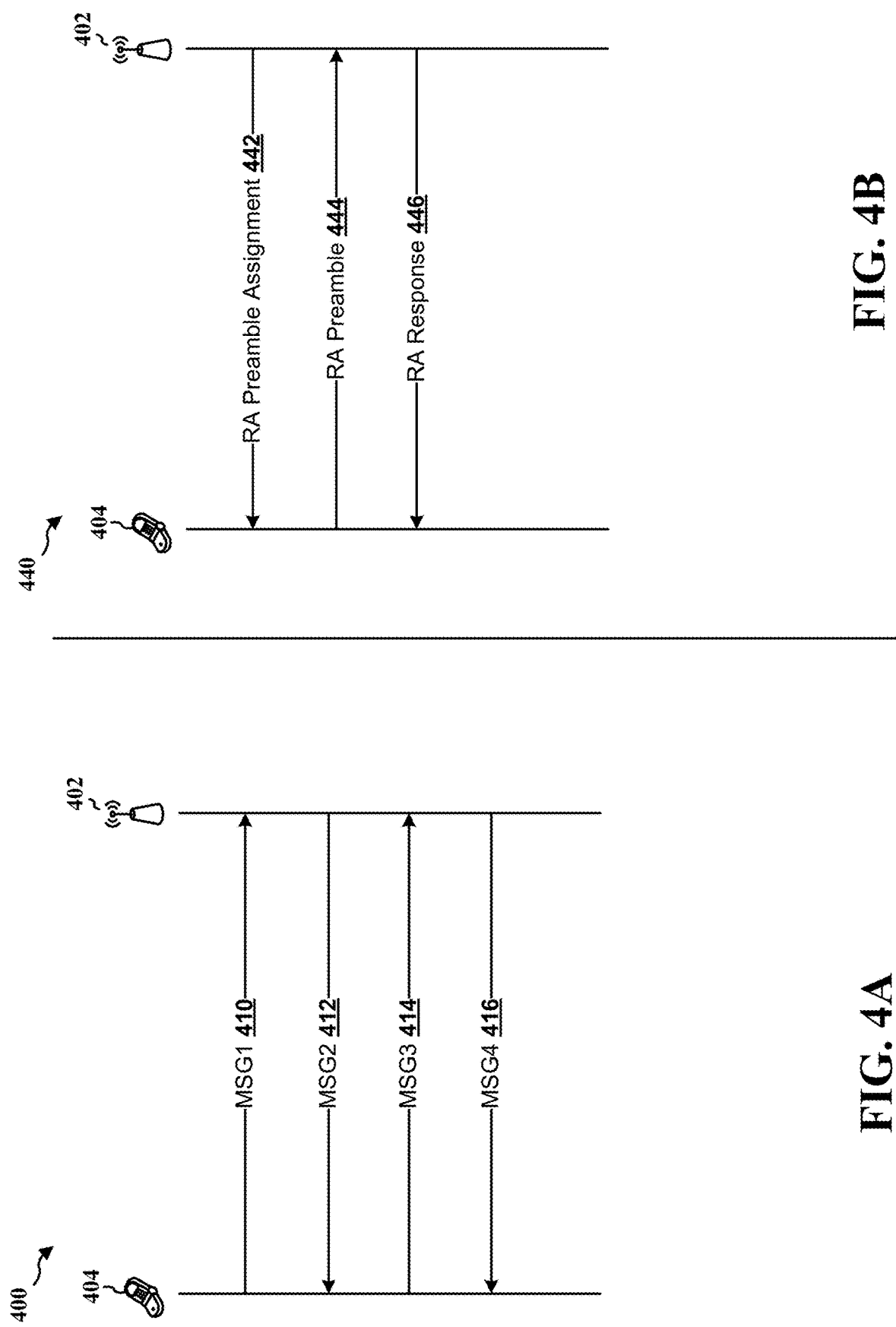

SYSTEM AND METHOD FOR BEAM SWITCHING AND REPORTING

CROSS-REFERENCE TO RELATED APPLICATION(S)

This application claims the benefit of U.S. Provisional Application Ser. No. 62/342,174, entitled "BEAM MODIFICATION/SWITCHING PROCEDURES, BEAM STATE INFORMATION REPORTING PROCEDURES, AND BEAM STATE INFORMATION REPORTING DURING RANDOM ACCESS" and filed on May 26, 2016, and U.S. Provisional Application Ser. No. 62/343,798, entitled "BEAM MODIFICATION/SWITCHING PROCEDURES, BEAM STATE INFORMATION REPORTING PROCEDURES, AND BEAM STATE INFORMATION REPORTING DURING RANDOM ACCESS" and filed on May 31, 2016. The disclosures of the aforementioned provisional applications are expressly incorporated by reference herein in their entireties.

BACKGROUND

Field

The present disclosure relates generally to communication systems, and more particularly, to a user equipment and a base station that may communicate through one of more beams.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

An example of an improvement to LTE may include fifth generation wireless systems and mobile networks (5G). 5G is a telecommunications standard that may extend beyond LTE and/or 4G standards. For example, 5G may offer higher capacity and, therefore, serve a larger number of users in an area. Further, 5G may improve data consumption and data rates.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Path loss may be relatively high in millimeter wave (mmW) systems. Transmission may be directional to mitigate path loss. A base station may transmit one or more beam reference signals by sweeping in all directions so that a user equipment (UE) may identify a best "coarse" beam. Further, the base station may transmit a beam refinement request signal so that the UE may track "fine" beams. If a "coarse" beam identified by the UE changes, the UE may need to inform the base station so that the base station may train one or more new "fine" beams for the UE.

In a first aspect, a first method, first apparatus, and first computer-readable medium are provided. The first apparatus may receive, from a base station, a contention resolution message, the contention resolution message indicating at least a beam index corresponding to a beam. The first apparatus may determine whether the beam index is applicable to the first apparatus. The first apparatus may communicate with the base station through the beam corresponding to the beam index when the beam index is applicable to the first apparatus. The first apparatus may transmit, to the base station, an acknowledgement message when the beam index is determined to be applicable to the first apparatus. In an aspect, the contention resolution message is associated with a random access procedure. In an aspect, the determination of whether the beam index is applicable to the first apparatus includes attempting to decode the contention resolution message based on a radio network temporary identifier (RNTI) associated with the first apparatus, and the beam index is determined to be applicable to the first apparatus when the contention resolution message is successfully decoded. In an aspect, the first apparatus may refrain from transmitting a non-acknowledgement message to the base station when the beam index is determined to be inapplicable to the first apparatus or if the contention resolution message is unsuccessfully decoded. In an aspect, the contention resolution message further includes an indication of one or more channels associated with the beam index, and the communication with the base station through the beam corresponding to the beam index is performed on the one or more indicated channels. In an aspect, the first apparatus may transmit, to the base station, a random access preamble. The first apparatus may receive, from the base station, a random access response based on the random access preamble. The first apparatus may transmit, to the base station, a connection request message based on the random access response, and the contention resolution message is transmitted based on the connection request message.

In a second aspect, a second method, second apparatus, and second computer-readable medium are provided. The second apparatus may transmit, to a UE, a contention resolution message, and the contention resolution message may indicate at least a beam index corresponding to a beam and indicating that the beam index is applicable to the UE. The second apparatus may determine whether an acknowledgement message is received from the UE in response to the contention resolution message. The second apparatus may communicate with the UE through the beam corresponding to the beam index when the acknowledgement message is determined to be received from the UE. In an aspect, the contention resolution message is associated with a random access procedure. In an aspect, the second apparatus may scrambling at least a portion of the contention resolution message using an RNTI associated the UE. In an aspect, the contention resolution message further includes an indication of one or more channels associated with the beam index, and the communication with the UE through the beam corresponding to the beam index is performed on the one or more indicated channels. In an aspect, the second apparatus may communicate with the UE through a serving beam before transmission of the contention resolution message, and the communication with the UE continues through the serving beam based on an absence of an acknowledgement message from the UE. The second apparatus may receive, from the UE, a random access preamble. In an aspect, the second apparatus may transmit, to the UE, a random access response based on the random access preamble. The second apparatus may receive, from the UE, a connection request message based on the random access response, and the contention resolution message is transmitted based on the connection request message.

In a third aspect, a third method, third apparatus, and third computer-readable medium are provided. The third apparatus may receive, from a base station, a beam modification command indicating at least one beam index for communicating through at least one beam on at least one channel, each beam index of the at least one beam index indicating at least a direction for communicating through a corresponding beam of the at least one beam. The third apparatus may communicate, with the base station, through the at least one beam corresponding to the at least one beam index on the at least one channel. The third apparatus may communicate, with the base station, through a serving beam corresponding to a serving beam index, and switch, after receiving the beam modification command, from the serving beam to the at least one beam corresponding to the at least one beam index indicated by the beam modification command. In an aspect, the switching from the serving beam to the at least one beam is performed at a predetermined time. In an aspect, the predetermined time is associated with at least one of a symbol or subframe, and wherein the beam modification command indicates the at least one of the symbol or the subframe. In an aspect, the beam modification command indicates, for each beam index of the at least one beam index, a corresponding channel of the at least one channel. In an aspect, the at least one beam index comprises a plurality of beam indexes, and the at least one channel comprises a plurality of channels. In an aspect, the at least one beam index is applicable to one of uplink communication or downlink communication. In an aspect, the beam modification command is received in a medium access control (MAC) control element (CE). In an aspect, the beam modification command is received in a downlink control information (DCI) message. In an aspect, the third apparatus may determine the at least one channel based on a DCI format of the DCI message. In an aspect, the beam modification command is received via radio resource control (RRC) signaling.

In a fourth aspect, a fourth method, fourth apparatus, and fourth computer-readable medium are provided. The fourth apparatus may receive a beam modification command that indicates a set of transmit beam indexes corresponding to a set of transmit beams of a base station, and each transmit beam index of the set of transmit beam indexes may indicate at least a transmit direction for transmitting a transmit beam by the base station. The fourth apparatus may determine a set of receive beam indexes corresponding to receive beams of the fourth apparatus based on the set of transmit beam indexes, each receive beam index of the set of receive beam indexes indicating at least a receive direction for receiving a receive beam by the fourth apparatus. The fourth apparatus may receive, from the base station, a beam refinement reference signal (BRRS) through at least one receive beam corresponding to at least one receive beam index included in the set of receive beam indexes. In an aspect, the receiving, from the base station, the BRRS through the at least one receive beam corresponding to the at least one receive beam index included in the set of receive beam indexes includes receiving a first portion of the BRRS in a first set of symbols through a first receive beam corresponding to a first receive beam index included in the set of receive beam indexes, and receiving a second portion of the BRRS in a second set of symbols through a second receive beam corresponding to a second receive beam index included in the set of receive beam indexes. In an aspect, the BRRS is received in one or more symbols corresponding to one or more symbol indexes. In an aspect, the beam modification command indicates the one or more symbol indexes, and a corresponding transmit beam index of the set of transmit beam indexes for each symbol index of the one or more symbol indexes. In an aspect, the one or more symbol indexes in which the BRRS is received are predetermined. In an aspect, the BRRS is received through the set of transmit beams from the base station corresponding to the set of transmit beam indexes. In an aspect, the BRRS is received through a different set of transmit beams from the base station than the set of transmit beams corresponding to the set of transmit beam indexes, the different set of transmit beams corresponding to a second set of transmit beam indexes different from the set of transmit beam indexes. In an aspect, the beam modification command is received in a MAC CE. In an aspect, the beam modification command is received in a DCI message. In an aspect, the beam modification command is received via RRC signaling.

In a fifth aspect, a fifth method, fifth apparatus, and fifth computer-readable medium are provided. The fifth apparatus may receive, from a base station, through a set of beams a set of beam reference signals (BRSs). The fifth apparatus may measure a signal quality of each BRS of the set of BRSs, each measured signal quality corresponding to a beam of the set of beams. In an aspect, the fifth apparatus may maintain a set of candidate beam indexes corresponding to a set of best measured signal qualities of the set of BRSs. In an aspect, the fifth apparatus may transmit, to the base station, beam state information (BSI) indicating at least one measured signal quality and at least one beam index from the set of maintained candidate beam indexes, the at least one beam index corresponding to the at least one measured signal quality. In an aspect, the set of the best measured signal qualities is a set of the highest measured signal qualities. In an aspect, N candidate beam indexes are maintained in the set of candidate beam indexes, N being predetermined. In an aspect, the set of best measured signal qualities of the set of BRSs is based on a most recent set of signal qualities of the set of BRSs, a filtered set of signal qualities of the set of BRSs, or a time-averaged set of signal qualities of the set of BRSs. In an aspect, the maintenance of the set of candidate beam indexes is based on at least one hysteresis criteria for including a beam index in or excluding a beam index from the set of candidate beam indexes. In an aspect, the fifth apparatus may receive, from the base station, an indication of one or more beam indexes that are to be excluded from the maintained set of candidate beam indexes. In an aspect, the signal quality comprises at least one of a beam reference signal received power (BRSRP), a beam reference signal received quality (BRSRQ), a signal-to-interference radio (SIR), a signal-to-interference-plus noise ratio (SINR), or a signal-to-noise ratio (SNR).

In a sixth aspect, a sixth method, sixth apparatus, and sixth computer-readable medium are provided. The sixth apparatus may receive, from a base station, a message requesting BSI. The sixth apparatus may determine a number N of BSI reports to send to the base station, and each BSI report may indicate a beam index corresponding to a beam and a received power associated with the beam. The sixth apparatus may send, to the base station, N BSI reports based on the message requesting BSI. The sixth apparatus may receive, from the base station, a set of signals through a set of beams, and determine the received power for each signal of the set of signals received through each beam of the set of beams, each received power associated with a beam of the set of beams. In an aspect, the N BSI reports include N received powers corresponding to the highest determined received powers. In an aspect, the determination of the number N of BSI reports to send to the base station is based on a type of the message requesting the BSI. In an aspect, the type of the message requesting the BSI comprises a DCI message. In an aspect, the number N of BSI reports to send to the base station is determined to be one based on the DCI message. In an aspect, the determined number N of BSI reports are sent on a physical uplink control channel (PUCCH). In an aspect, the type of message requesting the BSI comprises a random access response (RAR) message. In an aspect, the number N of BSI reports is determined to be greater than one based on the RAR message. In an aspect, the determined number N of BSI reports are sent on a physical uplink shared channel (PUSCH).

In a seventh aspect, a seventh method, seventh apparatus, and seventh computer-readable medium are provided. The seventh apparatus may select a first beam for communication with a base station. The seventh apparatus may attempt, through the selected first beam, at least one random access channel (RACH) procedure with the base station. The seventh apparatus may determine that the at least one RACH procedure failed with the base station. The seventh apparatus may send, after a successful RACH procedure with the base station, information indicating that the at least one RACH procedure failed. In an aspect, the seventh apparatus may select a new beam for communication with the base station after the determination that the at least one RACH procedure failed, and at least a portion of the successful RACH procedure is performed through the selected new beam. In an aspect, the seventh apparatus may increase a transmission power after the determination that the at least one RACH procedure failed, and at least a portion of the successful RACH procedure is performed with the increased transmission power. In an aspect, the seventh apparatus may store information associated with the selected first beam based on the determination that the at least one RACH procedure failed. In an aspect, the information indicating that the at least one RACH procedure failed includes the stored information associated with the first beam. In an aspect, the information indicating that the at least one RACH procedure failed includes an indication of a subframe in which a RACH message associated with the at least one RACH procedure is carried. In an aspect, the seventh apparatus may exclude the selected first beam from a candidate beam set maintained by the UE based on the determination that the at least one RACH procedure failed. In an aspect, the information indicating that the at least one RACH procedure failed comprises a BSI report. In an aspect, the at least one RACH procedure includes at least one of transmitting, to the base station, a random access preamble, receiving, from the base station, a random access response based on the random access preamble, transmitting, to the base station, a connection request message based on the random access response, and/or receive a contention resolution message based on the connection request message. In an aspect, the seventh apparatus is synchronized with a network that includes the base station based on the successful RACH procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

FIGS. 4A and 4B are call flow diagrams of a wireless communications system.

DETAILED DESCRIPTION

Figure 1:
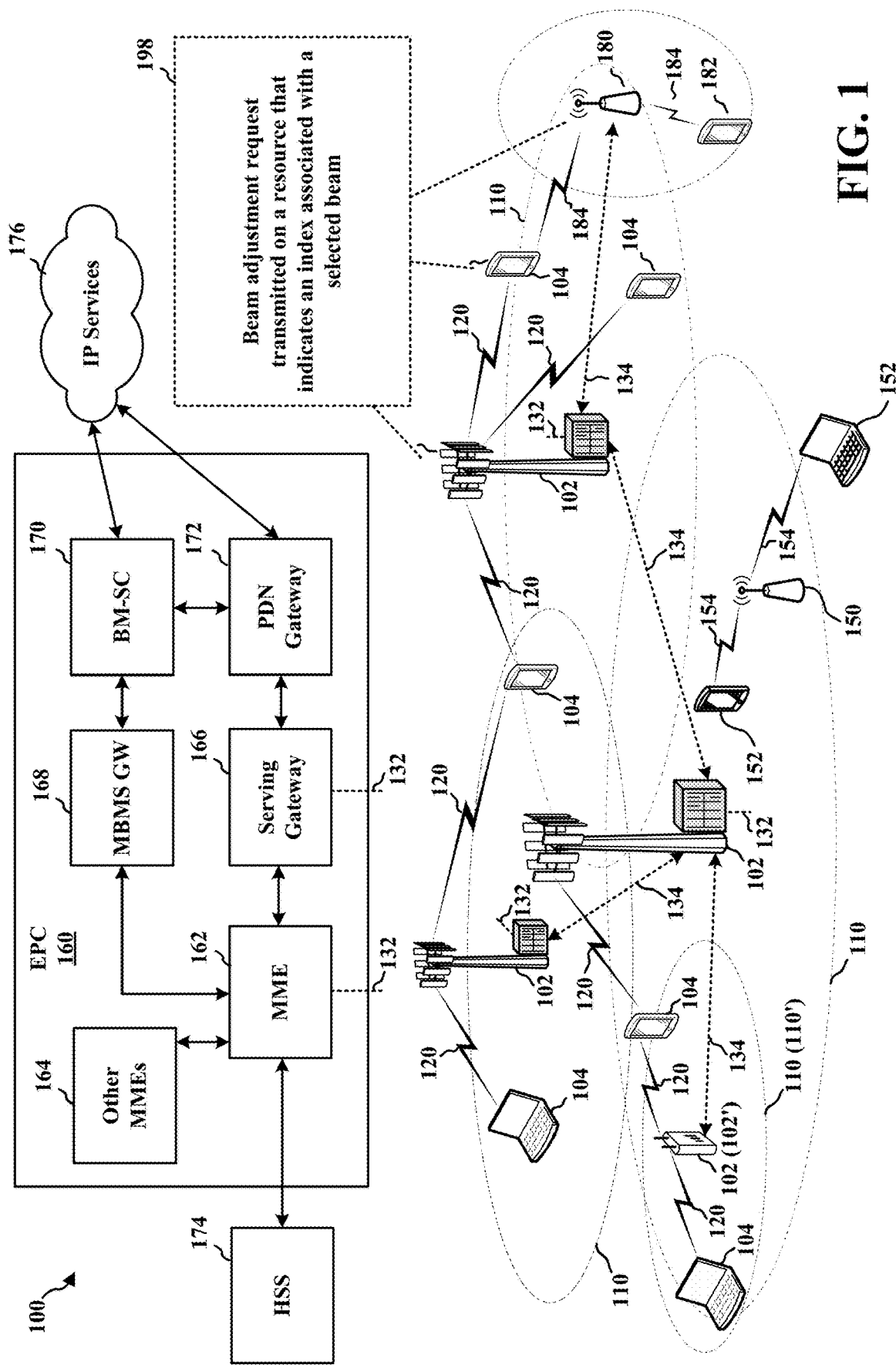
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 gigahertz (GHz) unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. In one aspect, the UE 182 may be an aspect of the UE 104. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the mmW base station 180 and the base station 102 may be integrated into a single base station (although not necessarily). In an aspect, the mmW base station 180 may be configured to transmit a first set of beams to the UE 104.

In an aspect, the UE 104 and the mmW base station 180 may perform a random access channel (RACH) procedure. As part of the RACH procedure, the UE 104 may receive, from the mmW base station 180, a contention resolution message 198. The contention resolution message 198 may indicate at least a beam index corresponding to a beam of the mmW base station 180. The UE 104 may determine whether the beam index is applicable to the UE 104. The UE 104 may communicate with the mmW base station 180 through the beam corresponding to the beam index when the beam index is applicable to the UE 104.

In an aspect, the UE 104 may transmit, to the mmW base station 180, an acknowledgement message when the beam index is determined to be applicable to the UE 104. In an aspect, the determination of whether the beam index is applicable to the UE 104 includes attempting to decode the contention resolution message based on a radio network temporary identifier (RNTI) associated with the UE 104, and the beam index is determined to be applicable to the UE 104 when the contention resolution message is successfully decoded. In an aspect, the UE 104 may refrain from transmitting a non-acknowledgement message to the mmW base station 180 when the beam index is determined to be inapplicable to the UE 104 or if the contention resolution message is unsuccessfully decoded. In an aspect, the contention resolution message 198 further includes an indication of one or more channels associated with the beam index, and the communication with the mmW base station 180 through the beam corresponding to the beam index is performed on the one or more indicated channels.

The mmW base station 180 may determine whether the acknowledgement message is received from the UE 104 in response to the contention resolution message. The mmW base station 180 may communicate with the UE 104 through the beam corresponding to the beam index when the acknowledgement message is determined to be received from the UE 104. In an aspect, the mmW base station 180 may scramble at least a portion of the contention resolution message using an RNTI associated the UE 104. In an aspect, the mmW base station 180 may communicate with the UE 104 through a serving beam before transmission of the contention resolution message 198, and the communication with the UE 104 may continue through the serving beam based on an absence of an acknowledgement message from the UE.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes.

In 5G, a frame may be less than 10 ms (and a subframe may be referred to as a slot, which may include one or more minislots). The structure is to be regarded as illustrative, and a subframe may be referred to a slot or a minislot. A slot may one-fourth to one-fifth of a subframe (e.g., of an LTE subframe) and a minislot may include 1 to 7 OFDM symbols. Each subframe may include two consecutive time slots.

A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgment (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
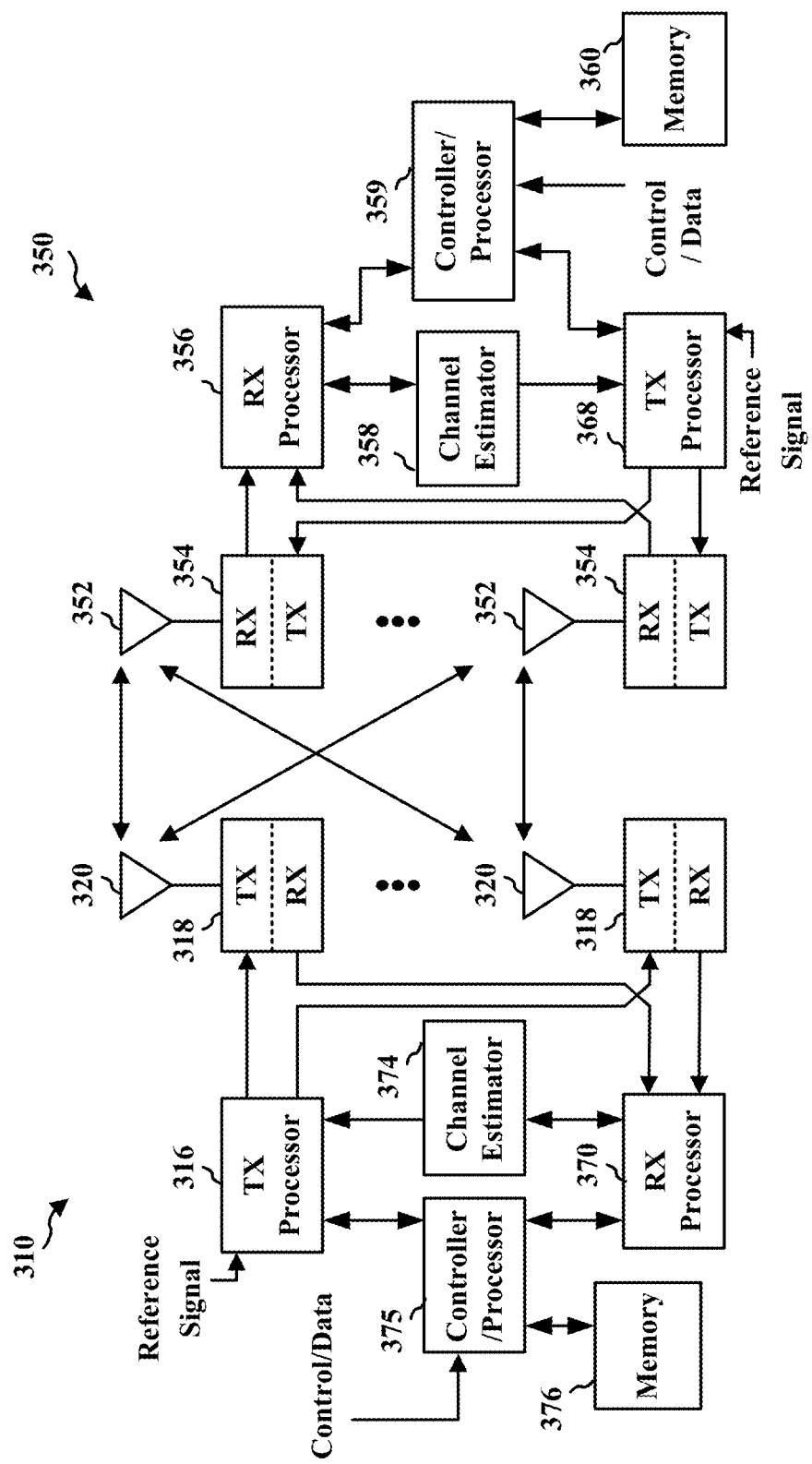
FIG. 3 is a diagram illustrating an example of a base station and user equipment (UE) in an access network.

FIG. 3 is a block diagram of an base station 310 in communication with a UE 350 in an access network. In an aspect, the base station 310 may be an aspect of the mmW base station 180 and/or the base station 102. In the DL, IP packets from the EPC 160 may be provided to a controller/ processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality. The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

FIGS. 4A and 4B illustrate call flow diagrams of methods 400, 440 of RACH procedures. A UE 404 may perform a RACH procedure with a base station 402 (e.g., a mmW base station, an eNB, etc.), for example, in order to synchronize with a network. A RACH procedure may be either contention-based or non-contention based.

FIG. 4A illustrates a method 400 for a contention-based RACH procedure. First, the UE 404 may select a RACH preamble for the RACH procedure. Further, the UE 404 may determine a random access (RA) RNTI in order to identify the UE 404 during the RACH procedure. The UE 404 may determine an RA-RNTI based on, for example, a time slot number in which a MSG1 410 is sent. The UE 404 may include the RACH preamble and the RA-RNTI in the MSG1 410.

In an aspect, the UE 404 may determine at least one resource (e.g., a time and/or frequency resource) that is to carry the MSG1 410. For example, the base station 402 may broadcast system information (e.g., a SIB), and the UE 404 may acquire the at least one resource based on the system information (e.g., system information included in a SIB2). The UE 404 may send the MSG1 410 to the base station 402, for example, on the at least one resource. If the UE 404 does not receive a response to the MSG1 410 (e.g., after expiration of a timer), then the UE 404 may increase transmit power (e.g., by a fixed interval) and resend the MSG1 410.

Based on the MSG1 410, the base station 402 may send, to the UE 404, a MSG2 412. The MSG2 412 may also be known as a random access response and may be sent on a downlink shared channel (DL-SCH). The base station 402 may determine a temporary cell RNTI (T-CRNTI). Further, the base station 402 may determine a timing advance value so that the UE 404 may adjust timing to compensate for delay. Further, the base station 402 may determine an uplink resource grant, which may include an initial resource assignment for the UE 404 so that the UE 404 may use the uplink shared channel (UL-SCH). The base station 402 may generate the MSG2 412 to include the C-RNTI, the timing advance value, and/or the uplink grant resource. The base station 402 may then transmit the MSG2 412 to the UE 404. In an aspect, the UE 404 may determine an uplink resource grant based on the MSG2 412.

Based on the MSG2 412, the UE 404 may send, to the base station 402, a MSG3 414. The MSG3 414 may also be known as an RRC connection request message and/or a scheduled transmission message. The UE 404 may determine a temporary mobile subscriber identity (TMSI) associated with the UE 404 or another random value used to identify the UE 404 (e.g., if the UE 404 is connecting to the network for the first time). The UE 404 may determine a connection establishment clause, which may indicate why the UE 404 is connecting to the network. The UE 404 may generate the MSG3 414 to include at least the TMSI or other random value, as well as the connection establishment clause. The UE 404 may then transmit the MSG3 414 to the base station on the UL-SCH.

Based on the MSG3 414, the base station 402 may send, to the UE 404, a MSG4 416.

The MSG4 416 may also be known as a connection resolution message. The base station 402 may address the MSG4 416 toward the TMSI or random value from the MSG3 414. The MSG4 416 may be scrambled with a C-RNTI associated with the UE 404. The base station 402 may transmit the MSG4 416 to the UE 404. The UE 404 may decode the MSG4 416, for example, using the C-RNTI associated with the UE 404. This RACH procedure may allow the UE 404 to be synchronized with a network.

FIG. 4B illustrates a method 440 of a non-contention-based RACH procedure. The non-contention-based RACH procedure may be applicable to handover and/or downlink data arrival.

The base station 402 may determine a random access preamble assigned to the UE 404. The base station 402 may transmit, to the UE 404, the random access preamble assignment 442. The UE 404 may respond to the random access preamble assignment 442 with the random access preamble 444 (e.g., an RRC connection message), which may be the random access preamble assigned to the UE 404. The UE 404 may then receive, from the base station 402, a random access response 446 (e.g., an uplink grant).

FIGS. 5A through 5G are diagrams illustrating an example of the transmission of beamformed signals between a base station and a UE. The base station 502 may be embodied as a base station in a mmW system (mmW base station), such as the mmW base station 180. In one aspect, the base station 502 may be collocated with another base station, such as an eNB, a cellular base station, or other base station (e.g., a base station configured to communicate in a sub-6 GHz band). While some beams are illustrated as adjacent to one another, such an arrangement may be different in different aspects (e.g., beams transmitted during a same symbol may not be adjacent to one another). Additionally, the number of illustrated beams is to be regarded as illustrative.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters (the super high frequency (SHF) band extends between 3 GHz and 30 GHz, also referred to as centimeter wave). While the disclosure herein refers to mmWs, it should be understood that the disclosure also applies to near mmWs. Further, while the disclosure herein refers to mmW base stations, it should be understood that the disclosure also applies to near-mmW base stations.

In order to build a useful communication network in the millimeter wavelength spectrum, a beamforming technique may be used to compensate for path loss. Beamforming technique focuses the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE. If the direction becomes blocked, either because of UE movement or changes in the environment (e.g., obstacles, humidity, rain, etc.), the beam may not be able to reach the UE. Thus, in order to ensure that the UE has continuous, seamless coverage, multiple beams in as many different direction as possible may be available. In an aspect, the beamforming technique may require that the mmW base stations and the UEs transmit and receive in a direction that allows the most RF energy to be collected.

The base station 502 may include hardware for performing analog and/or digital beamforming. If the base station 502 is equipped with analog beamforming, at any one time, the base station 502 may transmit or receive a signal in only one direction. If the base station 502 is equipped with digital beamforming, the base station 502 may concurrently transmit multiple signals in multiple directions or may receive multiple signals concurrently in multiple directions.

Further, the UE 504, for example, may include hardware for performing analog and/or digital beamforming. If the UE 504 is equipped with analog beamforming, at any one time, the UE 504 may transmit or receive a signal in only one direction. If the UE 504 is equipped with digital beamforming, the UE 504 may concurrently transmit multiple signals in multiple directions or may concurrently receive multiple signals in multiple directions.

In the mmW network, UEs may perform beam sweeps with mmW base stations within range. For example, the base station 502 may transmit m beams in a plurality of different spatial directions. The UE 504 may listen/scan for the beam transmissions from the base station 502 in n different receive spatial directions. When listening/scanning for the beam transmissions, the UE 504 may listen/scan for the beam sweep transmission from the base station 502 m times in each of the n different receive spatial directions (a total of m*n scans). In another aspect, in a beam sweep, the UE 504 may transmit n beams in a plurality of different spatial directions. The base station 502 listens/scans for the beam transmissions from the UE 504 in m different receive spatial directions. When listening/scanning for the beam transmissions, the base station 502 may listen/scan for the beam sweep transmission from the UE 504 n times in each of the m different receive spatial directions (a total of m*n scans).

Based on the performed beam sweeps, the UEs and/or the mmW base stations may determine a channel quality associated with the performed beam sweeps. For example, the UE 504 may determine the channel quality associated with the performed beam sweeps. Alternatively, the base station 502 may determine the channel quality associated with the performed beam sweeps. If the UE 504 determines a channel quality associated with the performed beam sweeps, the UE 504 may send the channel quality information (also referred to as beam sweep result information) to the base station 502. The UE 504 may send the beam sweep result information to the base station 502. If the base station 502 determines a channel quality associated with the performed beam sweeps, the base station 502 may send the beam sweep result information to the UE 504. In an aspect, the channel quality may be affected by a variety of factors. The factors include movement of the UE 504 along a path or due to rotation (e.g., a user holding and/or rotating the UE 504), movement along a path behind obstacles, and/or movement within particular environmental conditions (e.g., obstacles, rain, humidity). The UE 504 and the base station 502 may also exchange other information, for example, associated with for beamforming (e.g., analog or digital beamforming capabilities, beamforming type, timing information, configuration information, etc.).

Based on the received information, the base station 502 and/or the UE 504 may determine various configuration information, such as mmW network access configuration information, information for adjusting beam sweeping periodicity, information regarding overlapping coverage for predicting a handoff to another base station, such as a mmW base station.

Figure 5B:
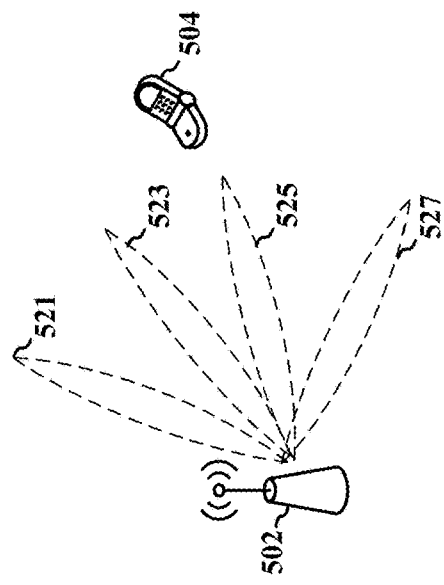
FIGS. 5A through 5G illustrate diagrams of a wireless communications system.

In an aspect, a beam set may contain eight different beams. For example, FIG. 5A illustrates eight beams 521, 522, 523, 524, 525, 526, 527, 528 for eight directions. In aspects, the base station 502 may be configured to beamform for transmission of at least one of the beams 521, 522, 523, 524, 525, 526, 527, 528 toward the UE 504. In one aspect, the base station 502 can sweep/transmit directions using eight ports during a subframe (e.g., synchronization subframe).

In an aspect, a base station may transmit a signal, such as a beam reference signal (BRS), in a plurality of directions, for example, during a synchronization subframe. In one aspect, this transmission may be cell-specific. Referring to FIG. 5B, the base station 502 may transmit a first set of beams 521, 523, 525, 527 in four directions. For example, the base station 502 may transmit a BRS in a synchronization subframe of each of the transmit beams 521, 523, 525, 527.

In an aspect, these beams 521, 523, 525, 527 transmitted in the four directions may be odd-indexed beams 521, 523, 525, 527 for the four directions out of a possible eight for the beam set. For example, the base station 502 may be capable of transmitting beams 521, 523, 525, 527 in directions adjacent to other beams 522, 524, 526, 528 that the base station 502 is configured to transmit. In an aspect, this configuration in which the base station 502 transmits beams 521, 523, 525, 527 for the four directions may be considered a "coarse" beam set.

The UE 504 may determine a respective beam index (sometimes abbreviated as "BI") corresponding to a respective beam. In various aspects, the beam index may be indicate at least a direction for communicating through a corresponding beam toward the UE 504 (e.g., a beamforming direction). For example, the beam index may be a logical beam index associated with an antenna port, OFDM symbol index, and/or BRS transmission period, which may be indicated by one or more bits (e.g., 9 bits). For example, the UE 504 may be configured to determine a beam index corresponding to a beam based on a time at which a BRS is received—e.g., a symbol or slot during which a BRS is received may indicate a beam index corresponding to a beam.

Figure 5D:
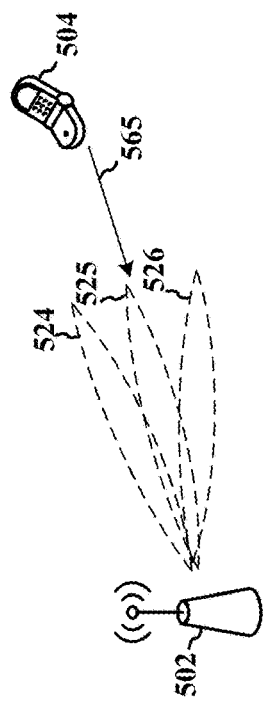
Figure 5A:
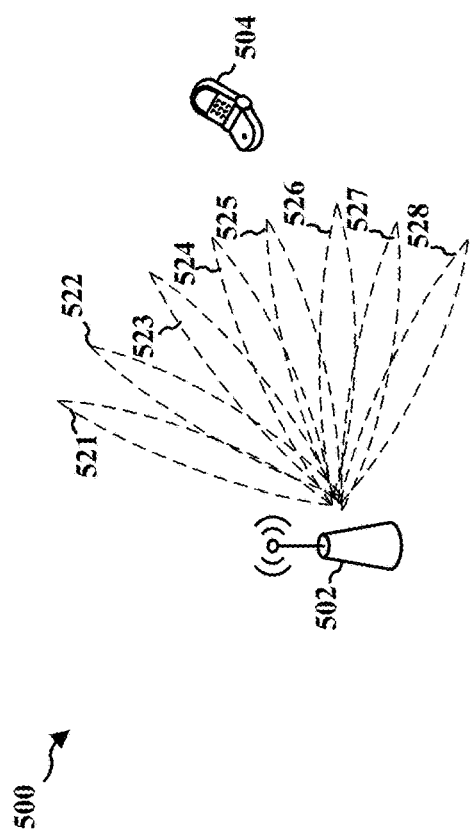
Figure 5C:
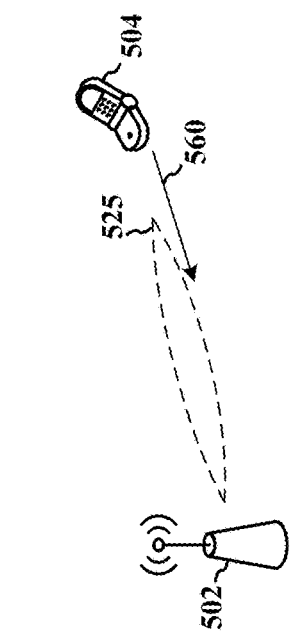

In FIG. 5C, the UE 504 may determine or select a beam index (sometimes abbreviated as "BI") that is strongest or preferable. For example, the UE 504 may determine that the beam 525 carrying a BRS is strongest or preferable. The UE 504 may select a beam by measuring values for a received power or received quality associated with each of the first set of beams 521, 523, 525, 527. In one aspect, the received power may be referred to as a BRS received power (BRSRP).

The UE 504 may compare respective values to one another. The UE 504 may select a "best" beam. In an aspect, the best beam may be a beam that corresponds to the greatest or highest value (e.g., the best beam may be a beam with the highest BRSRP). The selected beam may correspond to a beam index, which may be a beam index with respect to the base station 502. For example, the UE 504 may determine that the BRSRP corresponding to the fifth beam 525 is the highest, and therefore the fifth beam 525 is the best beam as determined by the UE 504.

The UE 504 may transmit a first indication 560 of the fifth beam 525 to the base station 502. In an aspect, the first indication 560 may include a request to transmit a beam refinement reference signal (BRRS). The BRRS may be UE-specific. One of ordinary skill would appreciate that the BRRS may be referred to by different terminology without departing from the present disclosure, such as a beam refinement signal, a beam tracking signal, or another term.

In one aspect, the base station 502 may trigger transmission of the first indication 560. For example, the base station 502 may trigger transmission of the first indication 560 by a DCI message.

The base station 502 may receive the first indication 560. In one aspect, the first indication 560 may include a beam adjustment request (BAR). (e.g., a request for beam tracking, a request for a BRRS, a request for the base station to start transmitting on an indicated beam index without any further beam tracking, and the like). In one aspect, the first indication 560 may be indicated by a scheduling request. Based on the first indication 560, the base station 502 may determine the beam index corresponding to the fifth beam 525.

In FIG. 5D, the base station 502 may transmit a second set of beams based on the first indication 560 (e.g., based on a beam index indicated by the first indication 560). For example, the UE 504 may indicate that a fifth beam 525 is the best beam and, in response, the base station 502 may transmit a second set of beams 524, 525, 526 to the UE 504 based on the indicated beam index. In an aspect, the beams 524, 525, 526 transmitted based on the first indication 560 may be closer (e.g., spatially and/or directionally) to the fifth beam 525 than those other beams 521, 523, 527 of the first set of beams.

In an aspect, the beams 524, 525, 526 transmitted based on the first indication 560 may be considered a "fine" beam set. In an aspect, the base station 502 may transmit a BRRS through each of the beams 524, 525, 526 of the fine beam set. In an aspect, the beams 524, 525, 526 of the fine beam set may be adjacent. In an aspect, BRRS transmission can span 1, 2, 5 or 10 OFDM symbols and may be associated with a BRRS resource allocation, BRRS process indication, and/or a beam refinement process configuration.

Based on the BRRS transmission through the beams 524, 525, 526 of the fine beam set, the UE 504 may transmit a second indication 565 to the base station 502 to indicate a "best" beam. In an aspect, the second indication 565 may use two (2) bits to indicate the selected beam. For example, the UE 504 may transmit the second indication 565 that indicates a beam index corresponding to the selected beam 525. In one aspect, the second indication 565 may report beam refinement information (BRI). In one aspect, the second indication 565 may include a resource index (e.g., a BRRS-RI) and/or a reference power (RP) associated with the reception of the BRRS as measured by the UE 504 (e.g., a BRRS-RP). The base station 502 may then communicate with the UE 504 through the selected beam 525.

Figure 5E:
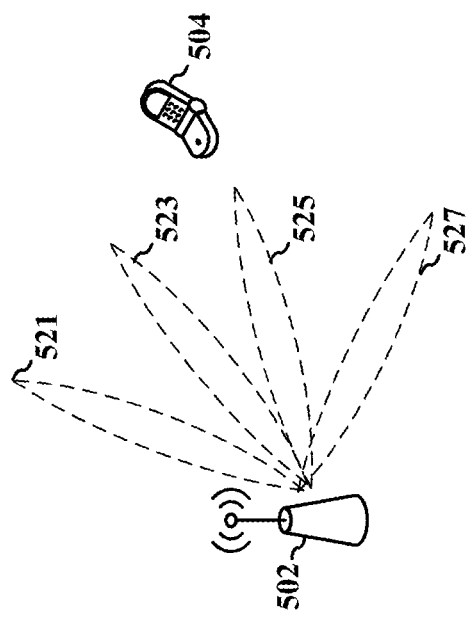

Referring to FIG. 5E, the base station 502 may transmit a BRS in a plurality of directions during a synchronization subframe. In an aspect, the base station 502 may transmit the BRS continuously, e.g., even after the UE 504 has communicated the second indication 565. For example, the base station 502 may transmit beams 521, 523, 525, 527 that each include a BRS (e.g., a "coarse" beam set).

Figure 5G:
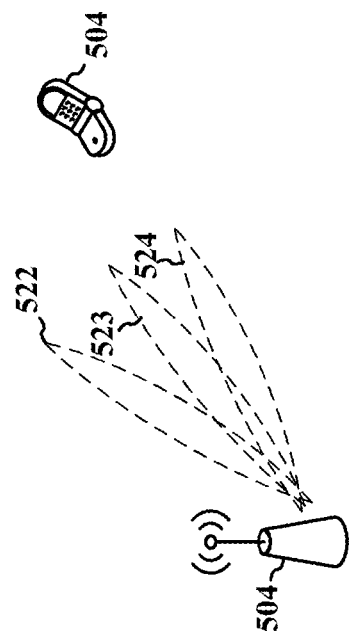
Figure 5F:
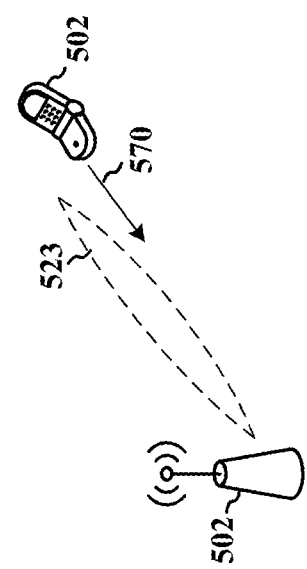

Referring to FIG. 5F, the quality of a selected beam 525 may deteriorate so that the UE 504. For example, when the base station 502 and the UE 504 are communicating through the selected beam 525, the selected beam 525 may become occluded or otherwise unsatisfactory such that the base station 502 and the UE 504 may prefer to communicate through another beam. Based on the BRS (e.g., transmitted during a synchronization subframe), the UE 504 may determine a new beam 523 through which to communicate. For example, the UE 504 may determine that the third beam 523 through which a BRS is communicated may be the best beam. The UE 504 may select a beam based by measuring values for a received power (e.g., BRSRP) or received quality associated with each of the set of beams 521, 523, 525, 527, comparing respective values to one another, and selecting the beam that corresponds to the highest value. The selected beam may correspond to a beam index at the base station 502. The UE 504 may transmit a third indication 570 indicating this beam index to the base station 502. In an aspect, the third indication 570 may include a request to transmit a BRRS. The BRRS may be UE-specific. In one aspect, a BAR may be used to request the base station 502 to transmit a BRRS. In one aspect, the third indication 570 may be triggered by the base station 502, such as by a DCI message. Similar to the first indication 560, the third indication 570 may be included in a scheduling request.

With respect to FIG. 5G, the base station 502 may receive the third indication 570 from the UE 504. The base station 502 may be configured to determine a beam index based on at least the third indication 570. The base station 502 and the UE 504 may perform a beam refinement procedure, such as illustrated with respect to FIG. 5E (e.g., in order to select a new beam through which to communicate).

Figure 6:
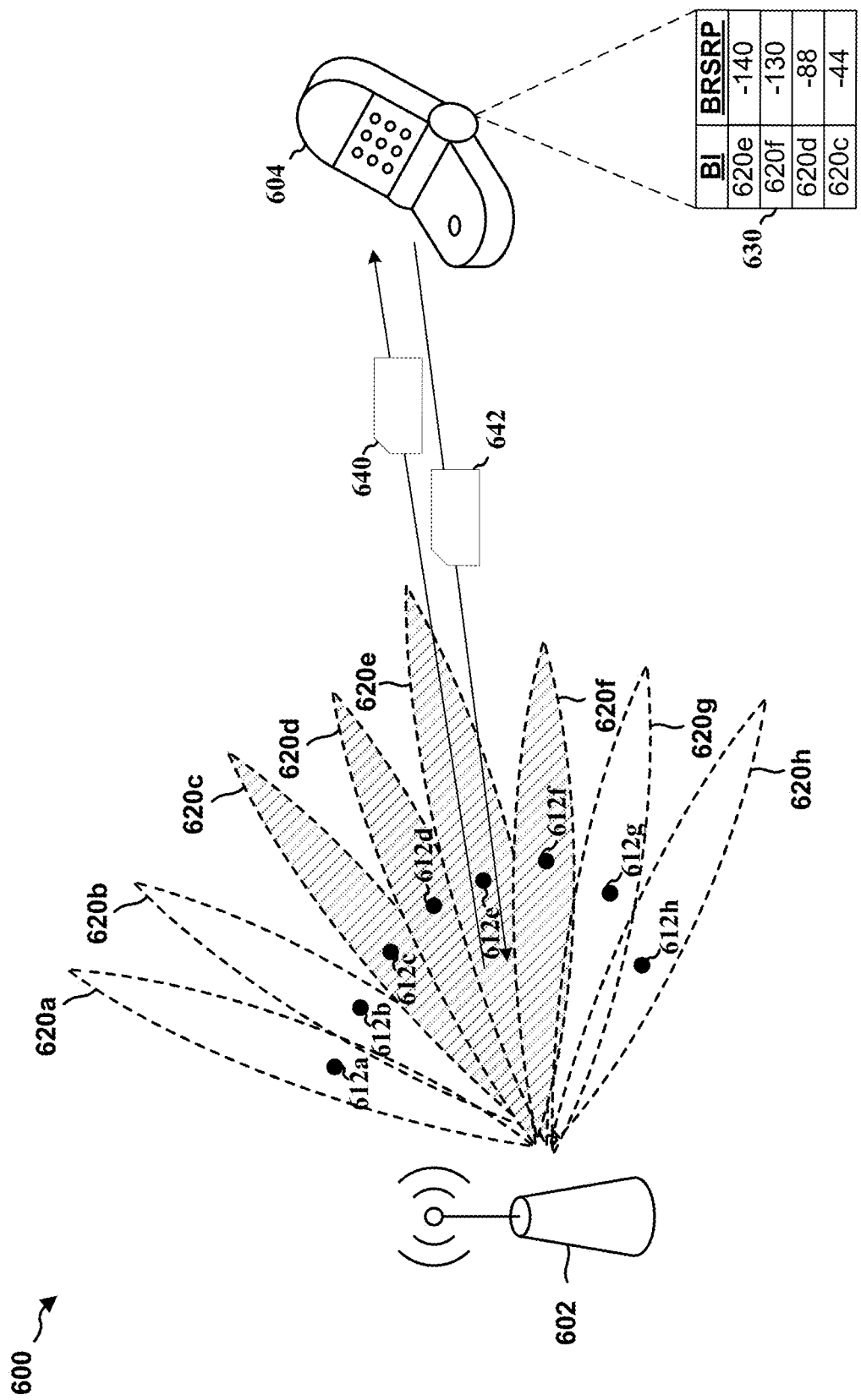
FIG. 6 is a diagram of a wireless communications system.

Referring to FIG. 6, a diagram of a wireless communications system 600 is illustrated. The base station 602 may be an aspect of the base station 502, the base station 310, the base station 102, the mmW base station 180, and/or another base station. The UE 604 may be an aspect of the UE 504, the UE 350, the UE 104, the UE 182, and/or another UE.

In the illustrated aspect, the base station 602 may include up to 8 antenna ports for BRS transmission. In various aspects, the base station 602 may send, to the UE 604, one or more BRSs 612a-h (e.g., as described with respect to FIGS. 5A-5G). Each BRS 612a-h may be communicated through a respective beam 620a-h. For example, the base station 602 may send a first BRS 612a through the first beam 620a with which the first BRS 612a is associated. The UE 604 may track one or more beams 620a-h through periodically measuring a BRS 612a-h associated with a respective one of the beams 620a-h. In an aspect, the transmission period of the BRSs 612a-h may be configured by an indicator on a physical broadcast channel (PBCH), such as an enhanced or evolved PBCH (ePBCH). The transmission period may be associated with the time to sweep the beams 620a-h through which the BRS 612a-h is transmitted.

In aspects, the UE 604 may receive, through the set of beams 620a-h, a set of BRSs 612a-h. Each BRS 612a-h may be associated with a beam index that corresponds to the beam 620a-h through which the BRS 612a-h is sent. The UE 604 may measure a signal quality of each BRS 612a-h, and each measured signal quality may correspond to a beam 620a-h of the set of beams. For example, the UE 604 may measure the signal qualities of the third BRS 612c, the fourth BRS 612d, the fifth BRS 612e, and the sixth BRS 612f, which respectively correspond to the third beam 620c, the fourth beam 620d, the fifth beam 620e, and the sixth beam 620f. In aspects, the UE 604 may not receive each of the BRSs 612a-h.

In one aspect, the UE 604 may measure the signal quality as a received power. In one aspect, the signal quality may correspond to a BRSRP. For example, the UE 604 may measure the BRSRP in decibels (dB) and/or decibel-milliwatts (dBm). In other aspects, the UE 604 may measure the signal quality as another value, such as a received quality (RQ) (e.g., a BRSRQ), an signal-to-interference ratio (SIR), a signal-to-interference-plus-noise ratio (SINR), a reference signal received power (RSRP), a reference signal received quality (RSRQ), a received signal strength indicator (RSSI), or another metric.

In an aspect, the UE 604 may maintain a set of candidate beam indexes 630 corresponding to a set of the best measured signal qualities for BRSs 612a-h received through the beams 620a-h. For example, the best measured signal qualities may correspond to the highest measured signal qualities. The number N of candidate beam indexes in the set of candidate beam indexes 630 may be predetermined (e.g., N may equal 4). In an aspect, the UE 604 may record a null value when the UE 604 is unable to measure signal qualities of N beams. For example, if N equals four and the UE 604 is unable to measure a fourth signal quality, the UE 604 may record a null value in the set of candidate beam indexes 630.

In an aspect, the UE 604 may maintain the set of candidate beam indexes 630 based on a most recent set of signal qualities measured for the set of BRSs 612*a-h*. That is, the set of candidate beam indexes 630 may be the correspond to the measured signal qualities for each of the BRSs 612*a-h* that is most recently received by the UE 604.

In another aspect, the UE 604 may maintain the set of candidate beam indexes 630 based on a time-averaged set of signal qualities of the set of BRSs 612*a-h*. For example, the UE 604 may receive a plurality of sets of the BRSs 612*a-h*, which may be periodically transmitted by the base station 602. The UE 604 may average a respective signal qualities measured for each BRS of the set of BRSs 612*a-h*—e.g., the UE 604 may average the most recent three or four measured signal qualities for the first BRS 612*a*, the UE 604 may average the most recent three or four measured signal qualities for the second BRS 612*b*, and so forth. The UE 604 may maintain the set of candidate beam indexes 630 based on the time-averaged set of signal qualities of BRSs.

In another aspect, the UE 604 may maintain the set of candidate beam indexes 630 based on a filtered set of signal qualities of BRSs 612*a-h*. For example, the UE 604 may apply a filter during or after measuring the signal qualities for the BRSs 612*a-h* in order to determine the best or highest signal qualities corresponding to the best or highest BRSs of the set of BRSs 612*a-h*.

In one aspect, the UE 604 may maintain the set of candidate beam indexes 630 based on one or more other criteria, which may be received (e.g., from the base station 602) and/or determined by the UE 604. In one aspect, the UE 604 may maintain the set of candidate beam indexes 630 based on an indication of one or more beams to include or exclude from the maintained set of candidates beam indexes 630. The indication of one or more beams to include or exclude may be received from the base station 602, and may include one or more beam indexes. According to aspects, the UE 604 may then include or exclude indicated beam indexes from the set of candidate beam indexes 630.

In another aspect, the UE 604 may maintain the set of candidate beam indexes 630 based on one or more hysteresis criteria for including a beam index in or excluding a beam index from the set of candidate beam indexes 630. The hysteresis criteria may include, for example, inclusion in or exclusion from the set of candidate beam indexes 630 if a measured signal quality deviates from a predetermined value (e.g., a predetermined threshold) or deviates from another signal quality measured for another BRS of the set of BRSs 612*a-h*. In another aspect, the hysteresis criteria may include inclusion or exclusion from the set of candidate beam indexes 630 if a predetermined number of values (e.g., BRSRPs) measured for a BRSs of a beam fall below (e.g., for exclusion) or exceed (e.g., for inclusion) a predetermined threshold. For example, if the 3 most recent BRSRPs measured for the third BRSs 612*c* fall below a threshold value, then the beam index corresponding to the third beam 620*c* may be excluded from the candidate beam set 630 (although the beam index corresponding to the third beam 620*c* would not be excluded if only one BRSRP measured for the BRSs 612*c* falls below the threshold value).

According to various aspects, the UE 604 may transmit, to the base station 602, a beam state information (BSI) report 642 indicating at least one beam index. In an aspect, the BSI report 642 may be a BSI report that includes a beam index and a corresponding measured signal quality (e.g., the BRSRP measured for a BRS 612*a-h* received through a beam 620). For example, the UE 604 may select a beam index and corresponding signal quality from the maintained set of candidate beam indexes 630, and transmit the selected beam index and corresponding signal quality in the BSI report 642. In an aspect, the UE 604 may transmit the BSI report 642 in response to a request 640 received from the base station 602.

In an aspect, the BSI report 642 may be carried on a PUCCH or a PUSCH. For example, the UE 604 may send, to the base station 602, the BSI report 642 on a PUCCH (e.g., an enhanced PUCCH) or a PUSCH (e.g., an enhanced PUSCH).

Figure 7:
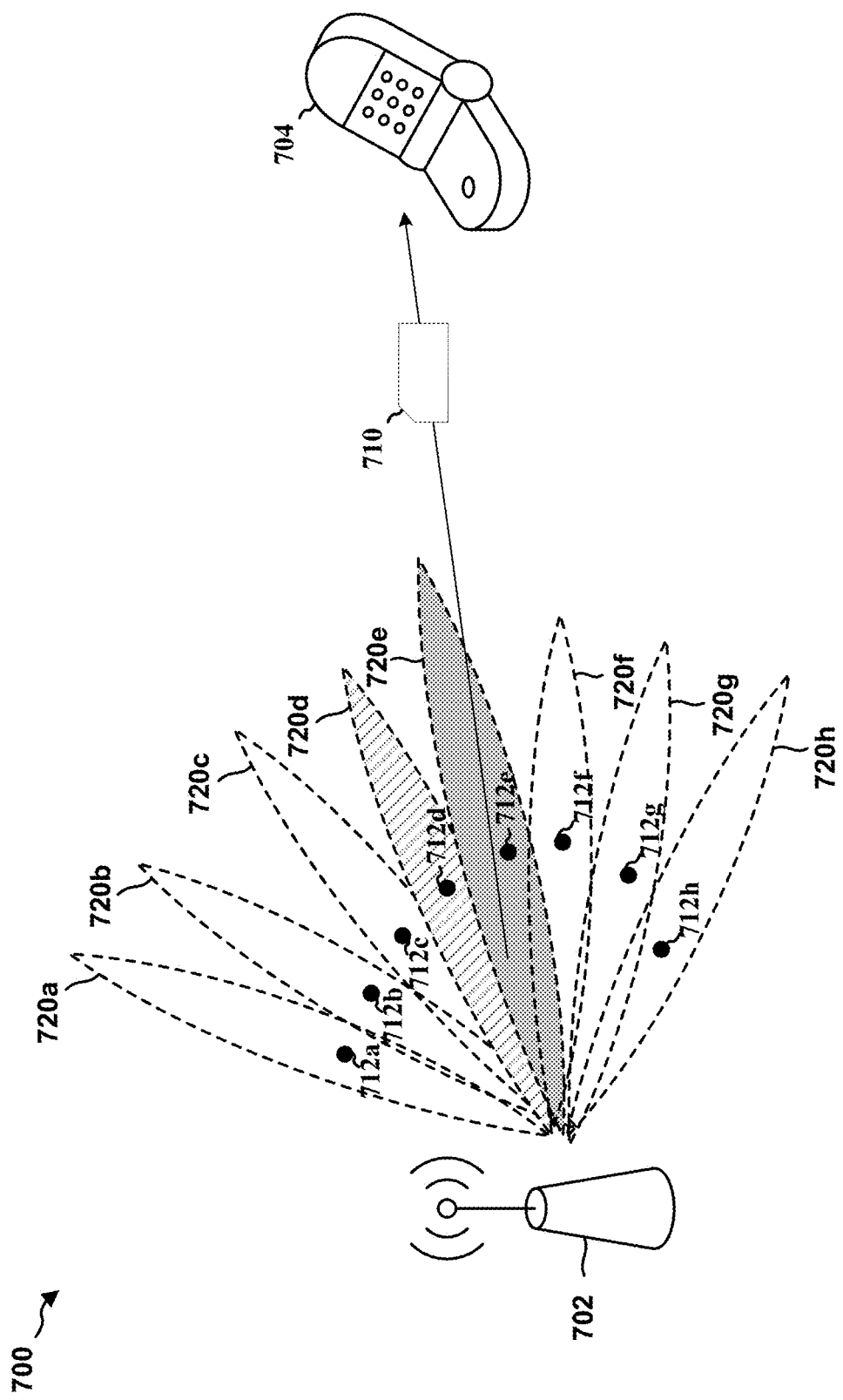
FIG. 7 is a diagram of a wireless communications system.

Referring to FIG. 7, a diagram of a wireless communications system 700 is illustrated. The base station 702 may be an aspect of the base station 602, the base station 502, the base station 310, the base station 102, the mmW base station 180, and/or another base station. The UE 704 may be an aspect of the UE 604, the UE 504, the UE 350, the UE 104, the UE 182, and/or another UE.

In the illustrated aspect, the base station 702 may include up to 8 antenna ports for BRS transmission. In various aspects, the base station 702 may send, to the UE 704, one or more BRSs 712*a-h* (e.g., as described with respect to FIGS. 5A-5G and/or FIG. 6). Each BRS 712*a-h* may be communicated through a respective beam 720*a-h*. For example, the base station 702 may send a first BRS 712*a* through the first beam 720*a* with which the first BRS 712*a* is associated. The UE 704 may track one or more beams 720*a-h* through periodically measuring a BRS 712*a-h* associated with a respective one of the beams 720*a-h*. In an aspect, the transmission period of the BRSs 712*a-h* may be configured by an indicator on a PBCH, such as an ePBCH. The transmission period may be associated with the time to sweep the beams 720*a-h* through which the BRS 712*a-h* is transmitted.

In aspects, the base station 702 may transmit a set of beams 720*a-h*. According to various aspects, the base station 702 may communicate with the UE 704 through a first serving beam 720*e*. The first serving beam 720*e* may correspond to a beam index.

In one aspect, the base station 702 and the UE 704 may communicate through the first serving beam 720*e* for uplink communication and/or downlink communication. In an aspect, the base station 702 and the UE 704 may use the first serving beam 720*e* for one of uplink communication or downlink communication, but may use a different beam (e.g., the fourth beam 720*d*) for the other of uplink communication or downlink communication (e.g., in aspects in which uplink/downlink reciprocity does not work or where the base station 702 is intended to serve the UE 704 on certain beams).

The base station 702 and the UE 704 may be configured to switch beams. In an aspect, the base station 702 may initiate the beam switching. For example, the base station 702 may set up a beam 720*a-h* for a channel for which a beam 720*a-h* is not configured. In another example, the base station 702 and/or the UE 704 may select a different beam 720*a-h* in order to provide a better connection for communication on a channel between the base station 702 and the UE 704. In one aspect, the base station 702 and the UE 704 may modify and/or set up a beam for uplink communication, downlink communication, or both uplink and downlink communication.

In an aspect, the base station 702 may send, to the UE 704, a command 710 associated with beam modification (e.g., a beam modification command or another signal). In one aspect, the base station 702 may include the command 710 in a MAC CE. In another aspect, the base station 702 may include the command 710 in a DCI message. In another aspect, the base station 702 may send the command 710 to the UE 704 via RRC signaling.

The base station 702 may select a beam 720*a-h* to which to switch for communication between the base station 702 and the UE 704. For example, the base station 702 may determine that communication with the UE 704 is to continue through the fourth beam 720*d*. The base station 702 may determine a beam index corresponding to the selected fourth beam 720*d*. The base station 702 may generate a command 710 that is to indicate at least one beam index for communicating through the selected fourth beam 720*d* on at least one channel. The base station 702 may send, to the UE 704, the command 710 in order to switch the serving beam from the current serving beam 720*e* to the selected fourth beam 720*d*.

In various aspects, the base station 702 may determine a channel for which the command 710 is applicable. For example, the base station 702 may determine a beam modification command for an individual channel or for a group of channels. In one aspect, the base station 702 may indicate, via the command 710, at least one channel to which the command 710 is applicable. That is, the base station 702 may indicate, by the command 710, a channel corresponding to a beam index indicated by the command 710. In an aspect, the command 710 may indicate a group of channels that includes the at least one channel determined by the base station 702.

In one aspect, the command 710 may indicate a channel (or group of channels) by a format. For example, the base station 702 may send the command 710 as a DCI message and the format of the DCI message may indicate a channel (or group of channels) to which at least one beam index indicated by the command 710 is applicable. According to another example, the command 710 may indicate a channel (or group of channels) based on inclusion of the command 710 in a MAC CE by the base station 702. For example, inclusion of the command 710 in a MAC CE may indicate, to the UE 704, that the UE 704 is to switch to the beam index indicated by the command 710 for PDCCH, PDSCH, CSI-RS, PUCCH, PUSCH, and/or SRS.

According to an aspect, the base station 702 may generate the command 710 to indicate a plurality of beam indexes. In one aspect, the base station 702 may generate the command 710 to indicate one or more channels. In one aspect, the base station 702 may generate the command 710 to indicate a corresponding channel(s) to which each beam index of the plurality of beam indexes is applicable. That is, the base station 702 may generate the command 710 to indicate a plurality of beam indexes and a plurality of channels, and the command 710 may indicate a corresponding channel (or channel group) for each beam index of the plurality of beam indexes.

According to one example, the base station 702 may determine that the current serving beam 720*e* should be modified for channel state information reference signals (CSI-RS) and/or BRRS, but the other downlink and/or uplink beams 720*a-h* should remain unchanged. For example, the base station 702 may continue communication through the current serving beam 720*e* for other channels other than the CSI-RS and/or BRRS, and switch to the selected fourth beam 720*d* for communication carried on the CSI-RS and/or BRRS.

In another example, the base station 702 may determine that at least one beam through which the PDCCH and/or PDSCH are communicated should be switched to at least the selected fourth beam 720*d*, but continue uplink communication through at least the current serving beam 720*e*.

In a third example, the base station 702 may determine that the current serving beam 720*e* is to be changed to the selected fourth beam 720*d* for uplink communication (e.g., including PUSCH, PUCCH, and SRS channels), but continue with the current serving beam 720*e* for downlink communication (e.g., including PDSCH, PDCCH, CSI-RS, and BRRS), for example, when reciprocity cannot be assumed and/or to provide scheduling and/or multiplexing flexibility for the base station 702.

While the present disclosure illustrates communication on one beam (e.g., the current serving beam 720*e* and the selected fourth beam 720*d*), it will be appreciated that communication on channels may occur through more than one beam.

The UE 704 may receive, from the base station 702, the command 710. In response to the command 710, the UE 704 communicate on at least one channel with the base station 702 through the at least one beam corresponding to the at least one beam index indicated by the command 710. For example, the UE 704 may switch the current serving beam 720*e* at the UE 704 to the selected fourth beam 720*d* after receiving the command 710. Accordingly, the UE 704 may communicate with the base station 702 through the selected fourth beam 720*d*.

In one aspect, the UE 704 may switch beams at a determined time, which may correspond to a symbol or a subframe. The UE 704 may determine the time (e.g., subframe) based on the command 710. For example, when the base station 702 includes the command 710 in a MAC CE, the UE 704 may determine to switch communication through the current serving beam 720*e* to the selected fourth beam 720*d* at the beginning of a subframe n+$k_{beamswitch\text{-}delay\text{-}mac}$, where n is the subframe used for HARQ-ACK transmission associated with the MAC CE and $k_{beamswitch\text{-}delay\text{-}mac}$ is equal to 14.

According to another example, the UE 704 may receive the command 710 in a DCI message. In response to receiving the command 710 in a DI message, the UE 704 may switch from the current serving beam 720*e* to the selected fourth beam 720*d* at the beginning of a subframe n+$k_{beamswitch\text{-}delay\text{-}dic}$, where n is the subframe used for transmission of a BSI report (e.g., the BSI report 642) and $k_{beamswitch\text{-}delay\text{-}dic}$ is equal to 11.

According to an aspect, the command 710 may include a request from the base station 702 for a BSI report, such as the request 640. The request for a BSI report may be communicated via a DCI message. In such an aspect, the base station 702 may set a field (e.g., a beam switch indication field) of DCI message to a predetermined value, such as "1" to indicate that the UE 704 is to switch beams and "0" to indicate that the UE 704 is to continue communicating using the current serving beam 720*e*. When the base station 702 indicates the command 710 by setting a field of a DCI message to a predetermined value indicating a beam switch command, the UE 704 may determine that the UE 704 is to switch to the first beam indicated by a BSI report (e.g., the BSI report 642).

After switching from the current serving beam 720*e* to the selected fourth beam 720*d* indicated by the command 710, the UE 704 and the base station 702 may communicate on at least one channel through the selected fourth beam 720*d*. Accordingly, the beam index corresponding to the selected fourth beam 720*d* for communication by the UE 704 may match the beam index corresponding to the selected fourth beam 720*d* for communication by the base station 702.

Figure 8:
FIG. 8 is a diagram of a wireless communications system.

With reference to FIG. 8, a diagram of a wireless communications system 800 is illustrated. The base station 802 may be an aspect of the base station 702, the base station 602, the base station 502, the base station 310, the base station 102, the mmW base station 180, and/or another base station. The UE 804 may be an aspect of the UE 704, the UE 604, the UE 504, the UE 350, the UE 104, the UE 182, and/or another UE.

In the illustrated aspect, the base station 802 may include up to 8 antenna ports for BRS transmission. In various aspects, the base station 802 may send, to the UE 804, one or more BRSs 812a-h (e.g., as described with respect to FIGS. 5A-5G, FIG. 6, and/or FIG. 7). Each BRS 812a-h may be communicated through a respective beam 820a-h. For example, the base station 802 may send a first BRS 812a through the first beam 820a with which the first BRS 812a is associated. The UE 804 may track one or more beams 820a-h through periodically measuring a BRS 812a-h associated with a respective one of the beams 820a-h. In an aspect, the transmission period of the BRSs 812a-h may be configured by an indicator on a PBCH, such as an ePBCH. The transmission period may be associated with the time to sweep the beams 820a-h through which the BRS 812a-h is transmitted.

In aspects, the UE 804 may receive, through the set of beams 820a-h, a set of BRSs 812a-h. Each BRS 812a-h may correspond to a beam index that corresponds to the beam 820a-h through which the BRS 812a-h is sent. The UE 804 may measure a signal quality of each BRS 812a-h, and each measured signal quality may correspond to a beam 820a-h of the set of beams. For example, the UE 804 may measure the signal qualities of the third BRS 812c, the fourth BRS 812d, the fifth BRS 812e, and the sixth BRS 812f, which respectively correspond to the third beam 820c, the fourth beam 820d, the fifth beam 820e, and the sixth beam 820f. In aspects, the UE 804 may not receive each of the BRSs 812a-h.

In one aspect, the UE 804 may measure the signal quality by determining a received power. In one aspect, the signal quality may correspond to a BRSRP. For example, the UE 804 may measure the BRSRP in dB and/or dBm. In other aspects, the UE 804 may measure the signal quality as another value, such as a RQ, an SIR, a SINR, a RSRP, a RSRQ, a RSSI, or another metric.

In an aspect, the UE 804 may maintain a set of candidate beam indexes 830 corresponding to a set of the best measured signal qualities for BRSs 812a-h received through the beams 820a-h. For example, the best measured signal qualities may correspond to the highest determined received powers (e.g., the highest determined BRSRPs). The number N of candidate beam indexes in the set of candidate beam indexes 830 may be predetermined (e.g., N may equal 4). In an aspect, the UE 804 may record a null value when the UE 804 is unable to measure signal qualities of N beams. For example, if N equals four and the UE 804 is unable to measure a fourth signal quality, the UE 804 may record a null value in the set of candidate beam indexes 830. The UE may sort the set of candidate beam indexes 830 in decreasing order of BRSRP.

According to aspects, the base station 802 may determine a number of BSI reports that the UE 804 is to transmit to the base station 802. For example, the base station 802 may communicate with the UE 804 through a second beam 820b, which may be a serving beam. The base station 802 may determine that communication is to occur through a different beam and/or that the base station 802 is to store information indicating alternative (e.g., candidate) beam(s) that may be used for communication with the UE 804 in the future (e.g., in case a serving beam fails, a power and/or quality of a serving beam deteriorates, etc.). Accordingly, the base station 802 may request that the UE 804 send BSI reports to the base station 802.

The base station 802 may determine that zero, one, or more than one (e.g., two or four) BSI reports should be sent to the base station by the UE 804. Therefore, the base station 802 may send, to the UE 804, a message 840 indicating a number X of BSI reports (e.g., zero, one, two, or four) that are to be sent to the base station 802 by the UE 804.

In various aspects, the base station 802 may transmit, to the UE 804, a message 840 requesting BSI reports. In one aspect, the message 840 may be a two-bit message. In one aspect, the message 840 may be included in or indicated by a DCI message. The message 840 may be included in an uplink DCI message or a downlink DCI message. Further, the message 840 may be one of a plurality of DCI formats. In another aspect, the message 840 may be included in a random access response (RAR) message (e.g., the MSG2 412, an uplink grant, etc.). In another aspect, the base station 802 may transmit, to the UE 804, the message 840 via RRC signaling (e.g., the base station 802 may transmit the message 840 as an RRC message).

According to various aspects, the UE 804 may transmit, to the base station 802, a BSI report 842 indicating at least one beam index. In an aspect, the BSI report 842 may be a BSI report that includes a beam index (e.g., a beam index 832) and a corresponding measured signal quality (e.g., the BRSRP 834 measured for a BRS 812a-h received through a beam 820). In an aspect, the UE 804 may transmit the BSI report 842 in response to a message 840 (e.g., request) received from the base station 802.

In the illustrated aspect, the UE 804 may determine a number N of candidate beam indexes (e.g., N may be equal to 4) based on determining BRSRPs 834 for BRSs 812a-h corresponding to beams 820a-h. For example, the UE 804 may measure a third BRSRP 834c for the third BRS 812c corresponding to the third beam 820c, a fourth BRSRP 834d for the fourth BRS 812d corresponding to the fourth beam 820d, a fifth BRSRP 834e for the fifth BRS 812e corresponding to the fifth beam 820e, and a sixth BRSRP 834f for the sixth BRS 812f corresponding to the sixth beam 820f.

The UE 804 may store the BRSRPs 834c-f for the BRSs 812c-f and respective corresponding beam indexes 832c-f in the set of candidate beam indexes 830. The UE 804 may maintain the set of candidate beam indexes 830 by sorting the beam indexes 832c-f based on the corresponding BRSRPs 834c-f. For example, the beam indexes 832c-f may be sorted by the "best" (e.g., highest) corresponding BRSRPs 834c-f. Further to such an example, the fifth BRSRP 834e corresponding to the fifth beam index 832e may be a highest BRSRP and, therefore, stored first in the set of candidate beam indexes 830. The sixth BRSRP 834f corresponding to the sixth beam index 832f may be a second highest BRSRP and, therefore, stored second in the set of candidate beam indexes 830, and so forth.

Based on the message 840 requesting BSI reports, the UE 804 may determine a number X of BSI reports 842 to send to the base station 802. Each BSI report 842 may include at least a beam index (e.g., a beam index 832) and a received power (e.g., a BRSRP 834) associated with a beam 820a-h through which a BRS 812a-h is received.

According to aspects, the UE 804 may determine the number X of BSI reports 842 to send to the base station 802 based on the message 840 requesting the BSI. In one aspect, the number X may be greater than or equal to zero, but less than or equal to the number N of candidate beam indexes maintained by the UE. In an aspect, the UE 804 may determine the number X based on the message 840 by determining the number X based on a type of the message 840. A type of message may be, for example, a DCI message (e.g., a downlink DCI message), an RAR message (e.g., the MSG2 412, an RAR grant, or another uplink grant, etc.), or another type of message.

In one aspect, the UE 804 may determine that the number X of BSI reports 842 to send to the base station 802 is one when the message 840 is a DCI message (e.g., a downlink DCI message). For example, when the UE 804 receives the message 840 in a downlink DCI message, the UE 804 may determine that one BSI report 842 is to be sent to the base station 802.

In one aspect, the base station 802 may include, in the message 840, an indication of a time and/or frequency resource for a channel that is to carry the BSI report 842. Accordingly, the UE 804 may determine a time and/or frequency resource for a channel that is to carry the BSI report 842 based on the message 840.

In an aspect, the UE 804 may determine the channel that is to carry the BSI report 842 based on the message 840 (e.g., the type of the message 840). For example, the UE 804 may determine that a PUCCH (e.g., an enhanced PUCCH (ePUCCH), xPUCCH, etc.) is to carry the BSI report 842 when the message 840 is a DCI message (e.g., a downlink DCI message).

According to one aspect, the UE 804 may determine the number X of BSI reports to send based on the channel that is to carry the BSI reports 842. For example, the UE 804 may determine that the UE 804 is to send the message on a PUCCH (e.g., based on the message 840). Accordingly, the UE 804 may determine that the UE 804 is to send one BSI report 842 on the PUCCH based on the determination that the PUCCH is to carry the BSI report 842.

In an aspect, when the UE 804 determines that the UE 804 is to send one BSI report, the UE 804 may send a BSI report that includes BSI indicating a beam index 832 corresponding to the highest BRSRP 834 in the set of candidate beam indexes 830. For example, the UE 804 may determine that the fifth BRS 812e received through the fifth beam 820e has a highest BRSRP 834e. Therefore, the UE 804 may send one BSI report 842 that includes the fifth beam index 832e corresponding to the fifth beam 820e and further includes the fifth BRSRP 834e corresponding to the fifth beam index 832e.

In another aspect, the UE 804 may determine that the number X of BSI reports 842 to send to the base station 802 is one or more when the message 840 is an RAR message (e.g., the MSG2 412, an uplink grant, etc.). The RAR message may indicate an uplink grant. In another aspect, another uplink grant may be indicated through an uplink DCI message. For example, when the UE 804 receives the message 840 in an RAR message, the UE 804 may determine that one or more BSI reports 842 are to be sent to the base station 802. In another example, when the UE 804 receives the message 840 in an uplink DCI message, the UE 804 may determine that one or more BSI reports 842 are to be sent to the base station 802.

In one aspect, the base station 802 may include, in the message 840, an indication of at least one time and/or frequency resource for a channel that is to carry the BSI reports 842. For example, the UE 804 may transmit a BSI report 842 on one or more uplink resources associated with a connection request message (e.g., the MSG3 414) granted through a contention-based RACH procedure (e.g., granted through an RAR or MSG2 412). Accordingly, the UE 804 may determine at least one time and/or frequency resource for a channel that is to carry the one or more BSI reports 842 based on the message 840.

In an aspect, the UE 804 may determine the channel that is to carry the one or more BSI reports 842 based on the message 840 (e.g., based on the type of the message 840). For example, the UE 804 may determine that a PUSCH (e.g., an enhanced PUSCH (ePUSCH), xPUSCH, etc.) is to carry the BSI reports 842 when the message 840 is included in an RAR message (e.g., the MSG2 412 or an uplink grant, such as an uplink DCI message).

According to one aspect, the UE 804 may determine the number X of BSI reports to send based on the channel that is to carry the BSI reports 842. For example, the UE 804 may determine that the UE 804 is to send the message on a PUSCH (e.g., based on the message 840). Accordingly, the UE 804 may determine that the UE 804 is to send more than one (e.g., two) BSI reports 842 on the PUSCH based on the determination that the PUSCH is to carry the BSI reports 842.

In one aspect, the base station 802 may include, in the message 840, an indication of the number X of BSI reports 842 to be sent. For example, the UE 804 may determine whether to send one, two, or four BSI reports 842 based on an indication of the number X included in the message 840. For example, when the message 840 is included in an uplink DCI message, the uplink DCI message may indicate that zero, two, or four BSI reports are to be sent.

In an aspect, when the UE 804 determines the number X of BSI reports 842 to send, the UE 804 may send X BSI reports 842 for the X beam indexes 832 corresponding to the X highest BRSRPs 834 in the set of candidate beam indexes 830. For example, the UE 804 may determine, based on the message 840, that four BSI reports 842 are requested by the base station 802. Accordingly, the UE 804 may determine that the fifth BRS 812e received through the fifth beam 820e has a highest BRSRP 834e, the sixth BRS 812f received through the sixth beam 820f has a second highest BRSRP 834f, the fourth BRS 812d received through the fourth beam 820d has a third highest BRSRP 834d, and the third BRS 812c received through the third beam 820c has a fourth highest BRSRP 834c. Therefore, the UE 804 may send four BSI reports 842: a first of which may include the fifth beam index 832e and the fifth BRSRP 834e, a second of which may include the sixth beam index 832f and the sixth BRSRP 834f, a third of which may include the fourth beam index 832d and the fourth BRSRP 834d, and a fourth of which may include the third beam index 832c and the third BRSRP 834c. In an aspect, the BSI reports 842 may be sorted in decreasing order of BRSRP 834.

The base station 802 may receive the one or more BSI reports 842. Based on the BSI reports 842, the base station 802 may select a beam 820a-h with which to communicate with the UE 804. For example, the base station 802 may select the fifth beam 820e corresponding to the fifth beam index 832e having the highest BRSRP 834e, as indicated by at least one BSI report 842. In an aspect, the base station 802 may select another beam (e.g., the sixth beam 820f) based on the BSI reports 842, for example, if communication through the selected beam (e.g., the fifth beam 820e) fails.

Figure 9:
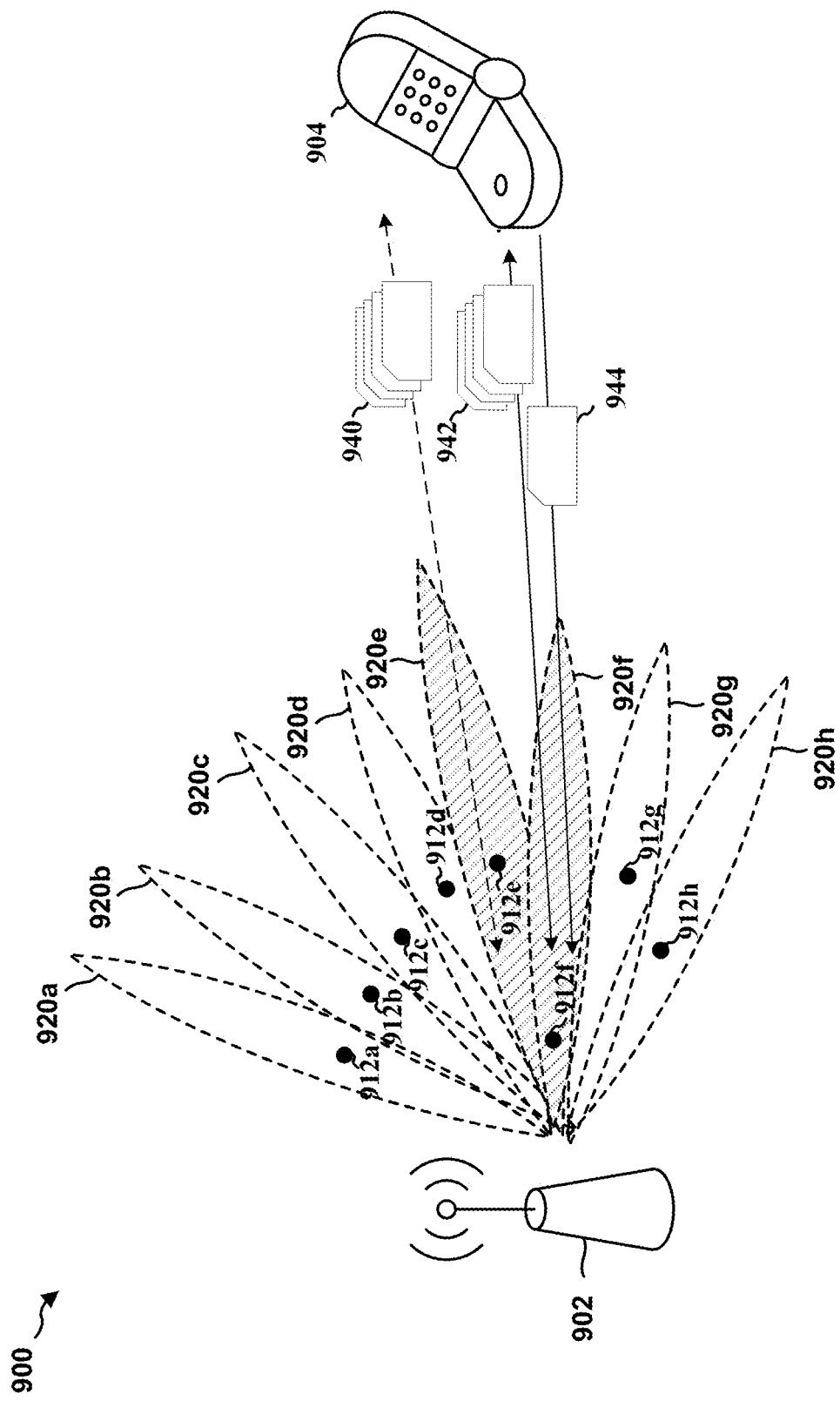
FIG. 9 is a diagram of a wireless communications system.

Turning to FIG. 9, a diagram of a wireless communications system 900 is illustrated. The base station 902 may be an aspect of the base station 802, the base station 702, the base station 602, the base station 502, the base station 310, the base station 102, the mmW base station 180, and/or another base station. The UE 904 may be an aspect of the UE 804, the UE 704, the UE 604, the UE 504, the UE 350, the UE 104, the UE 182, and/or another UE.

In the illustrated aspect, the base station 902 may include up to 8 antenna ports for BRS transmission. In various aspects, the base station 902 may send, to the UE 904, one or more BRSs 912a-h (e.g., as described with respect to FIGS. 5A-5G, FIG. 6, FIG. 7, and/or FIG. 8). Each BRS 912a-h may be communicated through a respective beam 920a-h. For example, the base station 902 may send a first BRS 912a through the first beam 920a with which the first BRS 912a is associated. The UE 904 may track one or more beams 920a-h through periodically measuring a BRS 912a-h associated with a respective one of the beams 920a-h. In an aspect, the transmission period of the BRSs 912a-h may be configured by an indicator on a PBCH, such as an ePBCH. The transmission period may be associated with the time to sweep the beams 920a-h through which the BRS 912a-h is transmitted.

In aspects, the UE 904 may receive, through the set of beams 920a-h, a set of BRSs 912a-h. Each BRS 912a-h may correspond to a beam index that corresponds to the beam 920a-h through which the BRS 912a-h is sent. The UE 904 may measure a signal quality of each BRS 912a-h, and each measured signal quality may correspond to a beam 920a-h of the set of beams. For example, the UE 904 may measure the signal qualities of the third BRS 912c, the fourth BRS 912d, the fifth BRS 912e, and the sixth BRS 912f, which respectively correspond to the third beam 920c, the fourth beam 920d, the fifth beam 920e, and the sixth beam 920f. In aspects, the UE 904 may not receive each of the BRSs 912a-h.

In one aspect, the UE 904 may measure the signal quality by determining a received power. In one aspect, the signal quality may correspond to a BRSRP. For example, the UE 904 may measure the BRSRP in dB and/or dBm. In other aspects, the UE 904 may measure the signal quality as another value, such as a RQ, an SIR, a SINR, a RSRP, a RSRQ, a RSSI, or another metric.

In an aspect, the UE 904 may select a beam 920a-h for communication with the base station 902. For example, the UE 904 may select the fifth beam 920e. The UE 904 may select this fifth beam 920e for one or both of uplink and/or downlink communication. The UE 904 may select the fifth beam 920e based on a signal quality measured for the fifth BRS 912e and/or based on resource information (e.g., time and/or frequency resource information, which may be broadcast by the base station 902 as system information). The UE 904 may select the fifth beam 920e because the UE 904 may anticipate or estimate that the base station 902 may communicate with the UE 904 through the fifth beam 920e, for example, based on the signal quality measured for the fifth BRS 912e corresponding to the fifth beam 920e and/or resource information (e.g., time and/or frequency resource information, which may indicate a time (e.g., subframe) and/or frequency).

The UE 904 may attempt a RACH procedure (e.g., the first RACH procedure 940, the second RACH procedure 942, etc.). A RACH procedure may include various operations described with respect to FIG. 4A or 4B. For example, the UE 904 may attempt a RACH procedure (e.g., a contention-based RACH procedure) by transmitting one or more RACH messages, such as a random access preamble (e.g., the MSG1 410). The UE 904 may be still attempting the RACH procedure when transmitting another RACH message, such as a connection request (e.g., the MSG3 414) in response to an RAR (e.g., the MSG2 412).

The UE 904 may determine the attempted RACH procedure has failed when the UE 904 fails to receive and/or decode a contention resolution message (e.g., the MSG4 416) during the attempted RACH procedure. By extension, the UE 904 would determine that an attempted RACH procedure has failed when the UE 904 fails to receive an RAR (e.g., the MSG2 412) because the UE 904 would neither send a connection request (e.g., the MSG 413) nor receive a contention resolution message (e.g., the MSG4 416) during the attempted RACH procedure. In an aspect, the UE 904 may determine a RACH procedure is successfully completed when the UE 904 receives a contention resolution message (e.g., the MSG4 416), when the UE acquires a cell RNTI (C-RNTI) (e.g., based on the contention resolution message), when the UE 904 receives and decodes an RRC connection setup message, and/or when the UE 904 is synchronized with the network after the RACH procedure.

In an aspect, the UE 904 may attempt a first RACH procedure 940 with the base station 902 through the selected fifth beam 920e. For example, the UE 904 may send a random access preamble (e.g., the MSG1 410) through the selected fifth beam 920e. However, the UE 904 may determine that the first RACH procedure 940 has failed. For example, the UE 904 may fail to receive an RAR (e.g., the MSG2 412) or a contention resolution message (e.g., the MSG4 416).

Based on the attempted first RACH procedure 940, the UE 904 may determine information indicating that the first RACH procedure 940 failed. The UE 904 may store this determined information. In one aspect, the information indicating that the first RACH procedure 940 failed may include information associated with the selected fifth beam 920e, such as a beam index corresponding to the selected fifth beam 920e and/or a signal quality (e.g., a BRSRP) measured for the fifth BRS 912e received through the fifth beam 920e. In another aspect, the information indicating that the first RACH procedure 940 failed may include an indication of a subframe and/or symbol (e.g., a subframe index and/or a symbol index) during which a RACH message (e.g., a random access preamble or the MSG1 410) is sent through the selected fifth beam 920e.

According to aspects, the UE 904 may attempt a second RACH procedure 942 after the determination that the first RACH procedure 940 has failed. The UE 904 may determine that the second RACH procedure 942 is successful. For example, the UE 904 may successfully send a random access preamble (e.g., the MSG1 410) to the base station 402. The UE 904 may then successfully receive an RAR (e.g., the MSG2 412) from the base station 402 based on the random access preamble. The UE 904 may then successfully send a connection request message (e.g., the MSG3 414) to the base station 402 based on the RAR. The UE 904 may then successfully receive a contention resolution message (e.g., the MSG4 416) from the base station based on the connection request message. The UE 904 may be synchronized with a network that includes the base station 902 based on the successful second RACH procedure 942.

In one aspect, the UE 904 may attempt the second RACH procedure 942 by increasing a transmission power after the determination that the first RACH procedure 940 failed. When the UE 904 performs the second RACH procedure 942, the UE 904 may perform at least a portion of the second RACH procedure 942 with the increased transmission power. For example, the UE 904 may send the random access preamble (e.g., the MSG1 410) with the increased transmission power during the second RACH procedure 942.

In another aspect, the UE 904 may attempt the second RACH procedure 942 by selecting a new beam for communication with the base station 902 after the determination that the first RACH procedure 940 failed. For example, the UE 904 may select the sixth beam 920f. In an aspect, the UE 904 may select the new sixth beam 920f based on a signal quality measured for the sixth BRS 912f. In one aspect, the UE 904 may select the new sixth beam 920f based on resource information (e.g., at least one time and/or frequency resource, which may be broadcast by the base station 902). The UE 904 may perform at least a portion of the second RACH procedure 942 with the base station 902 through the new sixth beam 920f. For example, the UE 904 may send a random access preamble (e.g., the MSG1 410) through the new sixth beam 920f.

According to various aspects, the UE 904 may send, to the base station 902, information 944 indicating that the first RACH procedure 940 failed. The information 944 may include the information determined by the UE 904, such as a beam index corresponding to the selected fifth beam 920e, a signal quality measured for the fifth BRS 912e, a subframe index at which the UE 904 used the selected fifth beam 920e, a symbol index at which the UE 904 used the selected fifth beam 920e, etc.

In one aspect, the UE 904 may send the information 944 in a BSI report (e.g., a BSI report 842). The information 944 may indicate the beam index corresponding to the selected fifth beam 920e through which the first RACH procedure 940 failed. In the context of FIG. 8, the UE 904 may send a BSI report 842 including the fifth beam index 832e corresponding to the selected fifth beam 820e/920e, and may send the information 944 indicating that the first RACH procedure 940 failed using the selected fifth beam 820e/920e. For example, the base station 902 may trigger BSI reporting by the UE 904 using a message 840 that is an RAR message received during the second RACH procedure 942. In response, the UE 904 may sent a BSI report 842 that includes the fifth beam index 832e (and the fifth BRSRP 834e), but may indicate that the first RACH procedure 940 failed using the selected fifth beam 820e/920e corresponding to the fifth beam index 832e.

According to an aspect, the UE 904 may exclude a beam index corresponding to the selected fifth beam 920e from a set of candidate beam indexes. In the context of FIG. 6, for example, the UE 904 may exclude the fifth beam index corresponding to the fifth beam 620e/920e from the set of candidate beam indexes 630. The UE 904 may include another beam index corresponding to another beam 920a-h in the set of candidate beam indexes 630, for example, if a BRSRP is measured for another BRS 912a-h corresponding to another beam 920a-h.

In various aspects, the base station 902 may receive the information 944 indicating that the first RACH procedure 940 failed and may use this information 944 for communication with the UE 904. In one aspect, the base station 902 may schedule uplink or downlink communication with the UE 904 through different beams (e.g., the new sixth beam 920f), for example, when uplink/downlink reciprocity through one or more beams is unattainable for communication with the UE 904. For example, the base station 902 may determine a different beam index corresponding to a different beam than the beam index associated with the failed RACH procedure 940 for uplink or downlink communication with the UE 904. In another aspect, the base station 902 may exclude a beam index indicated by the information 944 from a set of candidate beam indexes associated with uplink or downlink communication with the UE 904.

While FIG. 9 illustrates one failed RACH procedure 940, similar operations may be performed when a plurality of RACH procedures fails. Accordingly, the UE 904 may send, to the base station 902, information similar to the information 944 indicating that each RACH procedure failed. For example, the UE 904 may send a respective beam index for each beam used for each failed RACH procedure.

Figure 10:
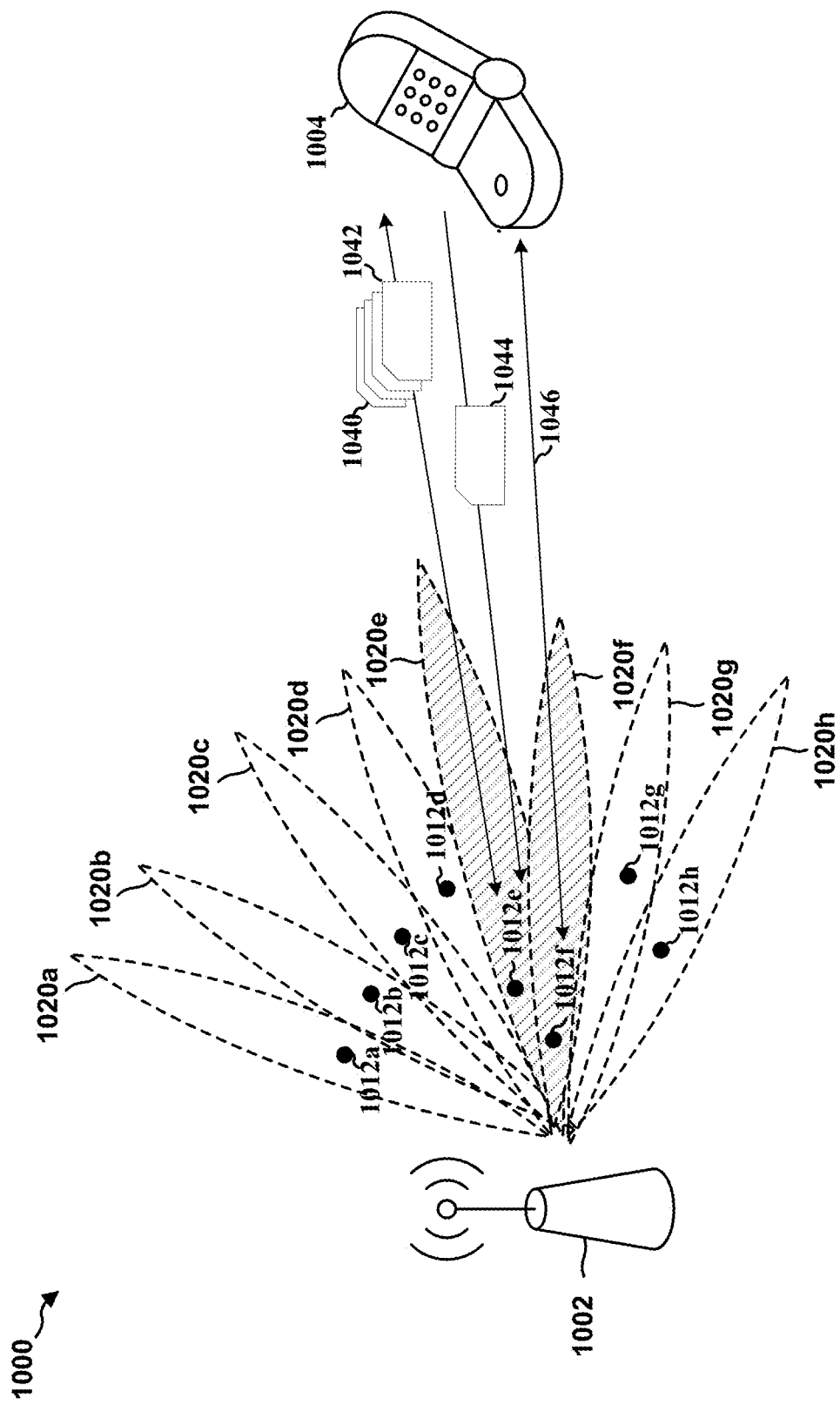
FIG. 10 is a diagram of a wireless communications system.

FIG. 10 illustrates an aspect of a wireless communications system 1000, according to various aspects. The base station 1002 may be an aspect of the base station 902, the base station 802, the base station 702, the base station 602, the base station 502, the base station 310, the base station 102, the mmW base station 180, and/or another base station. The UE 1004 may be an aspect of the UE 904, UE 804, the UE 704, the UE 604, the UE 504, the UE 350, the UE 104, the UE 182, and/or another UE.

In the illustrated aspect, the base station 1002 may include up to 8 antenna ports for BRS transmission. In various aspects, the base station 1002 may send, to the UE 1004, one or more BRSs 1012a-h (e.g., as described with respect to FIGS. 5A-5G, FIG. 6, FIG. 7, and/or FIG. 8). Each BRS 1012a-h may be communicated through a respective beam 1020a-h. For example, the base station 1002 may send a first BRS 1012a through the first beam 1020a with which the first BRS 1012a is associated. The UE 1004 may track one or more beams 1020a-h through periodically measuring a BRS 1012a-h associated with a respective one of the beams 1020a-h. In an aspect, the transmission period of the BRSs 1012a-h may be configured by an indicator on a PBCH, such as an ePBCH. The transmission period may be associated with the time to sweep the beams 1020a-h through which the BRS 1012a-h is transmitted.

In aspects, the UE 1004 may receive, through the set of beams 1020a-h, a set of BRSs 1012a-h. Each BRS 1012a-h may be associated with a beam index that corresponds to the beam 1020a-h through which the BRS 1012a-h is sent. The UE 1004 may measure a signal quality of each BRS 1012a-h, and each measured signal quality may correspond to a beam 1020a-h of the set of beams. For example, the UE 1004 may measure the signal qualities of the third BRS 1012c, the fourth BRS 1012d, the fifth BRS 1012e, and the sixth BRS 1012f, which respectively correspond to the third beam 1020c, the fourth beam 1020d, the fifth beam 1020e, and the sixth beam 1020f. In aspects, the UE 1004 may not receive each of the BRSs 1012a-h.

In one aspect, the UE 1004 may measure the signal quality by determining a received power. In one aspect, the signal quality may correspond to a BRSRP. For example, the UE 1004 may measure the BRSRP in dB and/or dBm. In other aspects, the UE 1004 may measure the signal quality as another value, such as a RQ, an SIR, a SINR, a RSRP, a RSRQ, a RSSI, or another metric.

In an aspect, the UE 1004 may attempt a RACH procedure 1040 with the base station 1002 through a fifth beam 1020e. For example, the UE 1004 may send a random access preamble (e.g., the MSG1 410) through the fifth beam 1020e, the base station 1002 may send an RAR (e.g., the MSG2 412) to the UE 1004 based on the random access preamble, and the UE 1004 may send a connection request message (e.g., the MSG3 414) to the base station 1002 based on the RAR.

The base station 1002 may determine that communication with the UE 1004 is to occur through a serving beam of the beams 1020a-h. For example, the base station 1002 may select the sixth beam 1020f, which may be different than the beam through which at least a portion of the RACH procedure 1040 occurs. Therefore, the base station 1002 may determine that the base station 1002 is to inform the UE 1004 of the beam index corresponding to sixth beam 1020f, for example, by sending a beam modification command to the UE 1004.

The beam modification command may include at least a beam index corresponding to a respective one of the beams 1020a-h. In various aspects, the base station 1002 may include the beam modification command in a contention resolution message 1042 (e.g., the MSG4 416), which may be in response to a connection request message (e.g., the MSG3 414) received from the UE 1004 during the RACH procedure 1040. In other words, the base station 1002 may include, in a contention resolution message 1042, an indication of at least a beam index corresponding to one of the beams 1020a-h through which communication between the base station 1002 and the UE 1004 is to occur.

Because the contention resolution message 1042 may be received by more than one UE, the base station 1002 may indicate that the beam modification command included in the contention resolution message 1042 is applicable to the UE 1004. In one aspect, the base station 1002 may indicate that the beam modification command included in the contention resolution message 1042 is applicable to the UE 1004 by scrambling at least a portion of the contention resolution message using an RNTI associated with the UE 1004 (e.g., an RNTI determined during a portion of the RACH procedure 1040).

In one aspect, the beam modification command included in the contention resolution message 1042 may include an indication of one or more channels to which the beam modification command is applicable. For example, the base station 1002 may determine that communication with the UE 1004 is to occur through the sixth beam 1020f for one or more uplink channels or one or more downlink channels. Therefore, the base station 1002 may indicate, in the contention resolution message 1042, that the beam modification command included in the contention resolution message 1042 is applicable to one or more channels.

The UE 1004 may receive the contention resolution message 1042, for example, during the RACH procedure 1040. As described, the contention resolution message 1042 may include at least a beam index corresponding to a beam (e.g., a beam modification command).

The UE 1004 may determine whether the beam index is applicable to the UE 1004.

That is, the UE 1004 may determine whether the base station 1002 is instructing the UE 1004 to communicate with the base station 1002 through another beam, such as the sixth beam 1020f. In one aspect, the UE 1004 may determine whether the beam index is applicable to the UE by attempting to decode the contention resolution message 1042 based on an RNTI associated with the UE 1004. If the UE 1004 is able to successfully decode the contention resolution message 1042 based on the RNTI associated with the UE 1004, the UE 1004 may determine that the beam modification command indicated by the contention resolution message 1042 is applicable to the UE 1004.

The UE 1004 may provide ACK/NACK information to the base station 1002 based on the contention resolution message 1042, for example, in order to indicate that the UE 1004 acknowledges the beam modification command. In an aspect, the UE 1004 may transmit, to the base station 1002, an acknowledgment message 1044 based on a determination that the beam modification command included in the contention resolution message 1042 is applicable to the UE 1004. In an aspect, the UE 1004 may transmit the acknowledgment message 1044 through the current beam (e.g., the fifth beam 1020e).

In one aspect, the UE 1004 may refrain from transmitting a non-acknowledgment message to the base station 1002 based on a determination that the beam modification command included in the contention resolution message 1042 is inapplicable to the UE 1004. For example, if the UE 1004 is unable to decode the contention resolution message 1042 based on an RNTI associated with the UE 1004, then the UE 1004 may take no action.

The base station 1002 may determine whether an acknowledgment message is received from the UE 1004 in response to the contention resolution message 1042. If the base station 1002 determines that an acknowledgment message is unreceived (e.g., absent for a predetermined period of time), the base station 1002 may take no action. For example, the base station 1002 may continue communication with the UE 1004 through a current serving beam, such as the fifth beam 1020e.

When the base station 1002 receives the acknowledgment message 1044 from the UE 1004, the base station 1002 may determine that an acknowledgment message is received from the UE 1004 and the UE 1004 has been informed of the beam modification command. Accordingly, the base station 1002 may communicate 1046 through the beam (e.g., the sixth beam 1020f) corresponding to the beam index indicated by the beam modification command included in the contention resolution message 1042.

Correspondingly, when the UE 1004 determines that the beam modification command is applicable to the UE 1004, the UE 1004 may communicate 1046 with the base station through the beam (e.g., the sixth beam 1020f) corresponding to the beam index indicated by the beam modification command included in the contention resolution message 1042. Because the beam modification command may include an indication of one or more channels to which the beam modification command is applicable, the UE 1004 may communicate 1046 with the base station 1002 on the one or more channels indicated by the beam modification command through the beam (e.g., the sixth beam 1020f) corresponding to the beam index indicated by the beam modification command (e.g., other communication on other channels may occur through another beam, such as the current serving fifth beam 1020e).

Figure 11:
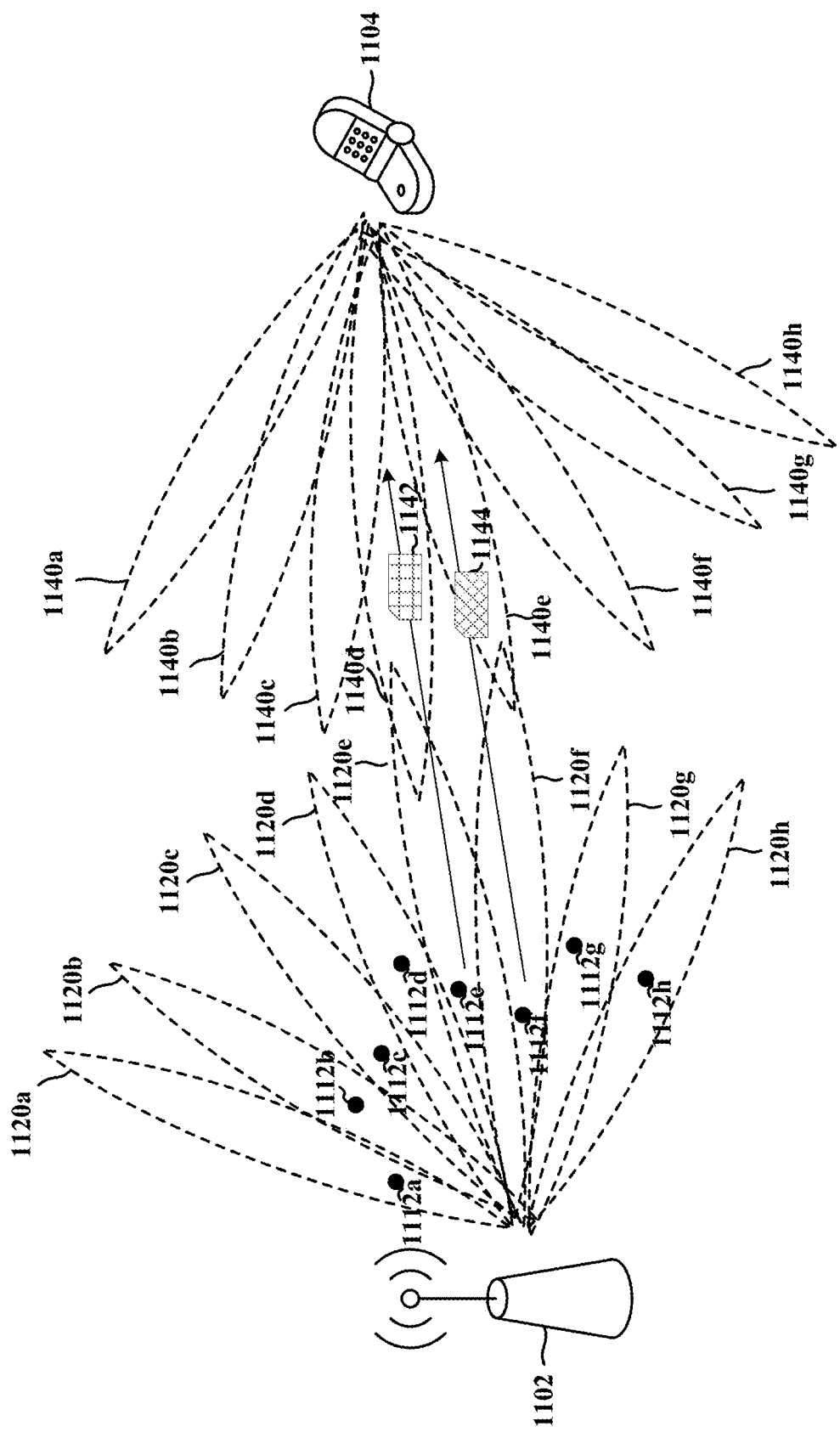
FIG. 11 is a diagram of a wireless communications system.

FIG. 11 illustrates an aspect of a wireless communications system 1100, according to various aspects. The base station 1102 may be an aspect of the base station 1002, the base station 902, the base station 802, the base station 702, the base station 602, the base station 502, the base station 310, the base station 102, the mmW base station 180, and/or another base station. The UE 1004 may be an aspect of the UE 1004, the UE 904, UE 804, the UE 704, the UE 604, the UE 504, the UE 350, the UE 104, the UE 182, and/or another UE.

In the illustrated aspect, the base station 1102 may include up to 8 antenna ports for BRS transmission. In various aspects, the base station 1102 may send, to the UE 1104, one or more BRSs 1112a-h (e.g., as described with respect to FIGS. 5A-5G, FIG. 6, FIG. 7, and/or FIG. 8). Each BRS 1112a-h may be communicated through a respective beam 1120a-h. For example, the base station 1102 may send a first BRS 1112a through the first beam 1120a with which the first BRS 1112a is associated. The UE 1104 may track one or more beams 1120a-h through periodically measuring a BRS 1112a-h associated with a respective one of the beams 1120*a-h*. In an aspect, the transmission period of the BRSs 1112*a-h* may be configured by an indicator on a PBCH, such as an ePBCH. The transmission period may be associated with the time to sweep the beams 1120*a-h* through which the BRS 1112*a-h* is transmitted.

In aspects, the UE 1104 may receive, through the set of transmit beams 1120*a-h*, a set of BRSs 1112*a-h*. Each BRS 1112*a-h* may be associated with a beam index that corresponds to the beam 1120*a-h* through which the BRS 1112*a-h* is sent. The UE 1104 may measure a signal quality of each BRS 1112*a-h*, and each measured signal quality may correspond to a beam 1120*a-h* of the set of beams. For example, the UE 1104 may measure the signal qualities of the third BRS 1112*c*, the fourth BRS 1112*d*, the fifth BRS 1112*e*, and the sixth BRS 1112*f*, which respectively correspond to the third beam 1120*c*, the fourth beam 1120*d*, the fifth beam 1120*e*, and the sixth beam 1120*f*. In aspects, the UE 1104 may not receive each of the BRSs 1112*a-h*.

In one aspect, the UE 1104 may measure the signal quality by determining a received power. In one aspect, the signal quality may correspond to a BRSRP. For example, the UE 1104 may measure the BRSRP in dB and/or dBm. In other aspects, the UE 1104 may measure the signal quality as another value, such as a RQ, an SIR, a SINR, a RSRP, a RSRQ, a RSSI, or another metric.

In one aspect, the UE 1104 may receive the set of BRSs 1112*a-h* through a set of receive beams 1140*a-h* at the UE 1104. For example, a sixth transmit beam 1120*f* may intersect a fifth receive beam 1140*e*. Therefore, a signal sent by the base station 1102 may be transmitted through a sixth transmit beam 1120*f* and received through a fifth receive beam 1140*e*.

The UE 1104 may not actively maintain all the beams 1140*a-h* simultaneously. In various aspects, the UE 1104 may be configured to generate one or more of the beams 1140*a-h*, for example, based on determination that the UE 1104 may receive a signal through one or more of the receive beams 1140*a-h*. Additionally, the base station 1102 and the UE 1104 may not have an equal number of beams—e.g., the UE 1104 may have fewer than eight beams for communication with the base station 1102.

In an aspect, the UE 1104 may receive a beam modification command 1142 from the base station 1102. For example, the UE 1104 may receive one or more BRSs 1112*a-h* from the base station 1102. The UE 1104 may determine (e.g., select or generate) a receive beam of the set of receive beams 1140*a-h* through which the UE 1104 may expect to receive signals from the base station 1102. For example, the UE 1104 may determine the fourth receive beam 1140*d* through which the UE 1104 may receive signals from the base station 1102. The UE 1104 may receive the beam modification command 1142 from the base station 1102, for example, through the fifth transmit beam 1120*e* and the fourth receive beam 1140*d*.

In an aspect, the beam modification command 1142 may indicate a set of transmit beam indexes corresponding to a set of the transmit beams 1120*a-h* of the base station 1102. For example, the beam modification command 1142 may indicate at least a sixth beam index corresponding to a sixth transmit beam 1120*f* of the base station 1102. The transmit beam index may indicate at least a transmit direction for transmitting a beam by the base station 1102.

In one aspect, the beam modification command 1142 may be received in a MAC CE. In another aspect, the beam modification command 1142 may be received in a DCI message. In another aspect, the beam modification command 1142 may be received via RRC signaling. In one aspect, the beam modification command 1142 may be carried on PDCCH.

The UE 1104 may determine the set of transmit beam indexes indicated by the beam modification command 1142. For example, the UE 1104 may determine that the beam modification command 1142 indicates at least a sixth beam index corresponding to a sixth transmit beam 1120*f* of the base station 1102.

Based on the determined set of transmit beams, the UE 1104 may determine a set of receive beam indexes corresponding to the receive beams 1140*a-h* of the UE 1104. Each receive beam index may indicate at least a receive direction for receiving a receive beam of the receive beams 1140*a-h* by the UE 1104. For example, the UE 1104 may determine at least a fifth receive beam index corresponding to a fifth receive beam 1140*e* of the UE 1104.

The UE 1104 may determine the set of receive beam indexes based on the determined set of transmit beams indicated by beam modification command 1142 in any suitable approach. For example, the UE 1104 may maintain a mapping that maps transmit beam indexes corresponding to transmit beams 1120*a-h* to receive beam indexes corresponding to receive beams 1120*a-h*.

In one aspect, the UE 1104 may be configured to populate the mapping based on reception of the set of BRSs 1112*a-h*. For example, the UE 1104 may receive a sixth BRS 1112*f* through a sixth transmit beam 1120*f* of the base station 1102. The UE 1104 may determine that the sixth BRS 1112*f* is received through a fifth receive beam 1140*e*. Accordingly, the UE 1104 may map maintain a mapping that indicates the sixth transmit beam index corresponding to the sixth transmit beam 1120*f* is mapped to the fifth receive beam index corresponding to the fifth receive beam 1140*e*.

Thus, when the UE 1104 receives the beam modification command 1142, the UE 1104 may determine at least one of the receive beams 1140*a-h* of the UE 1104 through which the UE 1104 may receive signals from the base station 1102 without the base station 1102 explicitly signaling a receive beam to the UE 1104 (e.g., the base station 1102 may elicit the appropriate receive beams 1140*a-h* of the UE 1104 by indicating beam indexes of transmit beams 1120*a-h* to the UE 1104). For example, the UE 1104 may determine a set of receive beam indexes that correspond to the transmit beam indexes indicated by the beam modification command 1142.

In an aspect, the UE 1104 may receive communication from the base station 1102 based on a receive beam corresponding to a receive beam index, which may be determined based on the beam modification command 1142. For example, the UE 1104 may determine that communication from the base station 1102 may be received through the fifth receive beam 1140*e* based on a transmit beam index corresponding to the sixth transmit beam 1120*f* indicated by the beam modification command 1142. In one aspect, the UE 1104 may generate the fifth receive beam 1140*e*, for example, if the fifth receive beam 1140*e* is inactive.

The UE 1104 may receive, from the base station 1102, a BRRS 1144 through the at least one receive beam determined based on the beam modification command 1142. For example, the UE 1104 may determine a fifth receive beam index corresponding to the fifth receive beam 1140*e*, and the UE 1104 may receive the BRRS 1144 through the fifth receive beam 1140*e*.

In an aspect, the BRRS 1144 may be used for beam refinement for communication—e.g., the BRRS may be used by the UE 1104 and the base station 1102 in order to determine a "fine" beam pair (e.g., the beam pair of transmit beam 1120*f* and receive beam 1140*e*) for communication between the UE 1104 and the base station 1102. The BRRS 1144 may span 1, 2, 5 or 10 OFDM symbols and may be associated with a BRRS resource allocation, BRRS process indication, and/or a beam refinement process configuration. For example, as described in FIGS. 5A-G, the UE 1104 may report BRI for beam refinement based on reception of a BRRS.

In one aspect, the UE 1104 may receive the BRRS 1144 in one or more symbols corresponding to one or more respective symbol indexes. For example, one or more symbol indexes may be predetermined (e.g., defined by one or more standards promulgated by 3GPP), and the UE 1104 may have those predetermined symbol indexes stored therein. Accordingly, the UE 1104 may receive the BRRS 1144 at those symbol indexes.

In another aspect, the beam modification command 1142 may indicate one or more symbol indexes in which the BRRS 1144 is to be received. For example, the beam modification command 1142 may indicate that the BRRS 1144 is carried in a fourth symbol of a subframe through a sixth transmit beam 1120*f*. Accordingly, the UE 1104 may determine that the UE 1104 is to receive at least a portion of the BRRS 1144 using a fifth receive beam 1140*e* during a fourth symbol of a subframe (e.g., the UE 1104 may actively receive or listen through the fifth receive beam 1140*e* during a fourth symbol of a subframe).

In one aspect, the UE 1104 may receive different portions of the BRRS 1144 through different receive beams. For example, the UE may receive a first portion of the BRRS 1144 (e.g., the first symbol or first 5 symbols) of the BRRS 1144 through the fifth receive beam 1140*e* determined based on the beam modification command 1142, and may receive a second portion of the BRRS 1144 (e.g., the second symbol or next 5 symbols) of the BRRS 1144 through the sixth receive beam 1140*f*, which may also be determined based on the beam modification command 1142 (e.g., included in the set of receive beam indexes determined based on the beam modification command).

In an aspect, the UE 1104 may determine symbol indexes corresponding to symbols of the BRRS 1144 and receive beam indexes corresponding to those symbol indexes. For example, the beam modification command 1142 may indicate a first set of transmit beam indexes corresponding to the fifth transmit beam 1120*e* and the sixth transmit beam 1120*f*. The UE 1104 may determine (e.g., based on the beam modification command 1142 and/or based on predetermined symbol indexes) that a first portion of the BRRS 1144 is to be received through the fifth transmit beam 1120*e* and a second portion of the BRRS 1144 is to be received through the sixth transmit 1120*f*. The UE 1104 may determine the fourth receive beam 1140*d* and the fifth receive beam 1140*e* respectively corresponding to the transmit beam indexes for the fifth transmit beam 1120*e* and the sixth transmit beam 1120*f*. Accordingly, the UE 1104 may receive a first portion of the BRRS 1144 (e.g., the first symbol or first 5 symbols) through the fourth receive beam 1140*d* and receive a second portion of the BRRS 1144 (e.g., the next symbol or next 5 symbols) through the fifth receive beam 1140*e*.

In an aspect, the UE 1104 may receive the BRRS 1144 through the set of transmit beams of the base station 1102 corresponding to the set of transmit beam indexes indicated by the beam modification command 1142 (e.g., through the sixth transmit beam 1120*f*).

In another aspect, the UE 1104 may receive the BRRS 1144 through a different set of transmit beams of the base station than those transmit beams corresponding to the transmit beam indexes indicated by the beam modification command 1142. For example, the UE 1104 may determine to use the fifth receive beam 1140*e* based on a transmit beam index corresponding to the sixth transmit beam 1120*f*, but the BRRS 1144 may be transmitted through the fifth transmit beam 1120*e* (e.g., due to reflection or obstruction).

Figure 12:
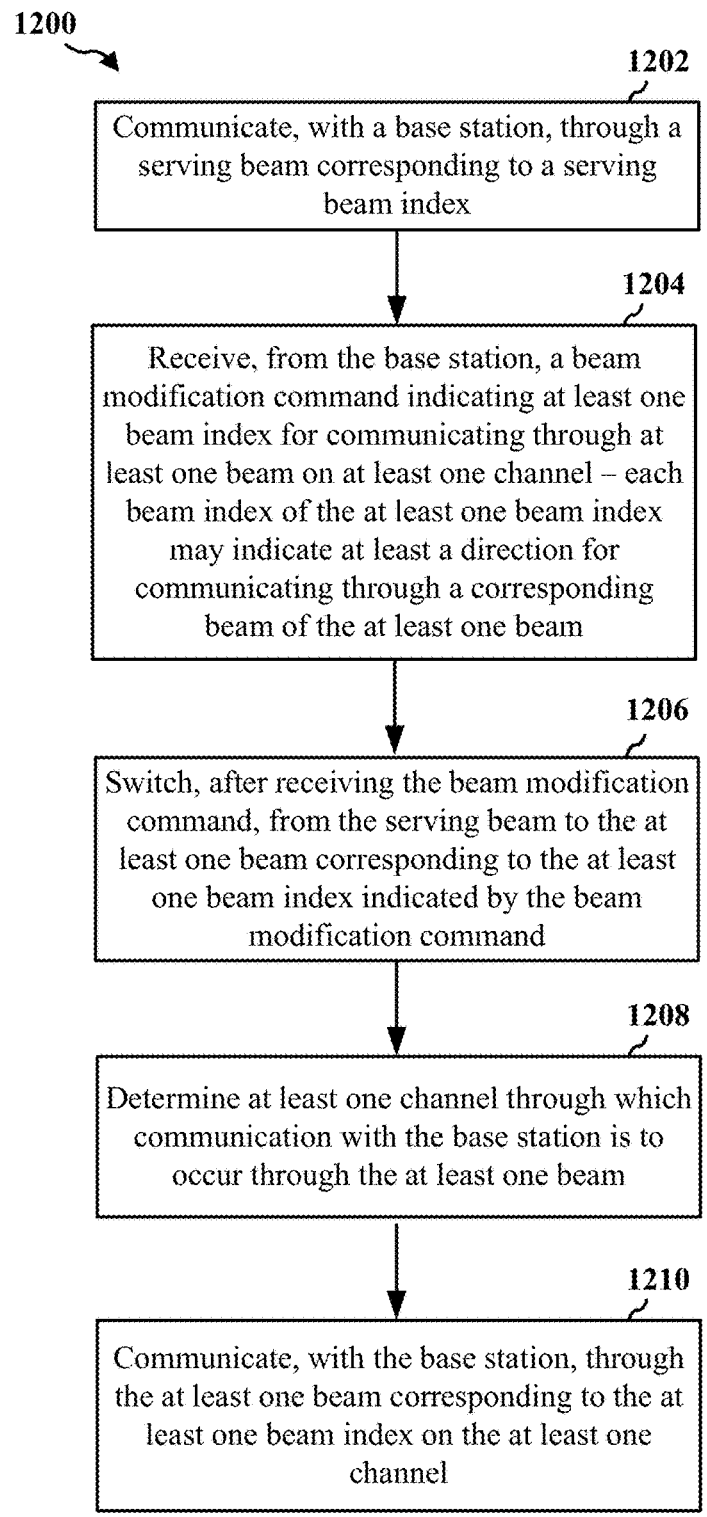
FIG. 12 is a flowchart of a method of wireless communication.

FIG. 12 is a flowchart of a method 1200 of wireless communication. The method 1200 may be performed by a UE, such as the UE 1104, the UE 1004, the UE 904, the UE 804, the UE 704, the UE 604, the UE 504, the UE 404, the UE 350, the UE 104, the UE 182, or another UE. In one aspect, the method 1200 may be performed by an apparatus, such as the apparatus 1902/1902'. One of ordinary skill would understand that one or more operations may be omitted, transposed, and or performed contemporaneously.

At operation 1202, the UE may communicate with a base station through a serving beam corresponding to a serving beam index. For example, the UE may send at least one signal through the serving beam corresponding to the serving beam index. In the context of FIG. 7, the UE 704 may communicate with the base station 702 through the first serving beam 720*e*, which may correspond to a beam index.

At operation 1204, the UE may receive, from the base station, a beam modification command. In aspects, the beam modification command may indicate at least a beam index for communicating through at least one beam on at least one channel. In aspects, each beam index of the at least one beam index indicates at least a direction for communicating through a corresponding beam of the at least one beam. In the context of FIG. 7, the UE 704 may receive, from the base station 702, the beam modification command 710.

In one aspect, the beam modification command is received in a MAC CE. In another aspect, the beam modification command is received in a DCI message. In another aspect, the beam modification command is received via RRC signaling.

According to an aspect, the beam modification command may indicate, for each beam index of the at least one beam index, a corresponding channel. Thus, communication carried on the corresponding channel may occur through the at least one beam corresponding to the at least one beam index indicated by the beam modification command. For example, the beam modification command may indicate that the at least one beam index corresponds to one or more uplink channel(s) and/or one or more downlink channel(s). In one aspect, the UE may determine the corresponding channel based on a DCI format of the DCI message.

In one aspect, the at least one beam index may be a plurality of beam indexes, and the at least one channel may be a plurality of channels. In such an aspect, each beam index of the plurality of beam indexes may be indicated as corresponding to at least one channel of the plurality of channels. In the context of FIG. 7, the UE 704 may receive, from the base station 702, the beam modification command 710 that indicates a channel corresponding to each beam index.

At operation 1206, the UE may switch, after receiving the beam modification command, from the serving beam to the at least one beam corresponding to the at least one beam index indicated by the beam modification command. For example, the UE may select the at least one beam corresponding to the at least one beam index, and the UE may change from the serving beam to the at least one beam for communication with the base station. In the context of FIG. 7, the UE 704 may switch, after receiving the beam modification command 710, from the first serving beam 720*e* to the selected fourth beam 720d, which may correspond to the at least one beam index indicated by the beam modification command 710.

In one aspect, the UE may switch from the serving beam to the at least one beam corresponding to the beam index indicated by the beam modification command at a predetermined time. In one aspect, UE may determine the predetermined time based on the beam modification command. For example, the beam modification command may indicate at least one of a symbol or a subframe at which the UE is to switch from the serving beam to the at least one beam corresponding to the beam index indicated by the beam modification command. In the context of FIG. 7, the UE 704 may switch from the first serving beam 720e to the selected fourth beam 720d at a predetermined time (e.g., a symbol or subframe indicated by the beam modification command 710).

At operation 1208, the UE may determine at least one channel on which communication with the base station is to occur through the at least one beam corresponding to the beam index indicated by the beam modification command. For example, the UE may identify the at least one channel (e.g., based on the beam modification command), and the UE may associate the at least one channel with the at least one beam index. In one aspect, the UE may determine that at least one channel based on a DCI format when the beam modification command is included in a DCI message. In the context of FIG. 7, the UE 704 may determine at least one channel on which communication is to occur through the at least one beam corresponding to the beam index indicated by the beam modification command 710.

At operation 1210, the UE may communicate, with the base station, through the at least one beam corresponding to the beam index indicated by the beam modification command. The UE may communicate with the base station through the at least one beam on at least one channel (e.g., one or more uplink channels or one or more downlink channels). In the context of FIG. 7, the UE 704 may communicate, with the base station 702, through the selected fourth beam 720d corresponding to the at least one beam index indicated by the beam modification command 710. The UE 704 may communicate with the base station 702 through the selected fourth beam 720d on one or more channels (e.g., one or more uplink channels or one or more downlink channels).

Figure 13:
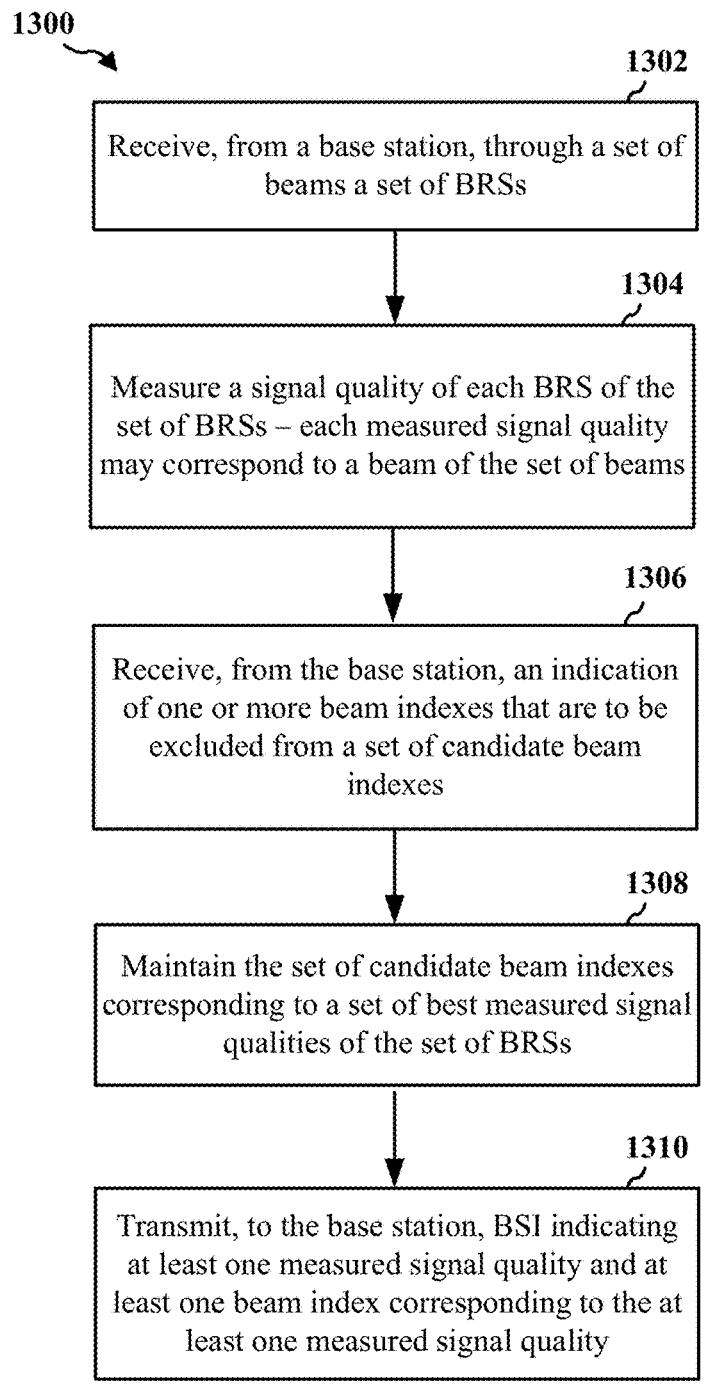
FIG. 13 is a flowchart of a method of wireless communication.

FIG. 13 is a flowchart of a method 1300 of wireless communication. The method 1300 may be performed by a UE, such as the UE 1104, the UE 1004, the UE 904, the UE 804, the UE 704, the UE 604, the UE 504, the UE 404, the UE 350, the UE 104, the UE 182, or another UE. In one aspect, the method 1200 may be performed by an apparatus, such as the apparatus 2102/2102'. One of ordinary skill would understand that one or more operations may be omitted, transposed, and or performed contemporaneously.

At operation 1302, the UE may receive, from a base station, through a set of beams a set of BRSs. In the context of FIG. 6, the UE 604 may receive, from the base station 602, a set of BRSs 612a-h through a set of beams 620a-h. For example, the UE 604 may receive a third BRS 612c through a third beam 620c, a fourth BRS 612d through a fourth beam 620d, a fifth BRS 612e through a fifth beam 620e, and a sixth BRS 612f through a sixth beam 620f.

At operation 1304, the UE may measure a respective signal quality of each BRS of the set of BRSs. For example, the UE may identify a BRS of the set of BRSs, and the UE may measure a signal quality for the identified BRS. As each BRS may correspond to a beam, a signal quality measured for a BRS may also correspond to that beam through which the BRS is received. According to various aspects, the measurement of the signal quality of each BRS of the set of BRSs may include measurement of at least one of a BRSRP, a BRSRQ, an SIR, an SINR, and/or an SNR. In the context of FIG. 6, the UE 604 may measure a respective signal quality for each received BRS of the set of BRSs 612a-h, and a respective signal quality may correspond to a respective beam of the set of beams 620a-h.

At operation 1306, the UE may receive, from the base station, an indication of one or more beam indexes that are to be excluded from a set of candidate beam indexes. In the context of FIG. 6, the UE 604 may receive, from the base station 602, an indication of one or more beam indexes that are to be excluded from a set of candidate beam indexes 630.

At operation 1308, the UE may maintain a set of candidate beam indexes corresponding to a set of best measured signal qualities of the set of BRSs. For example, the UE may identify a beam index and a corresponding measured signal quality, and the UE may store (e.g., in a table or other data structure) the identified beam index in association with the corresponding measured signal quality. With respect to operation 1306, the UE may exclude one or more beam indexes indicated by the base station from the maintained set of candidate beam indexes. In one aspect, the UE may maintain a set of N candidate beam indexes, and N may be predetermined (e.g., stored in the UE, defined by a standard promulgated by 3GPP, etc.). In the context of FIG. 6, the UE 604 may maintain the set of candidate beam indexes 630 corresponding to a set of best measured signal qualities for the set of BRSs 612a-h.

In one aspect, the set of measured signal qualities may be a set of the highest measured signal qualities. In the context of FIG. 6, the set of candidate beam indexes may reflect the highest measured BRSRPs for the received set of BRSs 612c-f corresponding to the set of beams 620c-f.

In one aspect, the set of best measured signal qualities of the set of BRSs may be based on a most recent set of signal qualities of the set of BRSs. In another aspect, the set of best measured signal qualities of the set of BRSs may be based on a filtered set of signal qualities of the set of BRSs. In another aspect, the set of best measured signal qualities of the set of BRSs may be based on a time-averaged set of signal qualities of the set of BRSs. In one aspect, the set of best measured signal qualities may be maintained based on at least one hysteresis criteria for including a beam index in or excluding a beam index from the set of candidate beam indexes.

At operation 1310, the UE may transmit, to the base station, BSI indicating at least one measured signal quality and at least one beam index corresponding to the at least one measured signal quality. In the context of FIG. 6, the UE 604 may transmit, to the base station 602, a BSI report 642 indicating at least one beam index. In an aspect, the BSI report 642 may be a BSI report that includes a beam index and a corresponding measured signal quality (e.g., the BRSRP measured for a BRS 612a-h received through a beam 620a-h). In an aspect, the UE 604 may transmit the BSI report 642 in response to a request 640 received from the base station 602.

Figure 14:
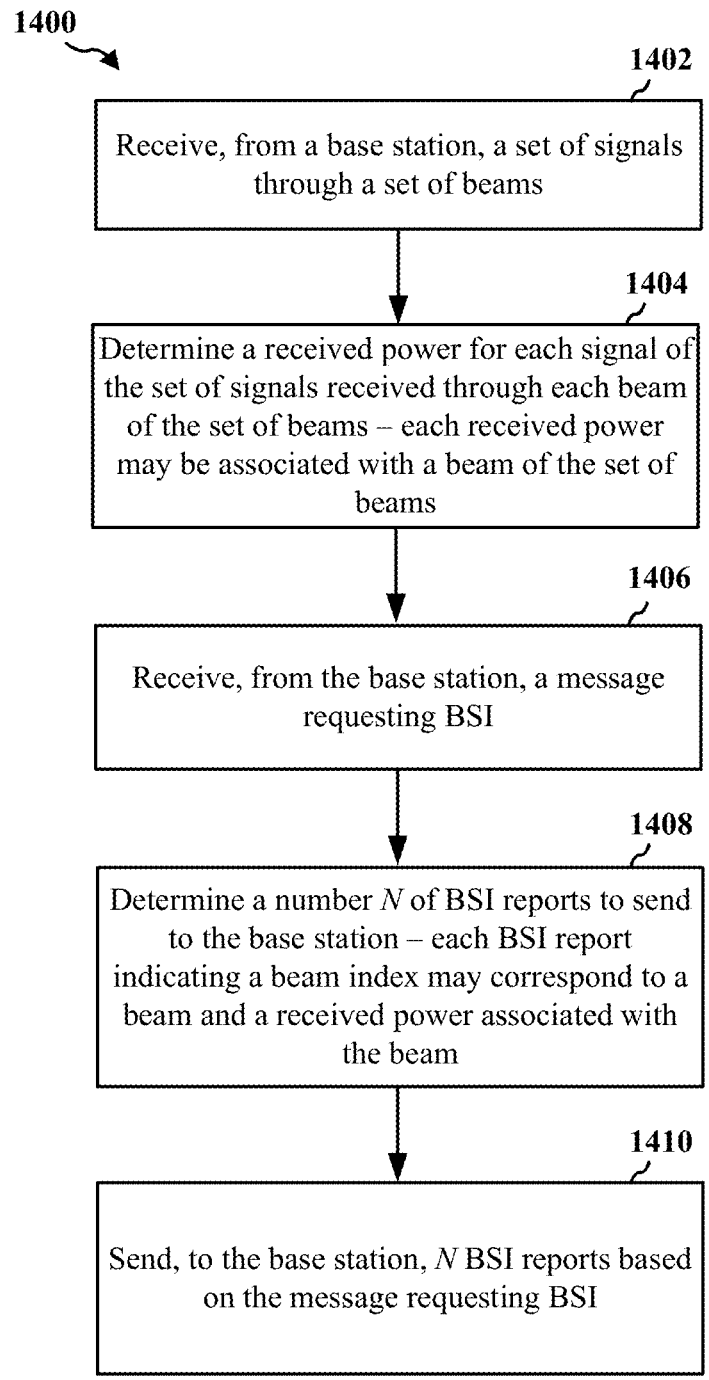
FIG. 14 is a flowchart of a method of wireless communication.

FIG. 14 is a flowchart of a method 1400 of wireless communication. The method 1400 may be performed by a UE, such as the UE 1104, the UE 1004, the UE 904, the UE 804, the UE 704, the UE 604, the UE 504, the UE 404, the UE 350, the UE 104, the UE 182, or another UE. In one aspect, the method 1200 may be performed by an apparatus, such as the apparatus 2302/2302'. One of ordinary skill would understand that one or more operations may be omitted, transposed, and or performed contemporaneously.

At operation 1402, the UE may receive, from a base station, a set of signals through a set of beams. In the context of FIG. 8, the UE 804 may receive, from the base station 802, a set of BRSs 812a-h through a set of beams 820a-h. For example, the UE 804 may receive a third BRS 812c through a third beam 820c, a fourth BRS 812d through a fourth beam 820d, a fifth BRS 812e through a fifth beam 820e, and a sixth BRS 812f through a sixth beam 820f.

At operation 1404, the UE may determine a received power for each signal of the set of signals received through each beam of the set of beams. For example, the UE may identify the signal, and the UE may measure a received power corresponding to the identified signal. Each determined received power may be associated with a respective beam of the set of beams (e.g., each BRS may correspond to a beam and, therefore, a received power determined for a BRS may also correspond to that beam through which the BRS is received). According to various aspects, the determination of the received power of each BRS of the set of BRSs may include measurement of at least one of a BRSRP, a BRSRQ, an SIR, an SINR, and/or an SNR. In the context of FIG. 6, the UE 604 may determine a received power for each received BRS of the set of BRSs 612a-h, and a respective received power may correspond to a respective beam of the set of beams 620a-h.

At operation 1406, the UE may receive, from the base station, a message requesting BSI. In one aspect, a DCI message (e.g., a downlink DCI message or an uplink DCI message) may include the message requesting BSI. In another aspect, an RAR message may include the message requesting BSI. In the context of FIG. 8, the UE 804 may receive, from the base station 802, the message 840 requesting BSI.

At operation 1408, the UE may determine a number N of BSI reports to send to the base station, and each BSI report may indicate a beam index corresponding to a beam and a received power associated with the beam. For example, the UE may identify the message from the base station requesting BSI, and the UE may identify the number N of BSI reports to send based on the identified message. In the context of FIG. 8, the UE 804 may determine a number N of BSI reports 842 to send to the base station 802. Each BSI report 842 may include at least one of the beam indexes 832c-f and a BRSRP 834c-f corresponding to the at least one of the beam indexes 832c-f.

In an aspect, the UE may determine the number N based on the message requesting BSI (e.g., based on the type of message). For example, the UE may determine that the number N is one when the message requesting BSI is included in a DCI message (e.g., a downlink DCI message). In another aspect, the UE may determine that the number N is greater than one (e.g., two or four) when the message requesting BSI is included in an RAR message (or an uplink DCI message); the number N greater than one may be indicated by the message (e.g., the message requesting BSI may indicate that the UE is to send two or four BSI reports). In the context of FIG. 8, the UE 804 may determine the number N of BSI reports 842 to send to the base station 802 based on the message 840 (e.g., the type or format of the message 840).

In one aspect, the UE may determine a channel that is to carry the BSI reports based on the message. For example, the UE may determine that the number N of BSI reports are to be carried on a PUCCH when the number N is one and/or when the message requesting BSI is included in a DCI message (e.g., a downlink DCI message). In another aspect, the UE may determine that the number N of BSI reports are to be carried on a PUSCH when the number N is greater than one and/or when the message requesting BSI is included in an RAR message (or an uplink DCI message).

At operation 1410, the UE may send, to the base station, N BSI reports based on the message requesting BSI. In an aspect, the N BSI reports include N received powers corresponding to the highest determined received powers and the beam indexes corresponding to those highest determined received powers. In the context of FIG. 8, the UE 804 may send, to the base station 802, N BSI reports 842 based on the message 840. For example, at least one BSI report 842 may include a fifth beam index 832e and a corresponding BRSRP 834e, which may be the highest BRSRP of the BRSRPs measured for the BRSs 812a-h received through the beams 820a-h.

Figure 15:
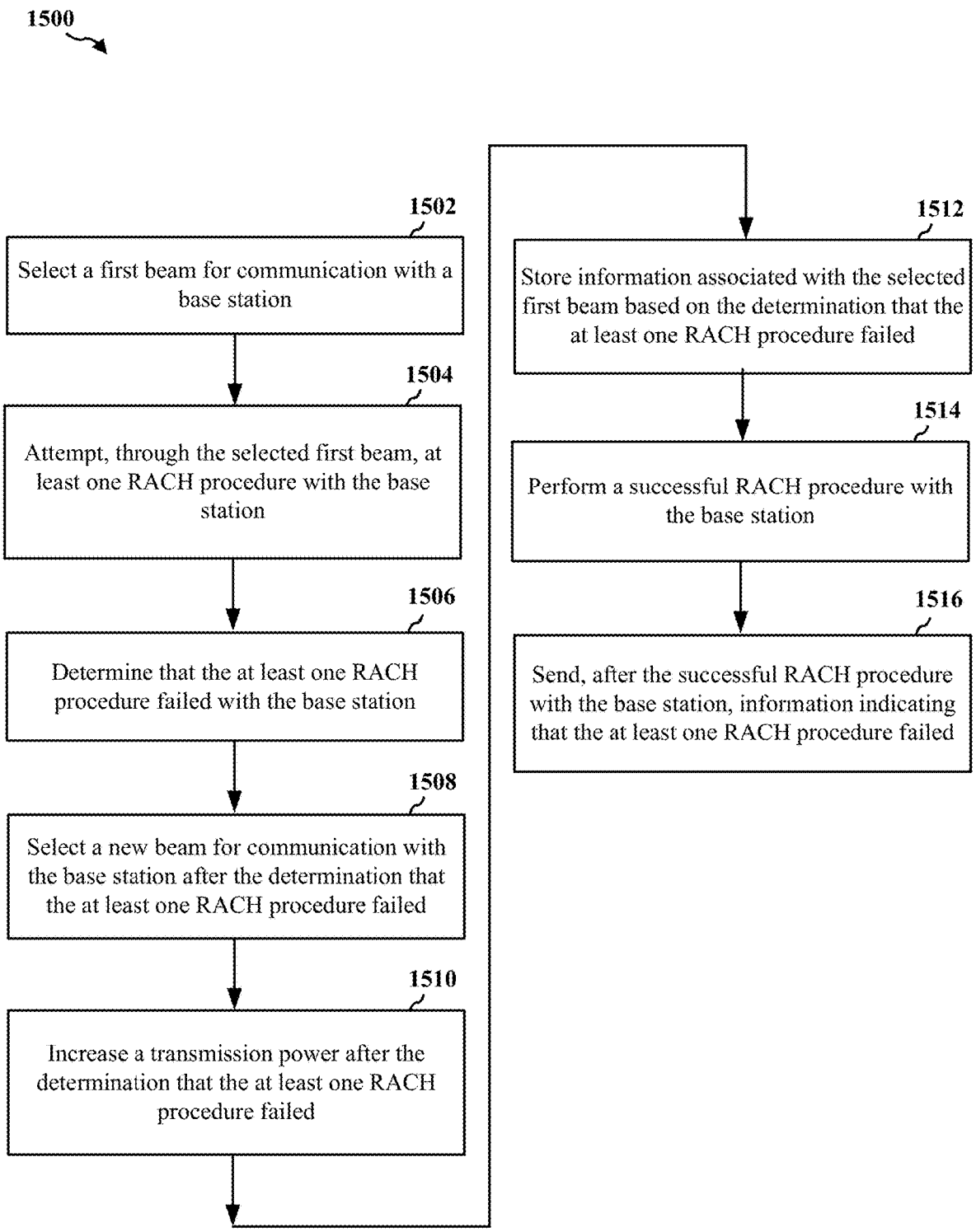
FIG. 15 is a flowchart of a method of wireless communication.

FIG. 15 is a flowchart of a method 1500 of wireless communication. The method 1500 may be performed by a UE, such as the UE 1104, the UE 1004, the UE 904, the UE 804, the UE 704, the UE 604, the UE 504, the UE 404, the UE 350, the UE 104, the UE 182, or another UE. In one aspect, the method 1200 may be performed by an apparatus, such as the apparatus 2502/2502'. One of ordinary skill would understand that one or more operations may be omitted, transposed, and or performed contemporaneously.

At operation 1502, the UE may select a first beam for communication with a base station. For example, the UE may select a beam index corresponding to a beam through which the UE estimates or expects the base station to be able to communicate with the UE. In the context of FIG. 9, the UE 904 may select the fifth beam 920e as the first beam for communication with the base station 902.

At operation 1504, the UE may attempt at least one RACH procedure with the base station through the selected beam. For example, the UE may send at least one RACH message (e.g., the MSG1 410) to the base station, and the UE may determine that a response to the at least one RACH message is absent (e.g., not received within a predetermined period of time). In the context of FIG. 9, the UE 904 may attempt a first RACH procedure 940 with the base station 902 through the selected fifth beam 920e.

At operation 1506, the UE may determine that the at least one RACH procedure failed.

For example, the UE may start a timer in association with one or more messages, and the UE may fail to receive or decode one or more messages associated with the at least one RACH procedure (e.g., a MSG2 or RAR, a MSG4 or contention resolution message, etc.) before expiration of the timer. In the context of FIG. 9, the UE 904 may determine that the first RACH procedure 940 failed with the base station 902.

At operation 1508, the UE may select a new beam for communication with the base station after the determination that the at least one RACH procedure failed. For example, the UE may access a stored set of candidate beam indexes, and the UE may select a next beam corresponding to a next beam index in a set of candidate beam indexes (e.g., a beam corresponding to a next highest BRSRP). In the context of FIG. 9, the UE 904 may select the sixth beam 920f for communication with the base station 902 after the determination that the first RACH procedure 940 failed.

At operation 1510, the UE may increase a transmission power after the determination that the at least one RACH procedure failed. For example, the UE may identify a current transmission power, and the UE may increase the identified current transmission power by a predetermined amount. In the context of FIG. 9, the UE 904 may increase a transmission power for the successful RACH procedure 942.

In an aspect, the UE may perform one or both of operations 1508 and 1510. In other words, the UE may increase a transmission power and attempt another RACH procedure through the selected first beam (e.g., instead of selecting a new beam for attempting another RACH procedure). Alternatively, the UE may use a same transmission power when attempting another RACH procedure through a newly selected beam. Alternatively, the UE may both increase transmission power and use a newly selected beam when attempting another RACH procedure after a determination that the first RACH procedure failed.

At operation 1512, the UE may store information associated with the selected first beam based on the determination that the at least one RACH procedure failed. For example, the UE may generate or access a data structure, and the UE may store a beam index corresponding to the first beam through which the UE attempted the failed RACH procedure (e.g., in the generated or accessed data structure). In an aspect, the UE may exclude the beam index corresponding to the first beam from a set of candidate beam indexes maintained by the UE based on the determination that the at least one RACH procedure failed. In another example, the UE may store an indication of a subframe in which a RACH message associated with the failed RACH procedure is carried (e.g., a MSG1 or random access preamble, a MSG3 or connection request message, etc.).

At operation 1514, the UE may perform a successful RACH procedure with the base station. For example, the UE may send a connection request message (e.g., the MSG3 414) and the UE may receive a contention resolution message (e.g., the MSG4 416) in response to the connection request message. The UE may be synchronized with a network that includes the base station based on the successful RACH procedure. In the context of FIG. 9, the UE 904 may perform the successful RACH procedure 942 with the base station 902, for example, through the sixth beam 920f.

At operation 1516, the UE may send, after the successful RACH procedure with the base station, information indicating that the at least one RACH procedure failed. In an aspect, this information may be the information stored as described at operation 1512. For example, this information may include a beam index corresponding to the first beam and/or an indication of a subframe in which a message associated with the failed RACH procedure was carried. In one aspect, this information may be included in a BSI report. In the context of FIG. 9, the UE 904 may send, after the successful RACH procedure 942, information 944 indicating that the first RACH procedure 940 failed.

Figure 16:
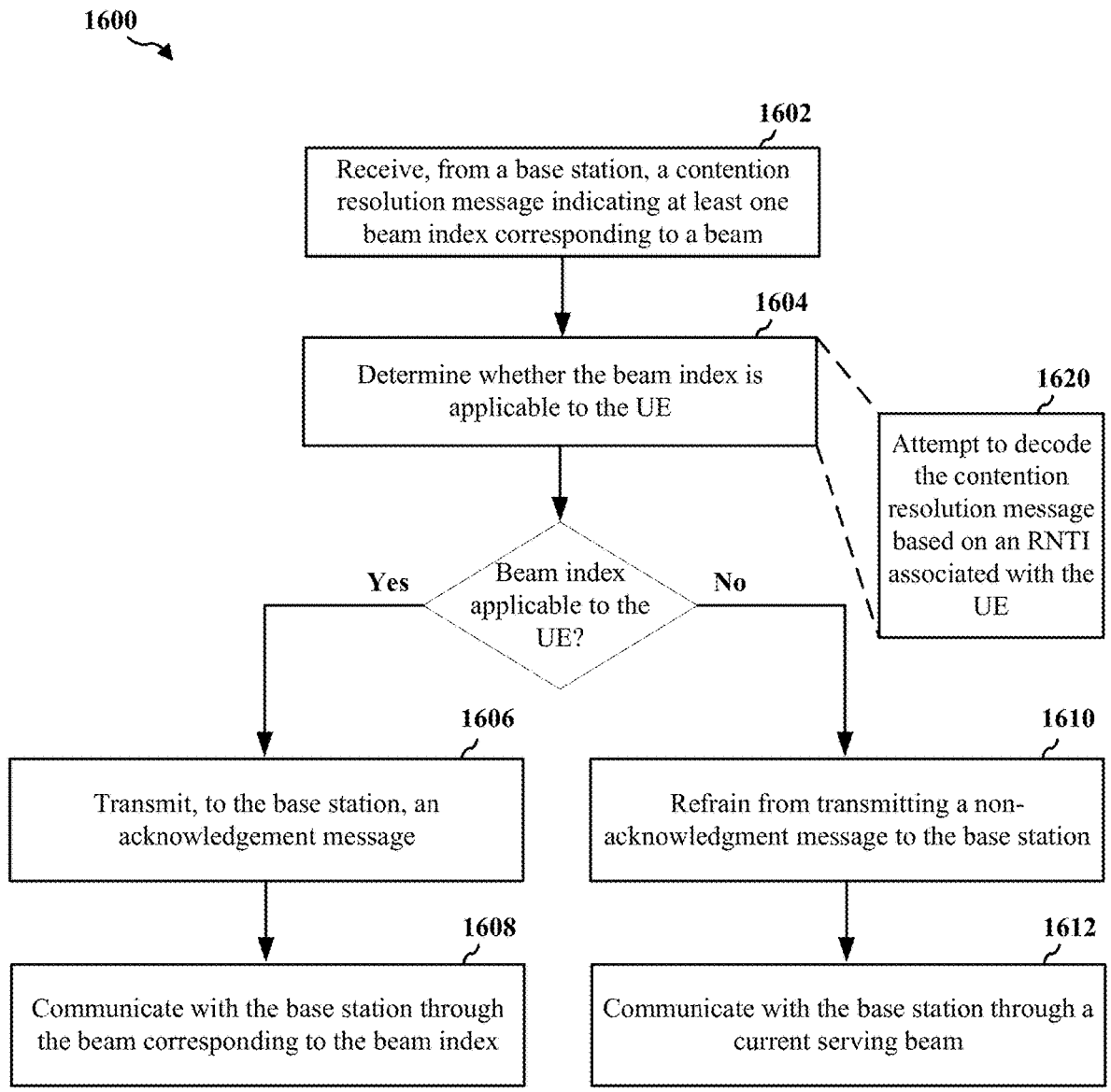
FIG. 16 is a flowchart of a method of wireless communication.

FIG. 16 is a flowchart of a method 1600 of wireless communication. The method 1500 may be performed by a UE, such as the UE 1104, the UE 1004, the UE 904, the UE 804, the UE 704, the UE 604, the UE 504, the UE 404, the UE 350, the UE 104, the UE 182, or another UE. In one aspect, the method 1200 may be performed by an apparatus, such as the apparatus 2702/2702'. One of ordinary skill would understand that one or more operations may be omitted, transposed, and or performed contemporaneously.

At operation 1602, the UE may receive, from a base station, a contention resolution message indicating at least one beam index corresponding to a beam. In the context of FIG. 10, the UE 1004 may receive, from the base station 1002, the contention resolution message 1042, for example, as part of the RACH procedure 1040. For example, the UE 1004 may receive, from the base station 1002, the contention resolution message 1042 through the fifth beam 1020e, and the contention resolution message 1042 may indicate a beam index corresponding to the sixth beam 1020f.

In an aspect, the contention resolution message may be received as part of a RACH procedure. The contention resolution message may also be known as a MSG4. In the context of FIG. 4A, the contention resolution message may be an aspect of the MSG4 416. Accordingly, the UE 404 may receive, from the base station 402, the MSG4 416, for example, according to a RACH procedure.

In an aspect, the contention resolution message may indicate one or more channels to which the at least one beam index corresponding to the beam is applicable. For example, the contention resolution message may indicate that the at least one beam index corresponding to the beam is applicable to one or more uplink channels and/or one or more downlink channels. In the context of FIG. 10, the contention resolution message 1042 may indicate one or more channels to which the at least one beam index corresponding to the beam is applicable. Accordingly, the UE 1004 may determine, based on the contention resolution message 1042, one or more channels to which the at least one beam index corresponding to the beam is applicable.

At operation 1604, the UE may determine whether the beam index is applicable to the UE. In other words, the UE may determine whether communication with the base station is to occur through the beam corresponding to the beam index indicated by the contention resolution message. In the context of FIG. 10, the UE 1004 may determine whether the beam index indicated by the contention resolution message 1042 is applicable to the UE 1004.

In an aspect, operation 1604 may include operation 1620. At operation 1620, the UE may attempt to decode the contention resolution message based on an RNTI associated with the UE. When the UE successfully decodes the contention resolution message based on an RNTI associated with the UE, the UE may determine that the beam index indicated by the contention resolution is applicable to the UE. When the UE is unable to successfully decode the contention resolution message based on an RNTI associated with the UE, the UE may determine that the beam index is inapplicable to the UE. In the context of FIG. 10, the UE 1004 may attempt to decode the contention resolution message 1042 based on an RNTI associated with the UE 1004 (e.g., an RNTI determined during the RACH procedure 1040).

When the UE determines that the beam index indicated by the contention resolution message is applicable to the UE, the method 1600 may proceed to operation 1606. At operation 1606, the UE may transmit, to the base station, an acknowledgment message—e.g., the UE may transmit ACK feedback indicating that the UE acknowledges the contention resolution message received from the base station. In one aspect, the UE may transmit the acknowledgment message through the beam used for the RACH procedure. In another aspect, the UE may transmit the acknowledgment message through the beam corresponding to the beam index indicated by the contention resolution message. In the context of FIG. 10, the UE 1004 may transmit, to the base station 1002, the acknowledgment message 1044 based on the determination that the beam index indicated by the contention resolution message 1042 is applicable to the UE.

At operation 1608, the UE may communicate with the base station through the beam corresponding to the beam index indicated by the contention resolution message. In an aspect, the UE may switch from a current serving beam to a new beam, and the new beam may correspond to the beam index indicated by the contention resolution message. In an aspect, the UE may communicate with the base station through the beam corresponding to the beam index indicated by the contention resolution message on one or more channels (e.g., one or more uplink channels or one or more downlink channels), which may also be indicated by the contention resolution message. In the context of FIG. 10, the UE 1004 may communicate 1046 with the base station 1002 through the sixth beam 1020f, and the sixth beam 1020f may correspond to the beam index indicated by the contention resolution message 1042.

When the UE determines that the beam index indicated by the contention resolution message is inapplicable to the UE or if the UE is unable to successfully decode the contention resolution message, the method 1600 may proceed to operation 1610. At operation 1610, the UE may refrain from transmitting a non-acknowledgment message to the base station when the beam index is determined to be inapplicable to the UE or if the UE is unable to successfully decode the contention resolution message. For example, the UE may refrain from transmitting NACK feedback to the base station. In the context of FIG. 10, the UE 1004 may refrain from transmitting a non-acknowledgment message to the base station when the UE 1004 determines that the beam index indicated by the contention resolution message 1042 is inapplicable to the UE 1004 or when the UE 1004 is unable to successfully decode the contention resolution message 1042.

At operation 1612, the UE may continue to communicate with the base station through a current serving beam. For example, the UE may continue to communicate with the base station through the beam used for the RACH procedure with which the contention resolution message is associated (e.g., the UE may attempt a second RACH procedure through the same beam used for the first RACH procedure). In the context of FIG. 10, the UE 1004 may continue to communicate with the base station 1002 through the fifth beam 1020e used for the first RACH procedure 1040 (e.g., the UE 1004 may attempt another RACH procedure similar to the first RACH procedure 1040 through the fifth beam 1020e used for the first RACH procedure 1040).

Figure 17:
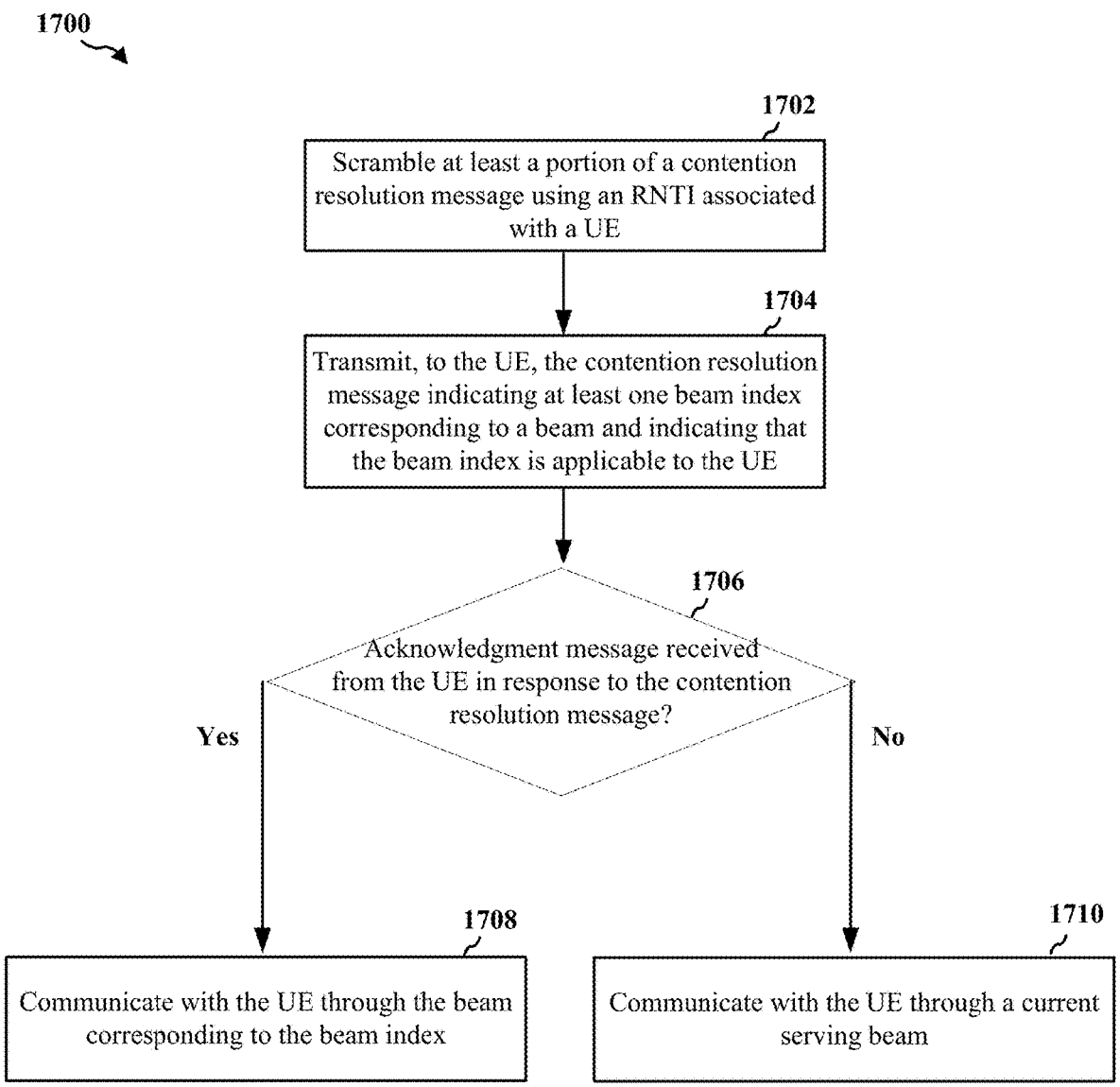
FIG. 17 is a flowchart of a method of wireless communication.

FIG. 17 is a flowchart of a method 1700 of wireless communication. The method 1700 may be performed by a base station, such as the base station 1102, the base station 1002, the base station 902, the base station 802, the base station 702, the base station 602, the base station 502, the base station 402, the base station 310, the base station 102, the base station 180, or another base station. In one aspect, the method 1200 may be performed by an apparatus, such as the apparatus 2902/2902'. One of ordinary skill would understand that one or more operations may be omitted, transposed, and or performed contemporaneously.

At operation 1702, the base station may scramble at least a portion of a contention resolution message using an RNTI associated with a UE. For example, the base station may identify an RNTI associated with the UE, and encode at least a portion of the contention resolution message using the identified RNTI. In the context of FIG. 10, the base station 1002 may scramble at least a portion of the contention resolution message 1042 using an RNTI associated with the UE 1004.

At operation 1704, the base station may transmit, to the UE, the contention resolution message indicating at least one beam index corresponding to a beam and further indicating that the beam index is applicable to the UE. The base station may indicate that the beam index is applicable to the UE by scrambling at least a portion of the contention resolution message using an RNTI associated with the UE, as described at operation 1702. In one aspect, the base station may select a beam for communication with the UE, and the selected beam may be different from the beam through which the contention resolution message is transmitted. In the context of FIG. 10, the base station 1002 may transmit, to the UE 1004, the contention resolution message 1042. The base station 1002 may transmit the contention resolution message 1042 through the fifth beam 1020e, and the contention resolution message 1042 may indicate a beam index corresponding to the sixth beam 1020f.

In an aspect, the contention resolution message may be generated by the base station as part of a RACH procedure. The contention resolution message may also be known as a MSG4. The contention resolution message may be generated by the base station in response to a connection request message or MSG3 received from the UE as part of a RACH procedure. In the context of FIG. 4A, the contention resolution message may be an aspect of the MSG4 416. Accordingly, the base station 402 may transmit, to the UE 404, the MSG4 416, for example, according to a RACH procedure.

In an aspect, the contention resolution message may indicate one or more channels to which the at least one beam index corresponding to the beam is applicable. For example, the contention resolution message may indicate that the at least one beam index corresponding to the beam is applicable to one or more uplink channels and/or one or more downlink channels. In the context of FIG. 10, the contention resolution message 1042 may indicate one or more channels to which the at least one beam index corresponding to the beam is applicable. For example, the base station 1002 may indicate, by the contention resolution message 1042, one or more channels to which the at least one beam index corresponding to the beam is applicable.

At operation 1706, the base station may determine whether an acknowledgment message is received from the UE in response to the contention resolution message. In the context of FIG. 10, the base station 1002 may determine whether the acknowledgment message 1044 is received from the UE 1004 in response to the contention resolution message 1042.

When the base station determines that the acknowledgment message is received from the UE, the method 1700 may proceed to operation 1708. At operation 1708, the base station may communicate with the UE through the beam corresponding to beam index indicated by the contention resolution message. In an aspect, the base station may communicate with the UE through the beam corresponding to the beam index indicated by the contention resolution message on one or more channels (e.g., one or more uplink channels or one or more downlink channels), which may also be indicated by the contention resolution message. In the context of FIG. 10, the base station 1002 may communicate 1046 with the UE through the sixth beam 1020f, and the sixth beam 1020f may correspond to the beam index indicated by the contention resolution message 1042.

When the base station determines that the acknowledgment message is not received from the UE, the method 1700 may proceed to operation 1710. At operation 1710, the base station may communicate with the UE through a current serving beam, such as the beam used for the RACH procedure with which the contention resolution message is associated. In one aspect, the base station may take no action with the UE when the base station determines that the acknowledgment message is not received from the UE. In the context of FIG. 10, the base station 1002 may communicate with the UE through the fifth beam 1020e, which may be the beam through which one or more messages associated with the RACH procedure 1040 are communicated.

Figure 18:
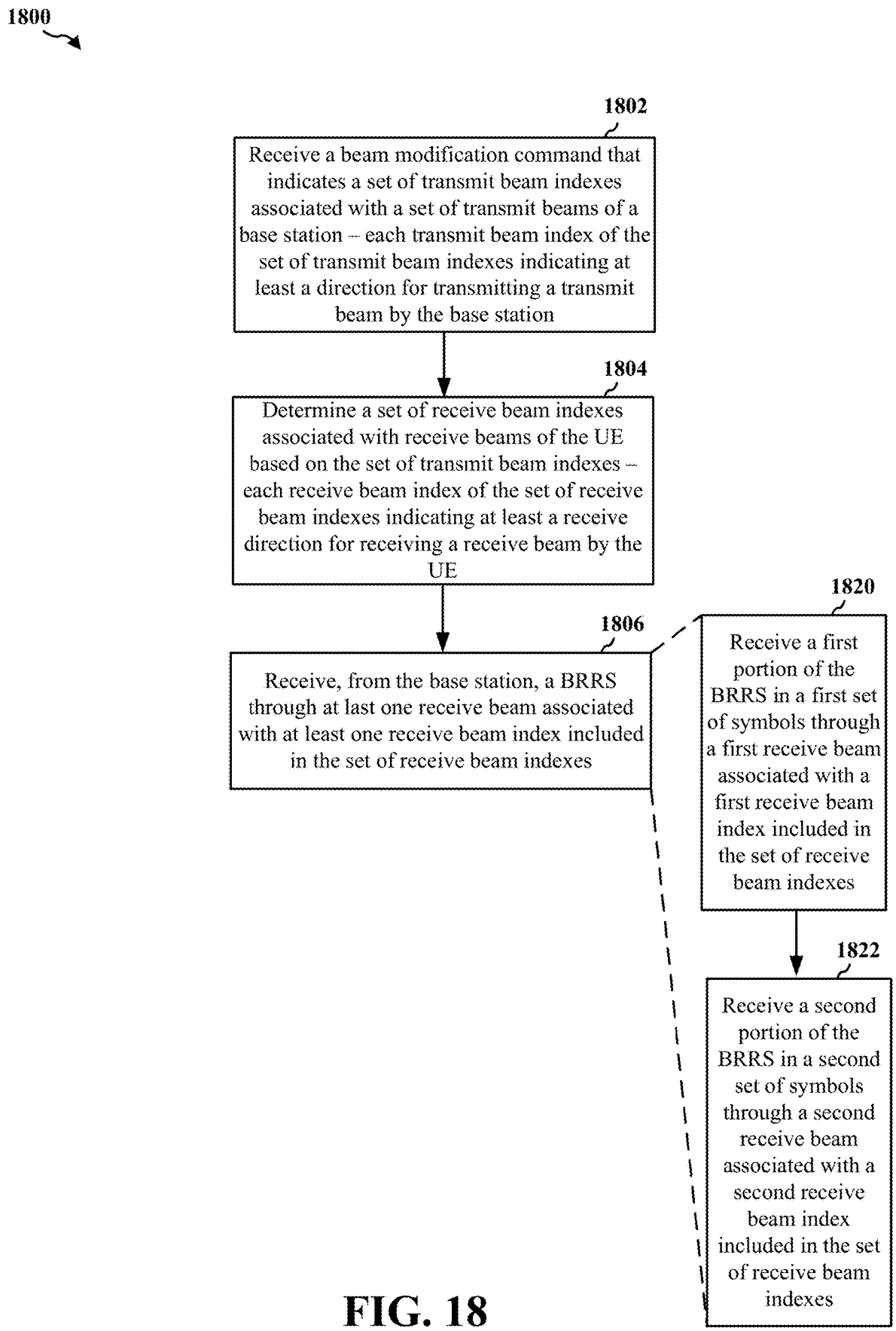
FIG. 18 is a flowchart of a method of wireless communication.

FIG. 18 is a flowchart of a method 1800 of wireless communication. The method 1800 may be performed by a UE, such as the UE 1104, the UE 1004, the UE 904, the UE 804, the UE 704, the UE 604, the UE 504, the UE 404, the UE 350, the UE 104, the UE 182, or another UE. In one aspect, the method 1200 may be performed by an apparatus, such as the apparatus 3102/3102'. One of ordinary skill would understand that one or more operations may be omitted, transposed, and or performed contemporaneously.

At operation 1802, the UE may receive a beam modification command that indicates a set of transmit beam indexes corresponding to a set of transmit beams of a base station. Each transmit beam index of the set of transmit beam indexes may indicate at least a direction for transmitting a transmit beam by the base station. In the context of FIG. 11, the UE 1104 may receive, from the base station 1102, the beam modification command 1142 that indicates a set of transmit beam indexes corresponding to a set of transmit beams 1120a-h of the base station 1102.

In an aspect, the beam modification command may be received in a MAC CE. In an aspect, the beam modification command may be received in a DCI message. In an aspect, the beam modification command may be received via RRC signaling. In an aspect, the beam modification command may be carried on a PDCCH.

At operation 1804, the UE may determine a set of receive beam indexes corresponding to a set of receive beams of the UE based on the set of transmit beam indexes. Each receive beam index of the set of receive beam indexes may indicate at least a receive direction for receiving a beam by the UE. In an aspect, the UE may determine the set of receive beam indexes by accessing a mapping that maps transmit beam indexes to receive beam indexes. The UE may be configured to populate this mapping. The UE may identify at least one receive beam index corresponding to at least one transmit beam index based on the accessed mapping.

In the context of FIG. 11, the UE 1104 may determine a set of receive beam indexes corresponding to a set of receive beams 1140a-h of the UE 1104 based on the set of transmit beam indexes indicated by the beam modification command 1142. For example, the UE 1104 may determine a set of receive beam indexes corresponding to the fourth receive beam 1140d and the fifth receive beam 1140e based on a set of transmit beam indexes corresponding to the fifth transmit beam 1120e and the sixth transmit beam 1120f, respectively.

At operation 1806, the UE may receive, from the base station, a BRRS through at least one receive beam corresponding to at least one receive beam index included in the determined set of receive beam indexes. In one aspect, the UE may generate a receive beam corresponding to the at least one receive beam index, for example, when the UE is not actively maintaining that beam. In the context of FIG. 11, the UE 1104 may receive, from the base station 1102, the BRRS 1144 through at least the fifth receive beam 1140e corresponding to at least one receive beam index included in the determined set of receive beam indexes.

In one aspect, the UE may receive the BRRS through the set of transmit beams from the base station corresponding to the set of transmit beam indexes. In another aspect, the UE may receive the BRRS through a different set of transmit beams from the base station than the set of transmit beams corresponding to the transmit beam indexes indicated by the beam modification command. For example, obstruction and/or reflection may cause the UE to receive the BRRS through the determined set of receive beams, but through a different set of transmit beams than the set of transmit beams corresponding to the set of transmit beam indexes indicated by the beam modification command.

In one aspect, the UE may receive the BRRS in one or more symbols corresponding to one or more symbol indexes. For example, the UE may receive (e.g., listen) through the at least one receive beam corresponding to the at least one receive beam index during one or more symbols corresponding to the one or more symbol indexes. In an aspect, the one or more symbol indexes may be predetermined (e.g., defined by one or more standards promulgated by 3GPP). In another aspect, the one or more symbol indexes may be indicated by the beam modification command. In one aspect, the beam modification command further indicates a corresponding transmit beam index of the set of transmit beam indexes for each symbol of the one or more symbol indexes.

In an aspect, operation 1806 my include operation 1820 and operation 1822. At operation 1820, the UE may receive a first portion of the BRRS in a first set of symbols through a first receive beam corresponding to a first receive beam index included in the determined set of receive beam indexes. In the context of FIG. 11, the UE 1104 may receive a first portion of the BRRS 1144 in a first set of symbols through the fourth receive beam 1140d corresponding to a fourth receive beam index, which may be determined based on a fifth transmit beam index corresponding to a fifth transmit beam 1120e indicated by the beam modification command 1142.

At operation 1822, the UE may receive a second portion of the BRRS in a second set of symbols through a second receive beam corresponding to a second receive beam index included in the determined set of receive beam indexes. In the context of FIG. 11, the UE 1104 may receive a second portion of the BRRS 1144 in a second set of symbols through the fifth receive beam 1140d corresponding to a fifth receive beam index, which may be determined based on a sixth transmit beam index corresponding to a sixth transmit beam 1120f indicated by the beam modification command 1142.

Figure 19:
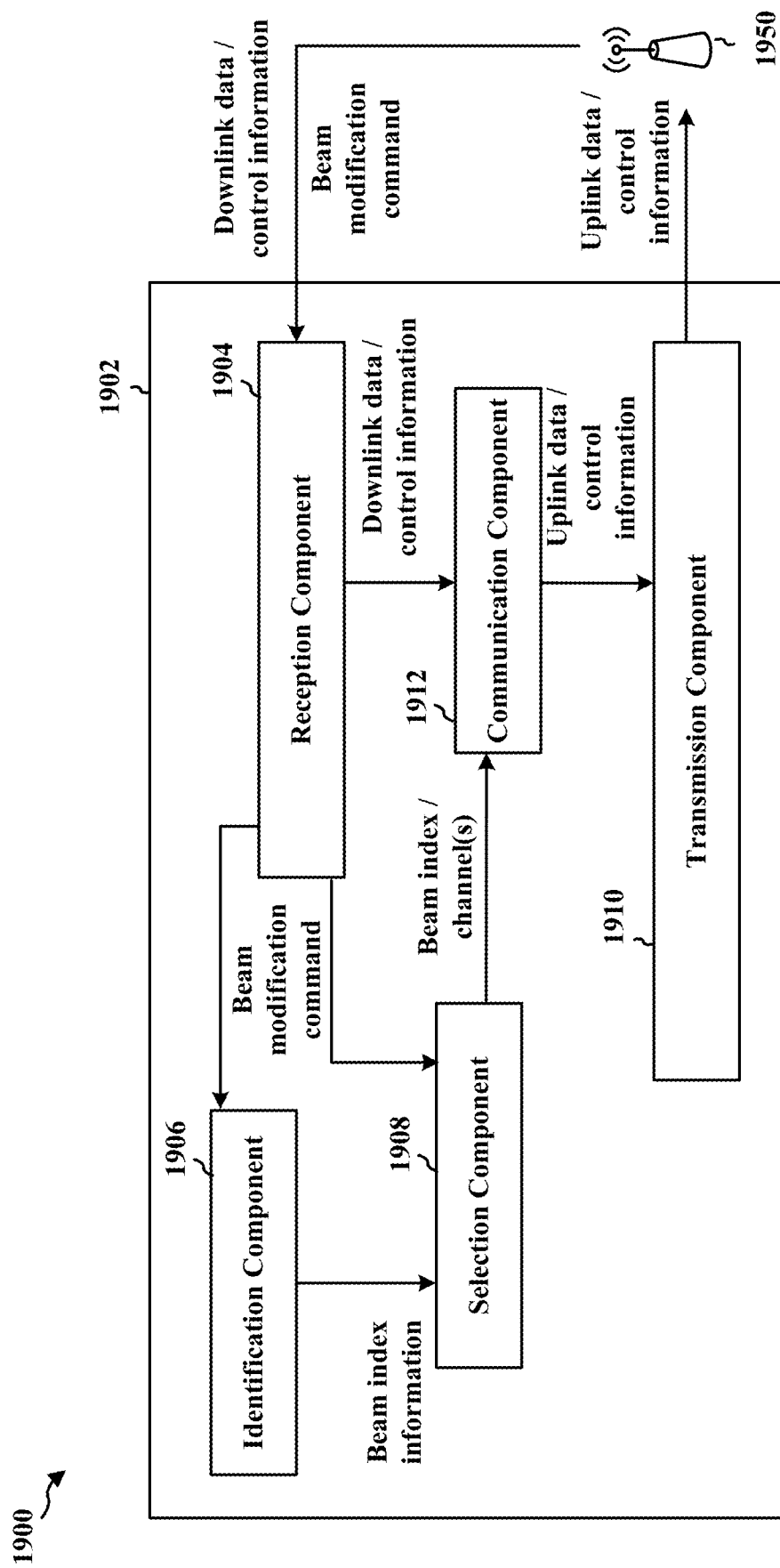
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1902. The apparatus may be a UE. The data flow illustrated in the diagram 1900 is to be regarded as illustrative. Therefore, one or more additional means/components may be present, and one or more illustrated means/components may be absent, according to various aspects. Further, various data flow may occur between means/components in addition to the illustrated data flow.

The apparatus 1902 may include a reception component 1904 configured to receive signals from a base station (e.g., the base station 1950, a mmW base station, an eNB, etc.). The apparatus 1902 may further include a transmission component 1910 configured to transmit signals to a base station (e.g., the base station 1950, a mmW base station, an eNB, etc.).

In an aspect, the apparatus 1902 may include a communication component 1912. The communication component 1912 may be configured to receive, through the reception component 1904, downlink data and/or control information. The communication component may be configured to determine (e.g., generate, select, etc.) uplink data and/or control information that is to be sent to the base station 1950 via the transmission component 1910. In aspects, the communication component 1912 may communicate, with the base station 1950, through a serving beam corresponding to a serving beam index. In one aspect, the communication component 1912 may communicate through a first beam corresponding to a first beam index for downlink communication received from the base station 1950 and communicate through a second beam corresponding to a second beam index for uplink communication sent to the base station 1950. The first beam and the second beam are not necessarily the same beam. Therefore, uplink communication and downlink communication may occur through different beams.

The apparatus 1902 may include an identification component 1906. The identification component 1906 may receive a beam modification command from the base station. The beam modification command may indicate at least one beam index for communicating through at least one beam on at least one channel—each beam index may indicate at least a direction for communicating through a corresponding beam of the at least one beam. In an aspect, the beam modification command may indicate a plurality of beam indexes. The identification component 1906 may determine, based on the beam modification command, at least one beam index for communicating through at least one beam on at least one channel.

In one aspect, the identification component 1906 may receive the beam modification command in a MAC CE. In another aspect, the identification component 1906 may receive the beam modification command in a DCI message. In another aspect, the identification component 1906 may receive the beam modification command via RRC signaling.

In one aspect, the identification component 1906 may further determine at least one channel corresponding to at least one determined beam index. For example, the identification component 1906 may determine that the beam modification command is be applicable to one or more uplink channels for uplink communication and/or is applicable to one or more downlink channels for downlink communication. In one aspect, the identification component 1906 may determine a plurality of channels corresponding to the at least one beam index.

The identification component 1906 may determine the at least one channel based on the beam modification command. For example, the identification component 1906 may determine the at least one channel based on a DCI format of a DCI message that indicates the at least one beam index. In an aspect, the identification component may determine, for each beam index, a corresponding channel to which each beam index is applicable.

The identification component 1906 may provide, to a selection component 1908, beam index information that includes the at least one determined beam index. In an aspect, the identification component 1906 may provide, to the selection component 1908, beam index information indicating one or more channels to which each beam index is applicable. For example, the identification component 1906 may provide, to the selection component 1908, a beam index and an indication that the beam index is applicable to uplink channels for uplink communication or downlink channels for downlink communication.

In an aspect, the selection component 1908 may be configured to determine whether a first serving beam is to be switched based on the beam index information. The selection component 1908 may instruct the communication component 1912 to switch from the first serving beam to a second serving beam.

In an aspect, the selection component 1908 may determine a time at which communication through the second serving beam corresponding to the at least one beam index is to occur. In one aspect, the time may correspond to a symbol or a subframe. The selection component 1908 may determine the time and instruct the communication component 1912 to switch to the second serving beam at the determined time.

In one aspect, the selection component 1908 may determine the time based on the beam modification command. For example, the selection component 1908 may determine, based on inclusion of the beam modification command in a MAC CE, to switch communication through the first serving beam to the second serving beam at the beginning of a subframe $n+k_{beamswitch-delay-mac}$, where n is the subframe used for HARQ-ACK transmission associated with the MAC CE and $k_{beamswitch-delay-mac}$ is equal to 14.

According to another example, based on inclusion of the beam modification command in a DCI message, the selection component 1908 may determine to switch from the first serving beam to the second serving beam at the beginning of a subframe $n+k_{beamswitch-delay-dic}$, where n is the subframe used for transmission of a BSI report and $k_{beamswitch-delay-dic}$ is equal to 11.

In an aspect, the selection component 1908 may receive a beam modification command indicating that the first serving beam is not to be switched. For example, a beam modification command may include a beam switch indication field having a predetermined value (e.g., "0") from which the selection component 1908 may determine that the first serving beam used by the communication component 1912 is not to be switched. Accordingly, the selection component 1908 may instruct the communication component 1912 to continue communication through the first serving beam, or the selection component 1908 may refrain from providing beam index and/or channel information to the communication component 1912.

Based on instruction from the selection component 1908, the communication component 1912 may communicate with the base station 1950 through the at least one beam corresponding to the at least one beam index. In other words, the communication component 1912 may communicate with the base station 1950 through the second serving beam on or more channels, rather than communicate with the base station 1950 through the first serving beam.

In an aspect, the communication component 1912 may communicate with the base station 1950 through the second serving beam on one or more channels indicated by the selection component 1908. For example, the communication component 1912 may communicate with the base station 1950 through the second serving beam on one or more uplink channels or one or more downlink channels.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
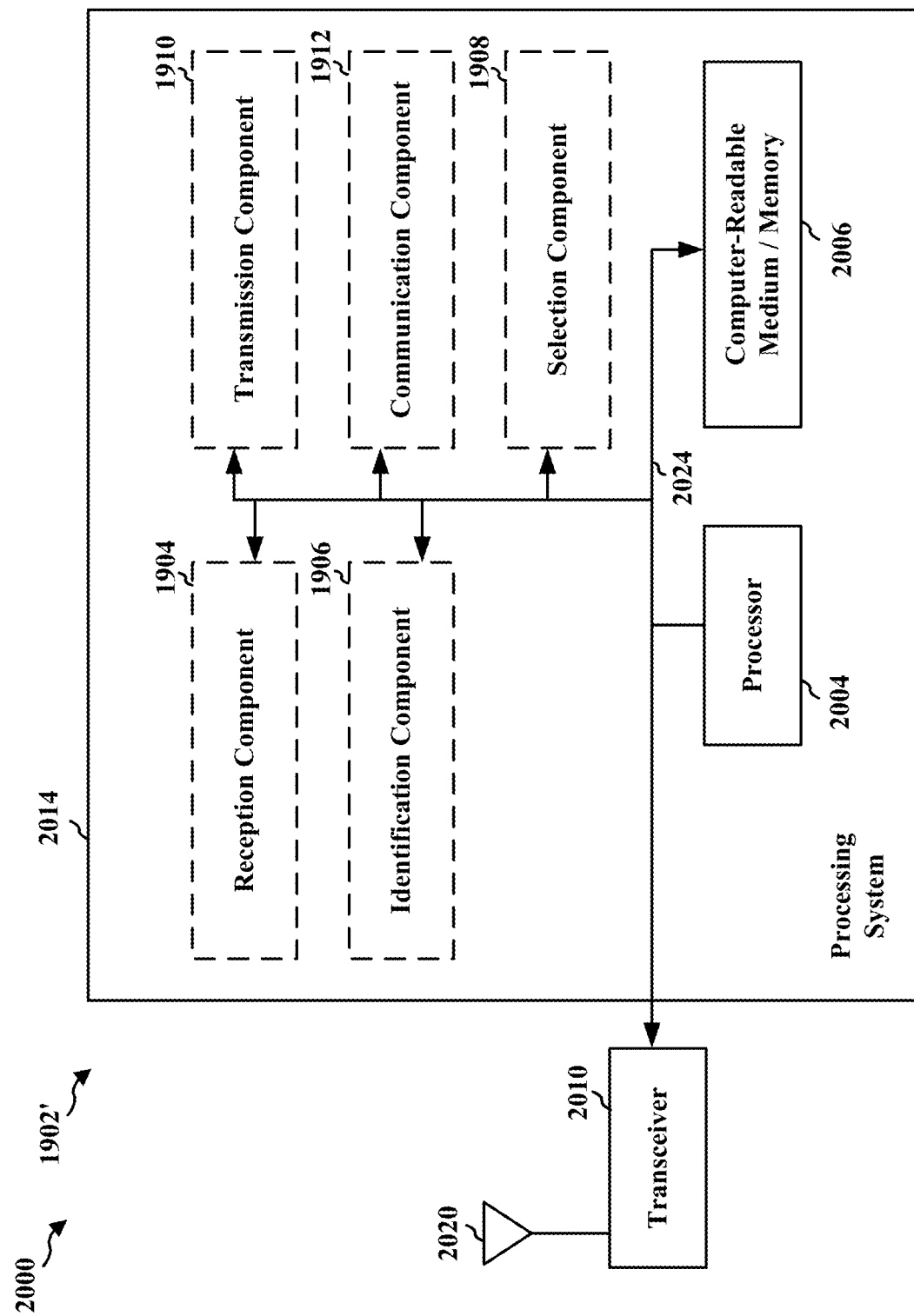
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, 1912, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1910, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908, 1910, 1912. The components may be software components running in the processor 2004, resident/stored in the computer readable medium/memory 2006, one or more hardware components coupled to the processor 2004, or some combination thereof. The processing system 2014 may be a component of the UE 350 and may include the memory 360 and/or at least one of the TX processor 368, the RX processor 356, and the controller/processor 359.

In one configuration, the apparatus 1902/1902' for wireless communication includes means for receiving, from a base station, a beam modification command indicating at least one beam index for communicating through at least one beam on at least one channel, and each beam index of the at least one beam index may indicate at least a direction for communicating through a corresponding beam of the at least one beam. The apparatus 1902/1902' may further include means for communicating, with the base station, through the at least one beam corresponding to the at least one beam index on the at least one channel.

In an aspect, the apparatus 1902/1902' may further include means for communicating, with the base station, through a serving beam corresponding to a serving beam index; The apparatus 1902/1902' may further include means for switching, after receiving the beam modification command, from the serving beam to the at least one beam corresponding to the at least one beam index indicated by the beam modification command. In an aspect, the means for switching from the serving beam to the at least one beam is configured to switch from the serving beam to the at least one beam at a predetermined time. In an aspect, the predetermined time is associated with at least one of a symbol or subframe, and wherein the beam modification command indicates the at least one of the symbol or the subframe.

In an aspect, the beam modification command indicates, for each beam index of the at least one beam index, a corresponding channel of the at least one channel. In an aspect, the at least one beam index comprises a plurality of beam indexes, and the at least one channel comprises a plurality of channels. In an aspect, the at least one beam index is applicable to one of uplink communication or downlink communication.

In an aspect, the beam modification command is received in a MAC CE. In an aspect, the beam modification command is received in a DCI message. In an aspect, the apparatus 1902/1902' may further include means for determining the at least one channel based on a DCI format of the DCI message. In an aspect, the beam modification command is received via RRC signaling.

The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 21:
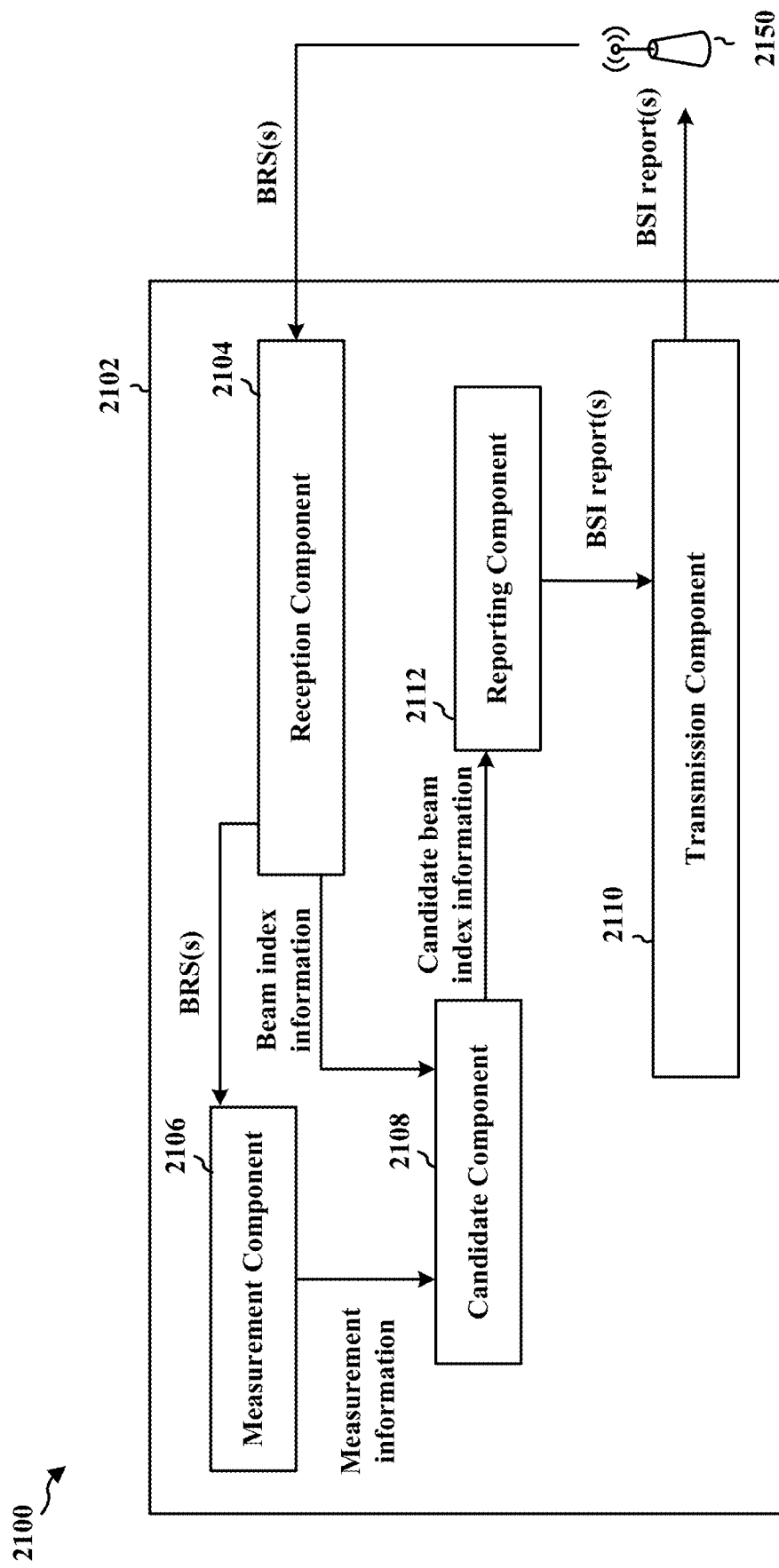
FIG. 21 is a conceptual data flow diagram illustrating the data flow between different means/components in an exemplary apparatus.

FIG. 21 is a conceptual data flow diagram 2100 illustrating the data flow between different means/components in an exemplary apparatus 2102. The apparatus may be a UE. The data flow illustrated in the diagram 2100 is to be regarded as illustrative. Therefore, one or more additional means/components may be present, and one or more illustrated means/components may be absent, according to various aspects. Further, various data flow may occur between means/components in addition to and/or instead of the illustrated data flow.

The apparatus 2102 may include a reception component 2104 configured to receive signals from a base station (e.g., the base station 2150, a mmW base station, an eNB, etc.). The apparatus 2102 may further include a transmission component 2110 configured to transmit signals to a base station (e.g., the base station 2150, a mmW base station, an eNB, etc.).

In aspects, the reception component 2104 may receive, from the base station 2150, through a set of beams a set of BRSs. Each BRS of the set of BRSs may correspond to a beam, and each beam may correspond to a beam index (ergo, each BRS may correspond to a beam index). Each BRS may be received through a beam that may be used for communication between the apparatus 2102 and the base station 2150. The reception component 2104 may provide the set of BRSs to a measurement component 2106.

The measurement component 2106 may be configured to measure a signal quality of each BRS of the set of received BRSs. For example, the measurement component 2106 may measure at least one of a BRSRP, a BRSRQ, an SIR, an SINR, an SNR, or another value indicative of signal quality.

The measurement component 2106 may provide measurement information to a candidate component 2108. The candidate component 2108 may be configured to maintain a set of candidate beam indexes corresponding to a set of best measured signal qualities of the set of BRSs. For example, the set of best measured signal qualities may be a set of the highest measured signal qualities.

In an aspect, the candidate component 2108 may be configured to maintain N candidate beam indexes in the set of candidate beam indexes. The number N may be predetermined, for example, as defined by one or more standards promulgated by 3GPP. For example, the candidate component 2108 may maintain N=4 candidate beam indexes in the set of candidate beam indexes.

In an aspect, the candidate component 2108 may be configured to maintain the set of best measured signal qualities of the set of BRSs based on a most recent set of signal qualities of the set of BRSs (e.g., the most recent measured signal qualities for the most recently received set of BRSs). In another aspect, the candidate component 2108 may be configured to maintain the set of best measured signal qualities of the set of BRSs based on a filtered set of signal qualities of the set of BRSs. In another aspect, the candidate component 2108 may be configured to maintain the set of best measured signal qualities of the set of BRSs based on a time-averaged set of signal qualities of the set of BRSs.

In an aspect, the candidate component 2108 may be configured to maintain the set of candidate beam indexes based on one or more criteria. For example, the candidate component 2108 may maintain the set of candidate beam indexes based on one or more hysteresis criteria for including a beam index in or excluding a beam index from the set of candidate beam indexes.

In one aspect, the candidate component 2108 may be configured to maintain the set of candidate beam indexes based on beam index information received from the base station 2150. For example, the candidate component 2108 may receive, from the base station 2150, an indication of one or more beam indexes that are to be excluded from the maintained set of candidate beam indexes. Accordingly, the candidate component 2108 may exclude the indicated one or more beam indexes from the maintained set of candidate beam indexes.

In an aspect, the candidate component 2108 may be configured to provide candidate beam index information to a reporting component 2112 based on the set of candidate beam indexes. For example, the candidate component 2108 may select at least one best (e.g., highest) signal quality and provide the best signal quality and corresponding candidate beam index to the reporting component 2112. In an aspect, the candidate beam index information may include at least a beam index and a signal quality corresponding to a beam through which the corresponding BRS is received. The reporting component 2112 may be configured to generate a BSI report indicating at least the signal quality and the beam index corresponding to the at last one measured signal quality. The reporting component 2112 may cause the transmission component 2110 to transmit the BSI report to the base station 2150.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
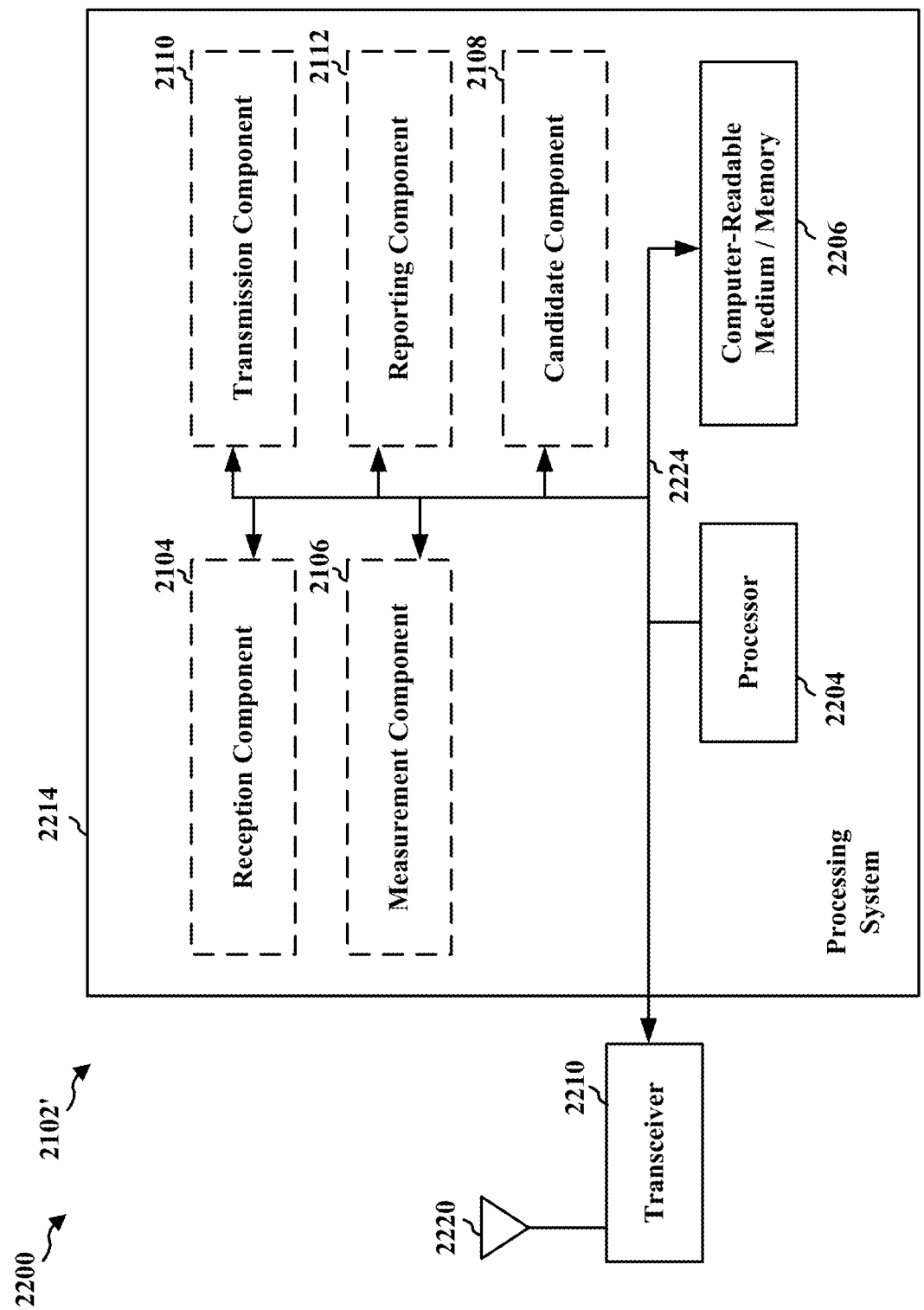
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, 2110, 2112 and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2110, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106, 2108. The components may be software components running in the processor 2204, resident/stored in the computer readable medium/memory 2206, one or more hardware components coupled to the processor 2204, or some combination thereof. The processing system 2214 may be a component of the UE 350 and may include the memory 360 and/or at least one of the TX processor 368, the RX processor 356, and the controller/processor 359.

In one configuration, the apparatus 2102/2102' for wireless communication includes means for receiving, from a base station, through a set of beams a set of BRSs. The apparatus 2102/2102' may further include means for measuring a signal quality of each BRS of the set of BRSs, and each measured signal quality may correspond to a beam of the set of beams. In an aspect, the apparatus 2102/2102' may include means for maintaining a set of candidate beam indexes corresponding to a set of best measured signal qualities of the set of BRSs.

The apparatus 2102/2102' may further include means for transmitting, to the base station, BSI indicating at least one measured signal quality and at least one beam index from the set of maintained candidate beam indexes, the at least one beam index corresponding to the at least one measured signal quality. In an aspect, the set of the best measured signal qualities is a set of the highest measured signal qualities. In an aspect, N candidate beam indexes are maintained in the set of candidate beam indexes, and N may be predetermined. In an aspect, the set of best measured signal qualities of the set of BRSs is based on a most recent set of signal qualities of the set of BRSs, a filtered set of signal qualities of the set of BRSs, or a time-averaged set of signal qualities of the set of BRSs. In an aspect, the maintenance of the set of candidate beam indexes is based on at least one hysteresis criteria for including a beam index in or excluding a beam index from the set of candidate beam indexes. In an aspect, the apparatus 2102/2102' may further include means for receiving, from the base station, an indication of one or more beam indexes that are to be excluded from the maintained set of candidate beam indexes. In an aspect, the signal quality comprises at least one of a BRSRP, a BRSRQ, an SIR, an SNR, or an SINR.

The aforementioned means may be one or more of the aforementioned components of the apparatus 2102 and/or the processing system 2214 of the apparatus 2102' configured to perform the functions recited by the aforementioned means. As described supra, the processing system 2214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 23:
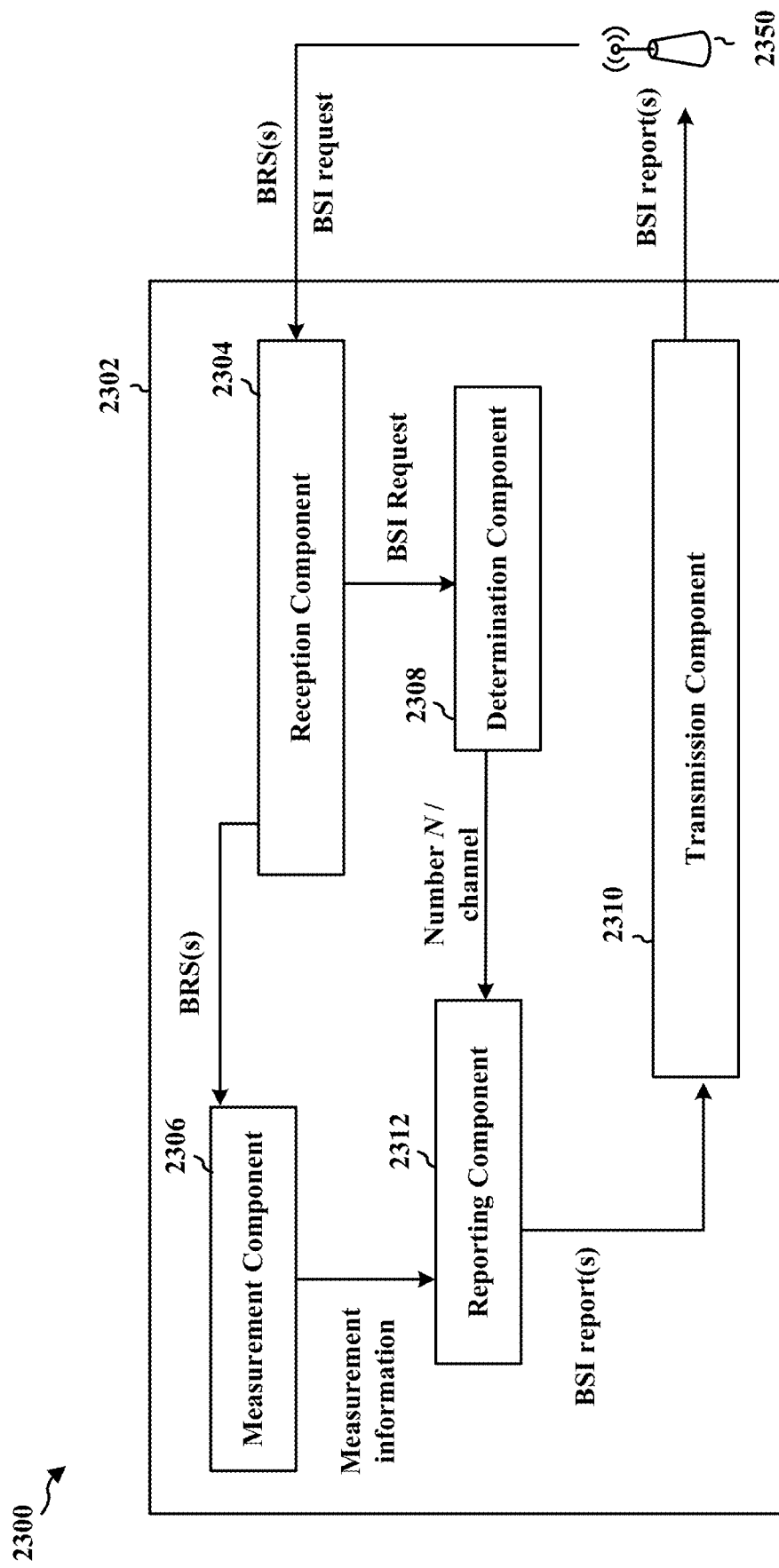
FIG. 23 is a conceptual data flow diagram illustrating the data flow between different means/components in an exemplary apparatus.

FIG. 23 is a conceptual data flow diagram 2300 illustrating the data flow between different means/components in an exemplary apparatus 2302. The apparatus may be a UE. The data flow illustrated in the diagram 2300 is to be regarded as illustrative. Therefore, one or more additional means/components may be present, and one or more illustrated means/components may be absent, according to various aspects. Further, various data flow may occur between means/components in addition to and/or instead of the illustrated data flow.

The apparatus 2302 may include a reception component 2304 configured to receive signals from a base station (e.g., the base station 2350, a mmW base station, an eNB, etc.). The apparatus 2302 may further include a transmission component 2310 configured to transmit signals to a base station (e.g., the base station 2350, a mmW base station, an eNB, etc.).

In aspects, the reception component 2304 may receive, from the base station 2350, a set of signals (e.g., a signal may be an aspect of a BRS) through a set of beams. Each signal of the set of signals may correspond to a beam, and each beam may correspond to a beam index (ergo, each signal may correspond to a beam index). Each signal may be received through a respective beam that may be used for communication between the apparatus 2302 and the base station 2350. The reception component 2304 may provide the set of BRSs to a measurement component 2306.

The measurement component 2306 may be configured to determine a received power for each signal of the set of signals received through each beam of the set of beams. Each received power may be associated with a beam of the set of beams. For example, the measurement component 2306 may measure at least one of a BRSRP.

The measurement component 2306 may provide, to the reporting component 2312, measurement information. The measurement information may include one or more beam indexes and one or more received powers (e.g., a first beam index and a corresponding first received power, a second beam index and a corresponding second received power, etc.).

In one aspect, the reporting component 2312 may be configured to maintain a set of candidate beam indexes. The set of candidate beam indexes may include a predetermined number of candidate beam indexes (e.g., four candidate beam indexes) and a respective received power for each BRS corresponding to each beam index of the predetermined number of candidate beam indexes. In an aspect, the set of candidate beam indexes may include a set of beam indexes corresponding to the highest received powers for a set of BRSs. The reporting component 2312 may sort the set of candidate beam indexes in decreasing order of highest received power, beginning with the beam index corresponding to the highest received power.

The reporting component 2312 may be configured to generate one or more BSI reports. The reporting component 2312 may generate a BSI report to include at least a beam index and a corresponding received power. The reporting component 2312 may select a beam index and corresponding received power from the maintained set of candidate beam indexes. The reporting component 2312 may be configured to cause the transmission component 2310 to send one or more BSI reports to the base station 2350. The number N of BSI reports to transmit to the base station 2350 may be determined by the determination component 2308. Additionally, the determination component 2308 may determine a channel that is to carry the one or more BSI reports, and indicate the determined channel to the reporting component 2312 so that the one or more BSI reports are carried on the determined channel.

According to aspects, the determination component 2308 may determine the number N of BSI reports to send to the base station 2350 based on a message requesting BSI. For example, the determination component 2308 may determine the number N based on a type of the message received from the base station 2350.

In an aspect, the type of message requesting BSI may be a DCI message (e.g., a downlink DCI message). The determination component 2308 may determine that the number N of BSI reports to send to the base station 2350 is one when the message requesting BSI is indicated by a DCI message (e.g., a downlink DCI message). In an aspect, the determination component 2308 may determine that the one BSI report is to be carried on a PUCCH (e.g., an ePUCCH).

In another aspect, the determination component 2308 may determine that the number N of BSI reports to send to the base station 2350 is different from one when the message requesting BSI is indicated by an uplink DCI message. For example, the determination component 2308 may determine that the number N is zero, two, or four based on an indication included in the uplink DCI message. When the determination component 2308 determines that the number N is greater than one (e.g., two or four), the determination component 2308 may determine that the BSI reports are to be carried on a PUSCH (e.g., an ePUSCH).

In another aspect, the type of message requesting BSI may be an RAR message (e.g., a MSG2, an uplink grant associated with a RACH procedure, etc.). The determination component 2308 may determine that the number N of BSI reports to send to the base station 2350 is different from one when the message requesting BSI is indicated by an RAR message. For example, the determination component 2308 may determine that the number N is zero, two, or four based on an indication included in the RAR message. When the determination component 2308 determines that the number N is greater than one (e.g., two or four), the determination component 2308 may determine that the BSI reports are to be carried on a PUSCH (e.g., an ePUSCH).

The determination component 2308 may indicate, to the reporting component 2312, the number N and/or the channel on which the BSI report(s) are to be carried. As described, the reporting component 2312 may cause the transmission component 2310 to send, to the base station 2350, the N BSI report(s) on the indicated channel.

The apparatus may include additional components that perform each of the blocks of the algorithm in the aforementioned flowcharts of FIG. 14. As such, each block in the aforementioned flowcharts of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 24:
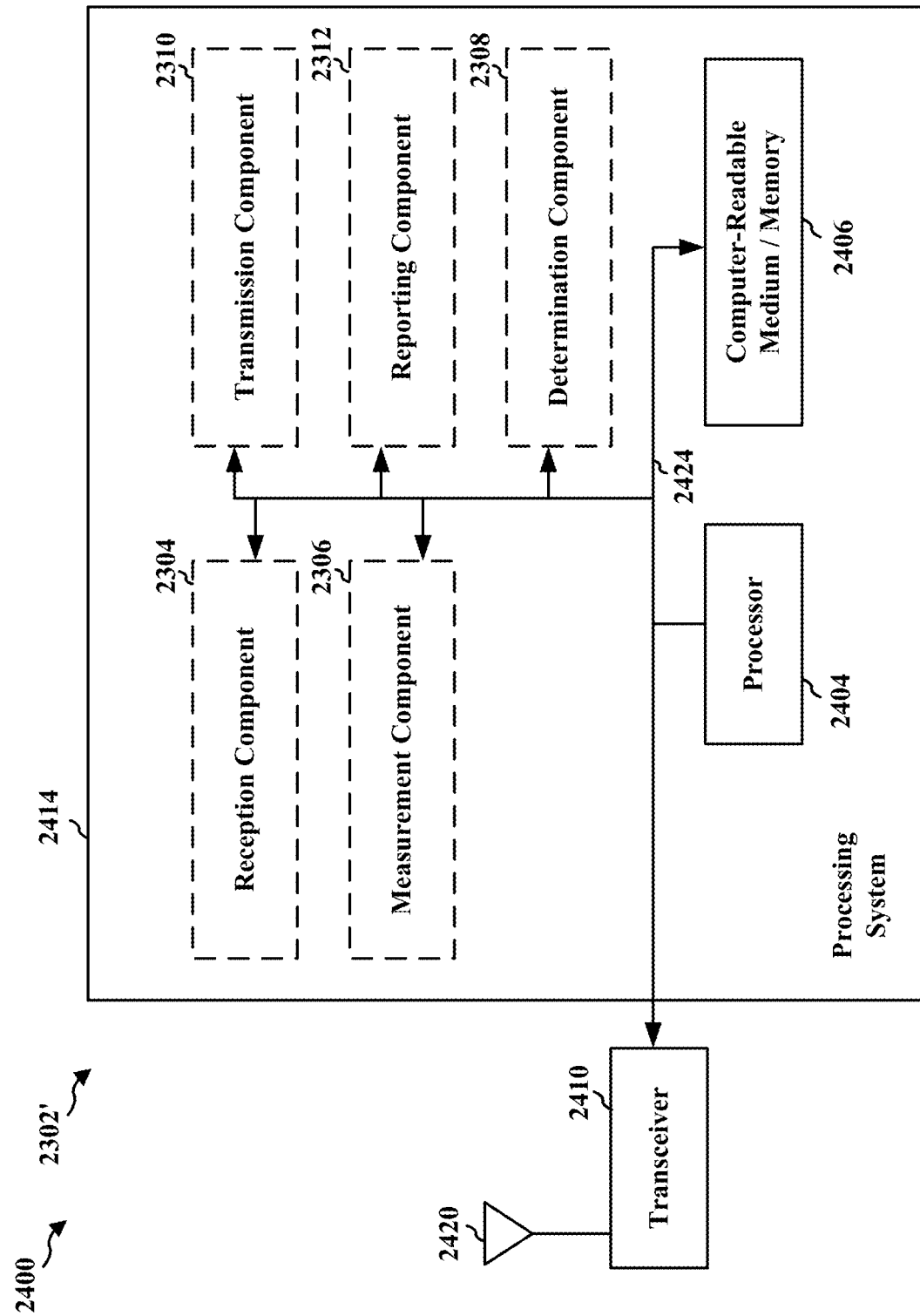
FIG. 24 is a diagram illustrating an example of a hardware implementation for an apparatus employing a processing system.

FIG. 24 is a diagram 2400 illustrating an example of a hardware implementation for an apparatus 2302' employing a processing system 2414. The processing system 2414 may be implemented with a bus architecture, represented generally by the bus 2424. The bus 2424 may include any number of interconnecting buses and bridges depending on the specific application of the processing system 2414 and the overall design constraints. The bus 2424 links together various circuits including one or more processors and/or hardware components, represented by the processor 2404, the components 2304, 2306, 2308, 2310, 2312 and the computer-readable medium/memory 2406. The bus 2424 may also link various other circuits such as timing sources, peripherals, voltage regulators, and power management circuits, which are well known in the art, and therefore, will not be described any further.

The processing system 2414 may be coupled to a transceiver 2410. The transceiver 2410 is coupled to one or more antennas 2420. The transceiver 2410 provides a means for communicating with various other apparatus over a transmission medium. The transceiver 2410 receives a signal from the one or more antennas 2420, extracts information from the received signal, and provides the extracted information to the processing system 2414, specifically the reception component 2304. In addition, the transceiver 2410 receives information from the processing system 2414, specifically the transmission component 2310, and based on the received information, generates a signal to be applied to the one or more antennas 2420. The processing system 2414 includes a processor 2404 coupled to a computer-readable medium/memory 2406. The processor 2404 is responsible for general processing, including the execution of software stored on the computer-readable medium/memory 2406. The software, when executed by the processor 2404, causes the processing system 2414 to perform the various functions described supra for any particular apparatus. The computer-readable medium/memory 2406 may also be used for storing data that is manipulated by the processor 2404 when executing software. The processing system 2414 further includes at least one of the components 2304, 2306, 2308, 2310, 2312. The components may be software components running in the processor 2404, resident/stored in the computer readable medium/memory 2406, one or more hardware components coupled to the processor 2404, or some combination thereof. The processing system 2414 may be a component of the UE 350 and may include the memory 360 and/or at least one of the TX processor 368, the RX processor 356, and the controller/processor 359.

In one configuration, the apparatus 2302/2302' for wireless communication includes means for receiving, from a base station, a message requesting BSI. The apparatus 2302/2302' may further include means for determining a number N of BSI reports to send to the base station, each BSI report indicating a beam index corresponding to a beam and a received power associated with the beam. The apparatus 2302/2302' may further include means for sending, to the base station, N BSI reports based on the message requesting BSI.

In an aspect, the apparatus 2302/2302' may further include means for receiving, from the base station, a set of signals through a set of beams. The apparatus 2302/2302' may further include means for determining the received power for each signal of the set of signals received through each beam of the set of beams, each received power associated with a beam of the set of beams.

In an aspect, the N BSI reports include N received powers corresponding to the highest determined received powers. In an aspect, the determination of the number N of BSI reports to send to the base station is based on a type of the message requesting the BSI. In an aspect, the type of the message requesting the BSI comprises a DCI message. In an aspect, the number N of BSI reports to send to the base station is determined to be one based on the DCI message. In an aspect, the determined number N of BSI reports are sent on a PUCCH. In an aspect, the type of message requesting the BSI comprises an RAR message. In an aspect, the number N of BSI reports is determined to be greater than one based on the RAR message. In an aspect, the determined number N of BSI reports are sent on a PUSCH.

The aforementioned means may be one or more of the aforementioned components of the apparatus 2302 and/or the processing system 2414 of the apparatus 2302' configured to perform the functions recited by the aforementioned means. As described supra, the processing system 2414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 25:
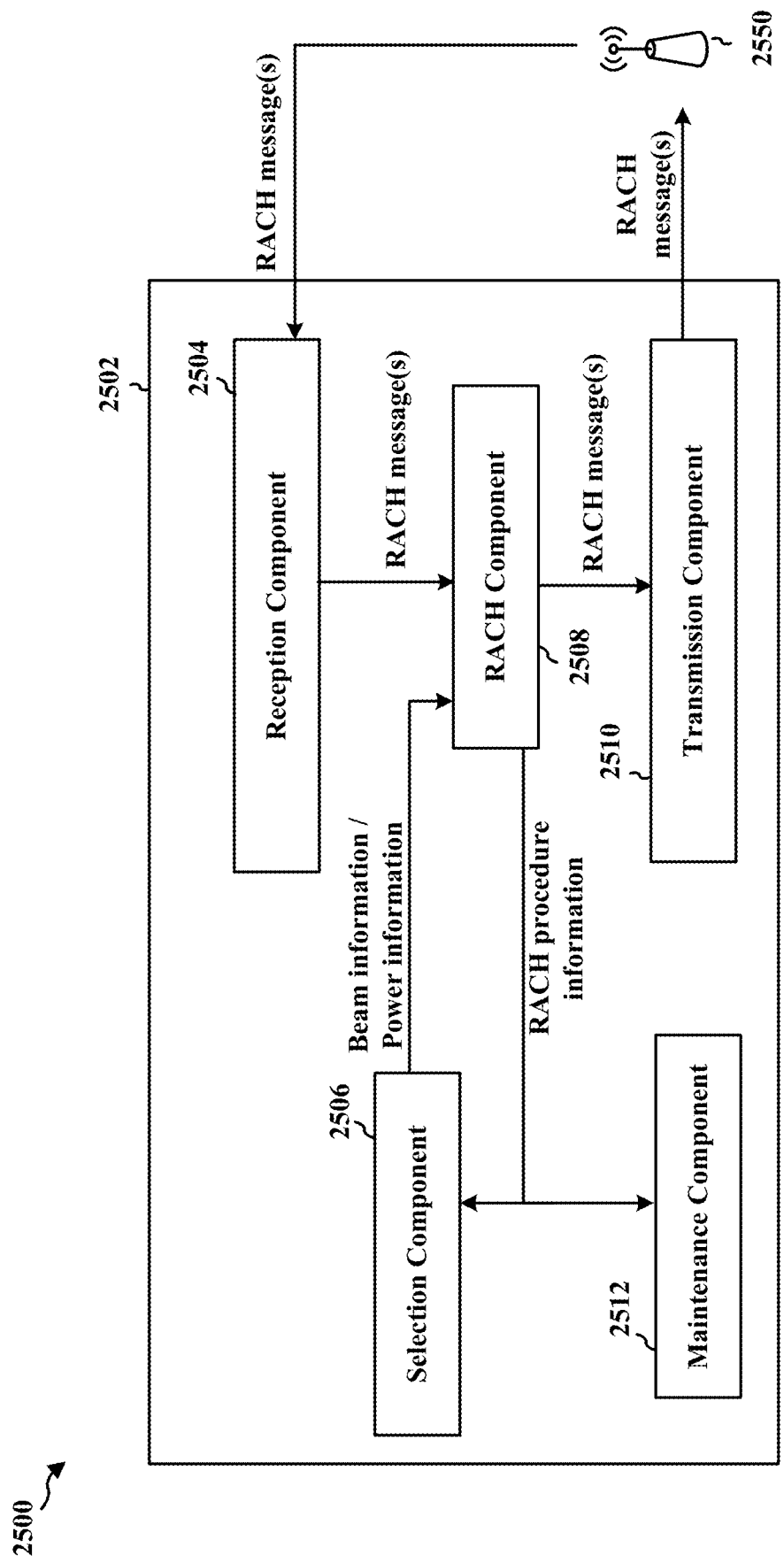
FIG. 25 is a conceptual data flow diagram illustrating the data flow between different means/components in an exemplary apparatus.

FIG. 25 is a conceptual data flow diagram 2500 illustrating the data flow between different means/components in an exemplary apparatus 2502. The apparatus may be a UE. The data flow illustrated in the diagram 2500 is to be regarded as illustrative. Therefore, one or more additional means/components may be present, and one or more illustrated means/components may be absent, according to various aspects. Further, various data flow may occur between means/components in addition to and/or instead of the illustrated data flow.

The apparatus 2502 may include a reception component 2504 configured to receive signals from a base station (e.g., the base station 2550, a mmW base station, an eNB, etc.). The apparatus 2502 may further include a transmission component 2510 configured to transmit signals to a base station (e.g., the base station 2550, a mmW base station, an eNB, etc.).

In an aspect, the apparatus 2502 may include a selection component 2506. The selection component 2506 may be configured to select a first beam for communication with the base station 2550. For example, the selection component 2506 may select the first beam based on an estimation or determination of a beam through which the selection component 2506 expects the base station 2550 to be able to receive signals from the apparatus 2502.

In one aspect, the selection component 2506 may select the first beam based on reception of one or more BRSs from the base station 2550. The selection component 2506 may select a beam corresponding to a BRS with a highest received power or quality (e.g., a highest BRSRP). For example, the selection component 2506 may determine a beam index corresponding to a BRS with a highest received power or quality and select a beam corresponding to that beam index. The selection component 2506 may provide, to a RACH component 2508, an indication of the selected first beam (e.g., a first beam index corresponding to the selected first beam).

The RACH component 2508 may be configured to perform a RACH procedure with the base station 2550. For example, the RACH component 2508 may determine that a RACH procedure is successful when the RACH component 2508 receives, from the base station 2550, a contention resolution message (e.g., a MSG4) and/or when the RACH component 2508 causes the apparatus 2502 to be synchronized with a network that includes the base station 2550.

In an aspect, the RACH component 2508 may perform a RACH procedure that includes communication of a plurality of RACH messages between the apparatus 2502 and the base station 2550. For example, the RACH procedure may include transmission of a random access preamble (e.g., a MSG1) to the base station 2550, reception of an RAR message (e.g., a MSG2) from the base station 2550 based on the random access preamble, transmission of a connection request message (e.g., a MSG3) to the base station 2550 based on the RAR message, and reception of a contention resolution message (e.g., a MSG4) from the base station 2550 based on the connection request message.

The RACH component 2508 may be configured to determine that a RACH procedure with the base station 2550 failed. For example, if the RACH component 2508 fails to receive and/or decode an RAR message or a contention resolution message, then the RACH component 2508 may determine that the RACH procedure with the base station 2550 has failed.

In an aspect, the RACH component 2508 may attempt, through the selected first beam, at least one RACH procedure. For example, the RACH component 2508 may cause the transmission component 2510 to send, through the selected first beam, a random access preamble. Additionally, the RACH component 2508 may cause the transmission component 2510 to send, through the selected first beam, a connection request message based on an RAR message.

In an aspect, the RACH component 2508 may determine that the at least one RACH procedure with the base station 2550 has failed. For example, the RACH component 2508 may fail to receive and/or decode an RAR message or a contention resolution message. The RACH component 2508 may provide information indicating the at least one RACH procedure failed to the selection component 2506 and/or a maintenance component 2512.

According to an aspect, the information indicating that the at least one RACH procedure failed may include information associated with the selected first beam (e.g., a first beam index corresponding to the selected first beam). According to an aspect, the information indicating that the at least one RACH procedure failed may include information indicating a subframe in which a RACH message associated with the RACH procedure is carried.

In one aspect, the selection component 2506 may select a new beam for communication with the base station 2550 based on the information indicating that the at least one RACH procedure failed. In another aspect, the selection component 2506 may determine an increased transmission power for transmission of RACH messages based on the information indicating that the at least one RACH procedure failed. The selection component 2506 may indicate, to the RACH component 2508, the new beam (e.g., a new beam index corresponding to the new beam) and/or the increased transmission power.

Accordingly, the RACH component 2508 may attempt a next RACH procedure through the new beam and/or using the increased transmission power. When next RACH procedure is successful, the RACH component 2508 may indicate, to the maintenance component 2512, that the next RACH procedure with the base station 2550 succeeded.

In an aspect, the maintenance component 2512 may store the information indicating that the at least one RACH procedure failed. For example, the maintenance component 2512 may store information associated with the selected first beam (e.g., a first beam index corresponding to the selected first beam).

In one aspect, the maintenance component 2512 may be configured to maintain a set of candidate beam indexes. The set of candidate beam indexes may include a predetermined number of candidate beam indexes (e.g., four candidate beam indexes) and a respective received power for each BRS corresponding to each beam index of the predetermined number of candidate beam indexes. In an aspect, the set of candidate beam indexes may include a set of beam indexes corresponding to the BRSs having the highest received powers. The maintenance component 2512 may sort the set of candidate beam indexes in decreasing order of highest received power, beginning with the beam index corresponding to the highest received power. In an aspect, the maintenance component 2512 may be configured to exclude, from the set of candidate beam indexes, the first beam index corresponding to the selected first beam.

When the next RACH procedure with the base station 2550 succeeds, the maintenance component 2512 may send, to the base station 2550, information indicating that the at least one RACH procedure failed. In an aspect, the information indicating that the at least one RACH procedure failed may include information associated with the selected first beam (e.g., a first beam index corresponding to the selected first beam). In another aspect, the information indicating that the at least one RACH procedure failed may include an indication of a subframe in which a RACH message associated with the at least one RACH procedure is carried. For example, the information may indicate a subframe in which a random access preamble is carried or a subframe in which a connection request message is carried.

In one aspect, the maintenance component 2512 may generate a BSI report. The maintenance component 2512 may generate the BSI report to indicate the information associated with the at least failed RACH procedure (e.g., a first beam index corresponding to the selected first beam). The maintenance component 2512 may cause the transmission component 2510 to send the BSI report to the base station 2550, for example, through the new beam associated with the successful RACH procedure.

The apparatus may include additional components that perform each of the blocks of the algorithm in the aforementioned flowcharts of FIG. 15. As such, each block in the aforementioned flowcharts of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 26:
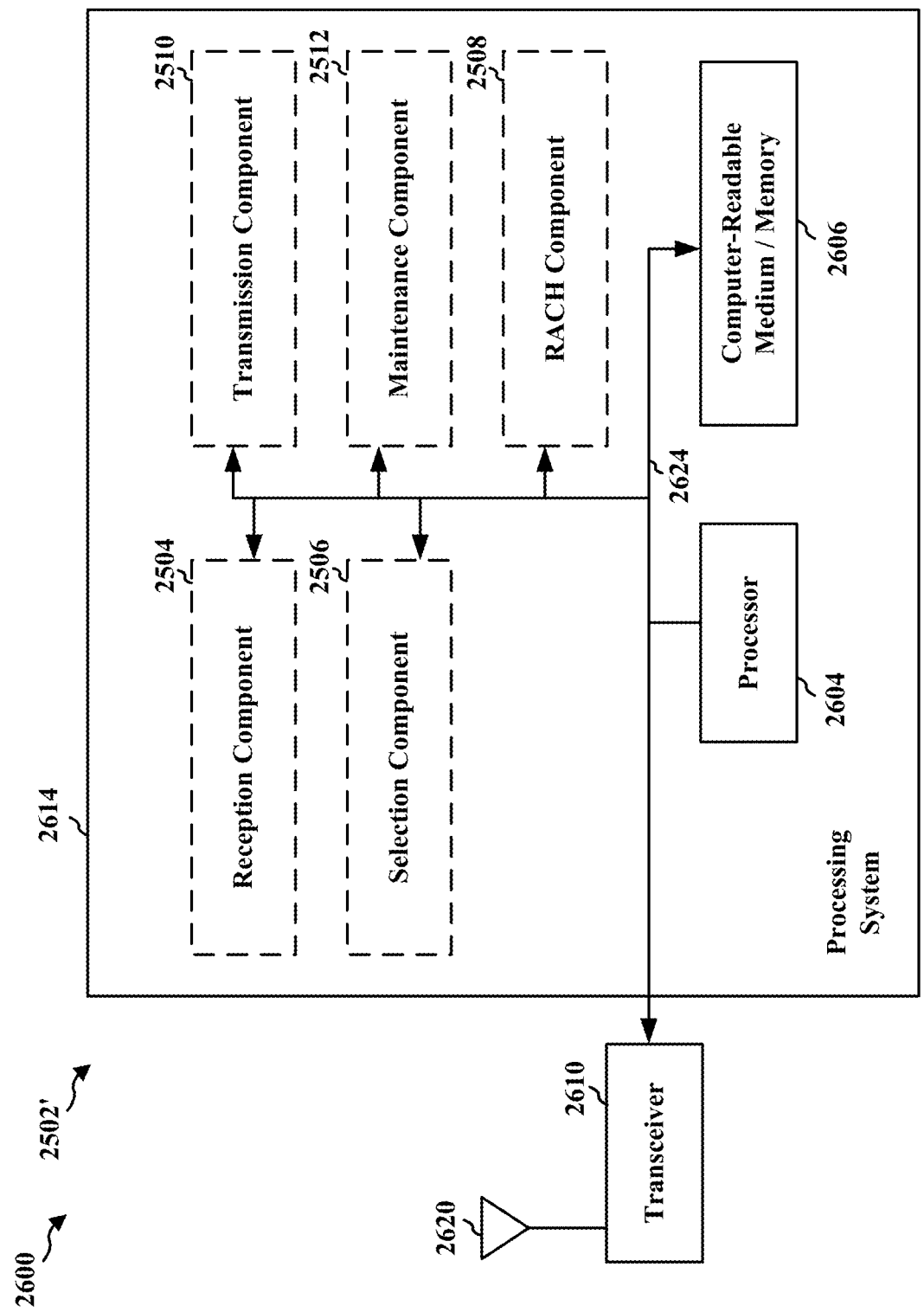
FIG. 26 is a diagram illustrating an example of a hardware implementation for an apparatus employing a processing system.

FIG. 26 is a diagram 2600 illustrating an example of a hardware implementation for an apparatus 2502' employing a processing system 2614. The processing system 2614 may be implemented with a bus architecture, represented generally by the bus 2624. The bus 2624 may include any number of interconnecting buses and bridges depending on the specific application of the processing system 2614 and the overall design constraints. The bus 2624 links together various circuits including one or more processors and/or hardware components, represented by the processor 2604, the components 2504, 2506, 2508, 2510, 2512 and the computer-readable medium/memory 2606. The bus 2624 may also link various other circuits such as timing sources, peripherals, voltage regulators, and power management circuits, which are well known in the art, and therefore, will not be described any further.

The processing system 2614 may be coupled to a transceiver 2610. The transceiver 2610 is coupled to one or more antennas 2620. The transceiver 2610 provides a means for communicating with various other apparatus over a transmission medium. The transceiver 2610 receives a signal from the one or more antennas 2620, extracts information from the received signal, and provides the extracted information to the processing system 2614, specifically the reception component 2504. In addition, the transceiver 2610 receives information from the processing system 2614, specifically the transmission component 2510, and based on the received information, generates a signal to be applied to the one or more antennas 2620. The processing system 2614 includes a processor 2604 coupled to a computer-readable medium/memory 2606. The processor 2604 is responsible for general processing, including the execution of software stored on the computer-readable medium/memory 2606. The software, when executed by the processor 2604, causes the processing system 2614 to perform the various functions described supra for any particular apparatus. The computer-readable medium/memory 2606 may also be used for storing data that is manipulated by the processor 2604 when executing software. The processing system 2614 further includes at least one of the components 2504, 2506, 2508, 2510, 2512. The components may be software components running in the processor 2604, resident/stored in the computer readable medium/memory 2606, one or more hardware components coupled to the processor 2604, or some combination thereof. The processing system 2614 may be a component of the UE 350 and may include the memory 360 and/or at least one of the TX processor 368, the RX processor 356, and the controller/processor 359.

In one configuration, the apparatus 2502/2502' for wireless communication includes means for selecting a first beam for communication with a base station. The apparatus 2502/2502' may further include means for attempting, through the selected first beam, at least one RACH procedure with the base station. The apparatus 2502/2502' may further include means for determining that the at least one RACH procedure failed with the base station. The apparatus 2502/2502' may further include means for sending, after a successful RACH procedure with the base station, information indicating that the at least one RACH procedure failed.

In an aspect, the apparatus 2502/2502' may further include means for selecting a new beam for communication with the base station after the determination that the at least one RACH procedure failed. In an aspect, at least a portion of the successful RACH procedure is performed through the selected new beam.

In an aspect, the apparatus 2502/2502' may further include means for increasing a transmission power after the determination that the at least one RACH procedure failed. In an aspect, at least a portion of the successful RACH procedure is performed with the increased transmission power.

In an aspect, the apparatus 2502/2502' may further include means for storing information associated with the selected first beam based on the determination that the at least one RACH procedure failed. In an aspect, the information indicating that the at least one RACH procedure failed includes the stored information associated with the first beam. In an aspect, the information indicating that the at least one RACH procedure failed includes an indication of a subframe in which a RACH message associated with the at least one RACH procedure is carried.

In an aspect, the apparatus 2502/2502' may further include means for excluding the selected first beam from a candidate beam set maintained by the apparatus based on the determination that the at least one RACH procedure failed.

In an aspect, the information indicating that the at least one RACH procedure failed comprises a BSI report. In an aspect, the means for attempting the at least one RACH procedure is configured to at least one of: transmit, to the base station, a random access preamble; receive, from the base station, a random access response based on the random access preamble; transmit, to the base station, a connection request message based on the random access response; or receive a contention resolution message based on the connection request message. In an aspect, the apparatus 2502/2502' is synchronized with a network that includes the base station based on the successful RACH procedure.

The aforementioned means may be one or more of the aforementioned components of the apparatus 2502 and/or the processing system 2614 of the apparatus 2502' configured to perform the functions recited by the aforementioned means. As described supra, the processing system 2614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 27:
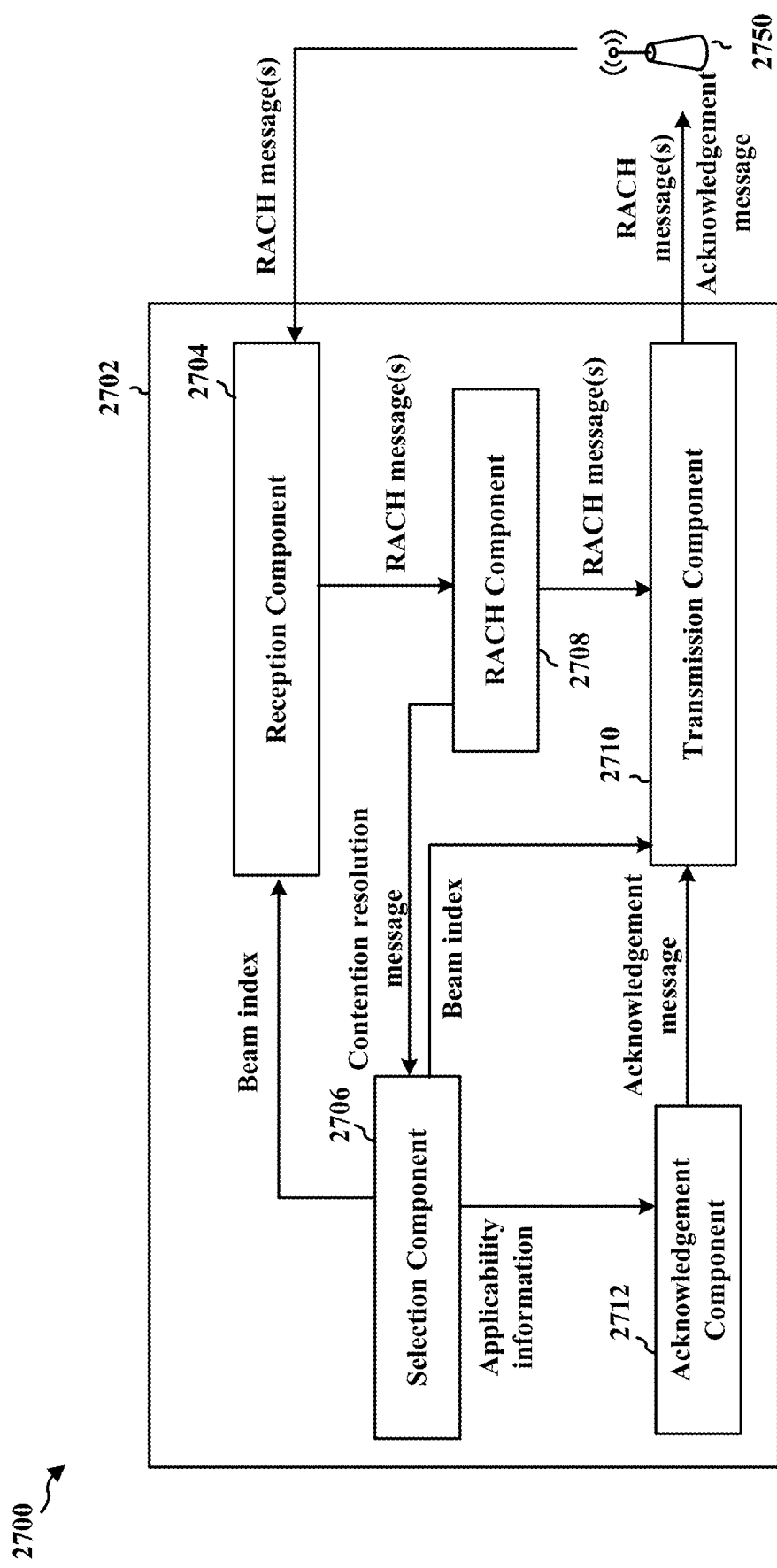
FIG. 27 is a conceptual data flow diagram illustrating the data flow between different means/components in an exemplary apparatus.

FIG. 27 is a conceptual data flow diagram 2700 illustrating the data flow between different means/components in an exemplary apparatus 2702. The apparatus may be a UE. The data flow illustrated in the diagram 2700 is to be regarded as illustrative. Therefore, one or more additional means/components may be present, and one or more illustrated means/components may be absent, according to various aspects. Further, various data flow may occur between means/components in addition to and/or instead of the illustrated data flow.

The apparatus 2702 may include a reception component 2704 configured to receive signals from a base station (e.g., the base station 2750, a mmW base station, an eNB, etc.). The apparatus 2702 may further include a transmission component 2710 configured to transmit signals to a base station (e.g., the base station 2750, a mmW base station, an eNB, etc.).

The apparatus 2702 may include a RACH component 2708 that may be configured to perform a RACH procedure with the base station 2750. In an aspect, the RACH component 2708 may perform a RACH procedure that includes communication of a plurality of RACH messages between the apparatus 2702 and the base station 2750. For example, the RACH procedure may include transmission of a random access preamble (e.g., a MSG1) to the base station 2750, reception of an RAR message (e.g., a MSG2) from the base station 2750 based on the random access preamble, transmission of a connection request message (e.g., a MSG3) to the base station 2750 based on the RAR message, and reception of a contention resolution message (e.g., a MSG4) from the base station 2750 based on the connection request message.

In an aspect, the RACH component 2708 may provide a contention resolution message (e.g., a MSG4) to a selection component 2706. The selection component 2706 may be configured to select a new beam for communication with the base station 2750 based on the information included in the contention resolution message.

The selection component 2706 may be configured to determine whether a beam index included in the contention resolution message is applicable to the apparatus 2702, and the beam index may be indicated by the contention resolution message. In one aspect, the selection component 2706 may determine whether the beam index included in the contention resolution message is intended for the apparatus 2702. For example, the selection component 2706 may attempt to decode the contention resolution message based on an RNTI associated with the apparatus 2702 (e.g., an RNTI determined as part of a RACH procedure). The selection component 2706 may determine that the beam index included in the contention resolution message is applicable to the apparatus 2702 when the selection component 2706 successfully decodes the contention resolution message.

In an aspect, the selection component 2706 may provide an indication of the beam index to the reception component 2704 and/or the transmission component 2710. Therefore, the reception component 2704 and/or the transmission component 2710 may communicate with the base station 2750 through the beam corresponding to the beam index.

In an aspect, the selection component 2706 may determine one or more channels associated with the beam index, for example, as indicated by the contention resolution message. The selection component 2706 may provide an indication of the one or more channels to the reception component 2704 (e.g., for downlink channels) and/or the transmission component 2710 (e.g., for uplink channels). The reception component 2704 and/or the transmission component 2710 may then communicate with the base station 2750 through the beam corresponding to the beam index on the one or more indicated channels.

In an aspect, the selection component 2706 may provide an indication of whether the beam index is applicable to the apparatus 2702 to an acknowledgement component 2712. The acknowledgement component 2712 may be configured to determine whether to transmit feedback (e.g., acknowledgement/non-acknowledgement feedback) to the base station 2750. In an aspect, when the selection component 2706 indicates to the acknowledgement component 2712 that the beam index is applicable to the apparatus 2702, the acknowledgement component 2712 may generate an acknowledgement message and cause the transmission component 2710 to transmit the acknowledgement message to the base station 2750. In an aspect, when the selection component 2706 indicates to the acknowledgement component 2712 that the beam index is inapplicable to the apparatus 2702 or when the selection component 2706 indicates that the selection component 2706 is unable to successfully decode the contention resolution message, the acknowledgement component 2712 may refrain from sending a non-acknowledgment message to the base station 2750.

The apparatus may include additional components that perform each of the blocks of the algorithm in the aforementioned flowcharts of FIG. 16. As such, each block in the aforementioned flowcharts of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 28:
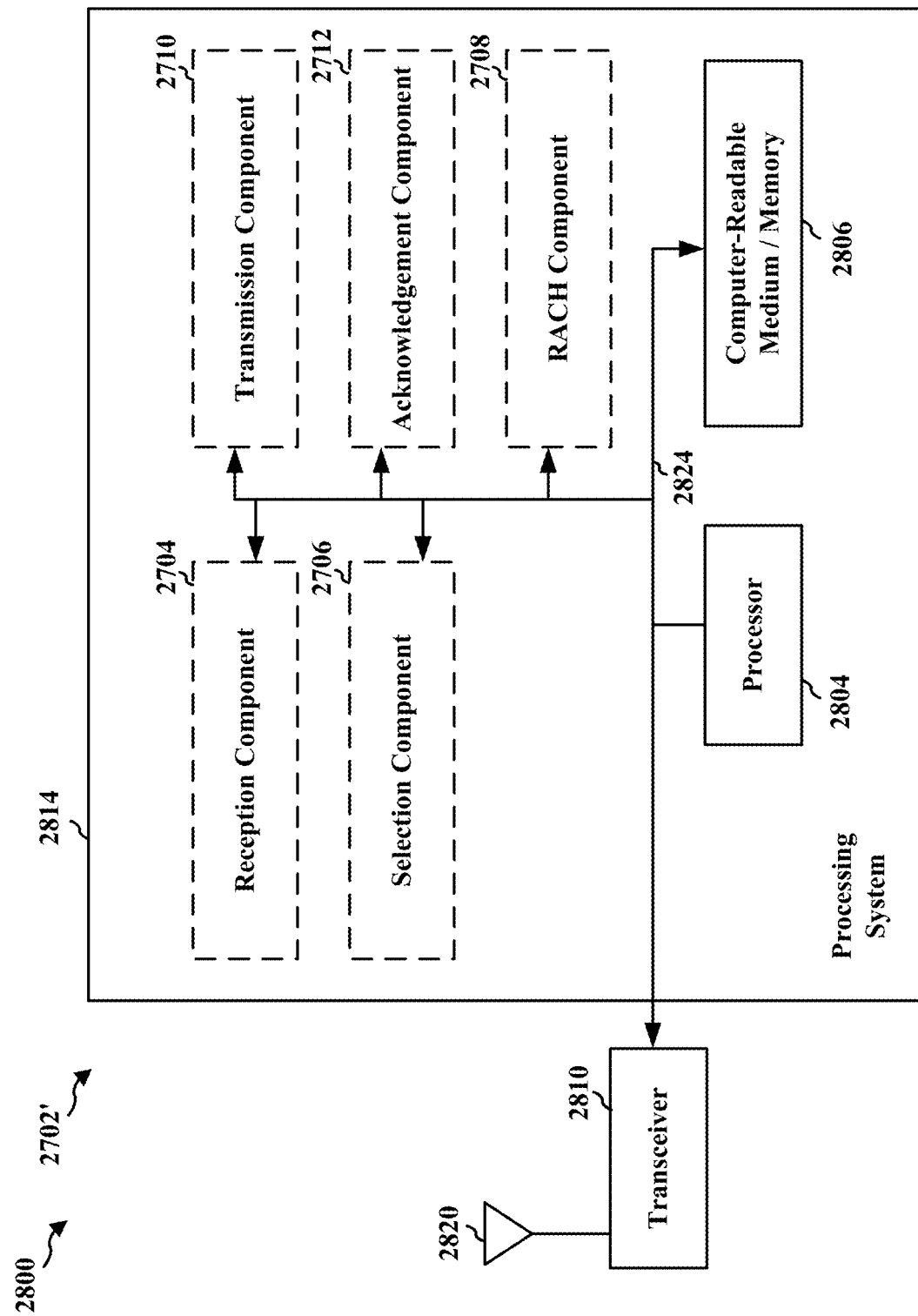
FIG. 28 is a diagram illustrating an example of a hardware implementation for an apparatus employing a processing system.

FIG. 28 is a diagram 2800 illustrating an example of a hardware implementation for an apparatus 2702' employing a processing system 2814. The processing system 2814 may be implemented with a bus architecture, represented generally by the bus 2824. The bus 2824 may include any number of interconnecting buses and bridges depending on the specific application of the processing system 2814 and the overall design constraints. The bus 2824 links together various circuits including one or more processors and/or hardware components, represented by the processor 2804, the components 2704, 2706, 2708, 2710, 2712 and the computer-readable medium/memory 2806. The bus 2824 may also link various other circuits such as timing sources, peripherals, voltage regulators, and power management circuits, which are well known in the art, and therefore, will not be described any further.

The processing system 2814 may be coupled to a transceiver 2810. The transceiver 2810 is coupled to one or more antennas 2820. The transceiver 2810 provides a means for communicating with various other apparatus over a transmission medium. The transceiver 2810 receives a signal from the one or more antennas 2820, extracts information from the received signal, and provides the extracted information to the processing system 2814, specifically the reception component 2704. In addition, the transceiver 2810 receives information from the processing system 2814, specifically the transmission component 2710, and based on the received information, generates a signal to be applied to the one or more antennas 2820. The processing system 2814 includes a processor 2804 coupled to a computer-readable medium/memory 2806. The processor 2804 is responsible for general processing, including the execution of software stored on the computer-readable medium/memory 2806. The software, when executed by the processor 2804, causes the processing system 2814 to perform the various functions described supra for any particular apparatus. The computer-readable medium/memory 2806 may also be used for storing data that is manipulated by the processor 2804 when executing software. The processing system 2814 further includes at least one of the components 2704, 2706, 2708, 2710, 2712. The components may be software components running in the processor 2804, resident/stored in the computer readable medium/memory 2806, one or more hardware components coupled to the processor 2804, or some combination thereof. The processing system 2814 may be a component of the UE 350 and may include the memory 360 and/or at least one of the TX processor 368, the RX processor 356, and the controller/processor 359.

In one configuration, the apparatus 2702/2702' for wireless communication includes means for receiving, from a base station, a contention resolution message, the contention resolution message indicating at least a beam index corresponding to a beam. The apparatus 2702/2702' may further include means for determining whether the beam index is applicable to the apparatus 2702/2702'. The apparatus 2702/2702' may further include means for communicating with the base station through the beam corresponding to the beam index when the beam index is applicable to the apparatus 2702/2702'.

In an aspect, the apparatus 2702/2702' may further include means for transmitting, to the base station, an acknowledgement message when the beam index is determined to be applicable to the apparatus 2702/2702'. In an aspect, the contention resolution message is associated with a random access procedure. In an aspect, the means for determining whether the beam index is applicable to the apparatus 2702/2702' is configured to attempt to decode the contention resolution message based on a RNTI associated with the apparatus 2702/2702', and the beam index is determined to be applicable to the apparatus 2702/2702' when the contention resolution message is successfully decoded.

In an aspect, the apparatus 2702/2702' further includes means for refraining from transmitting a non-acknowledgement message to the base station when the beam index is determined to be inapplicable to the apparatus 2702/2702' or if the contention resolution message is unsuccessfully decoded. In an aspect, the contention resolution message further includes an indication of one or more channels associated with the beam index, and the communication with the base station through the beam corresponding to the beam index is performed on the one or more indicated channels.

In an aspect, the apparatus 2702/2702' further includes means for transmitting, to the base station, a random access preamble. The apparatus 2702/2702' further includes means for receiving, from the base station, a random access response based on the random access preamble. The apparatus 2702/2702' further includes means for transmitting, to the base station, a connection request message based on the random access response. In an aspect, the contention resolution message is transmitted based on the connection request message.

The aforementioned means may be one or more of the aforementioned components of the apparatus 2702 and/or the processing system 2814 of the apparatus 2702' configured to perform the functions recited by the aforementioned means. As described supra, the processing system 2814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 29:
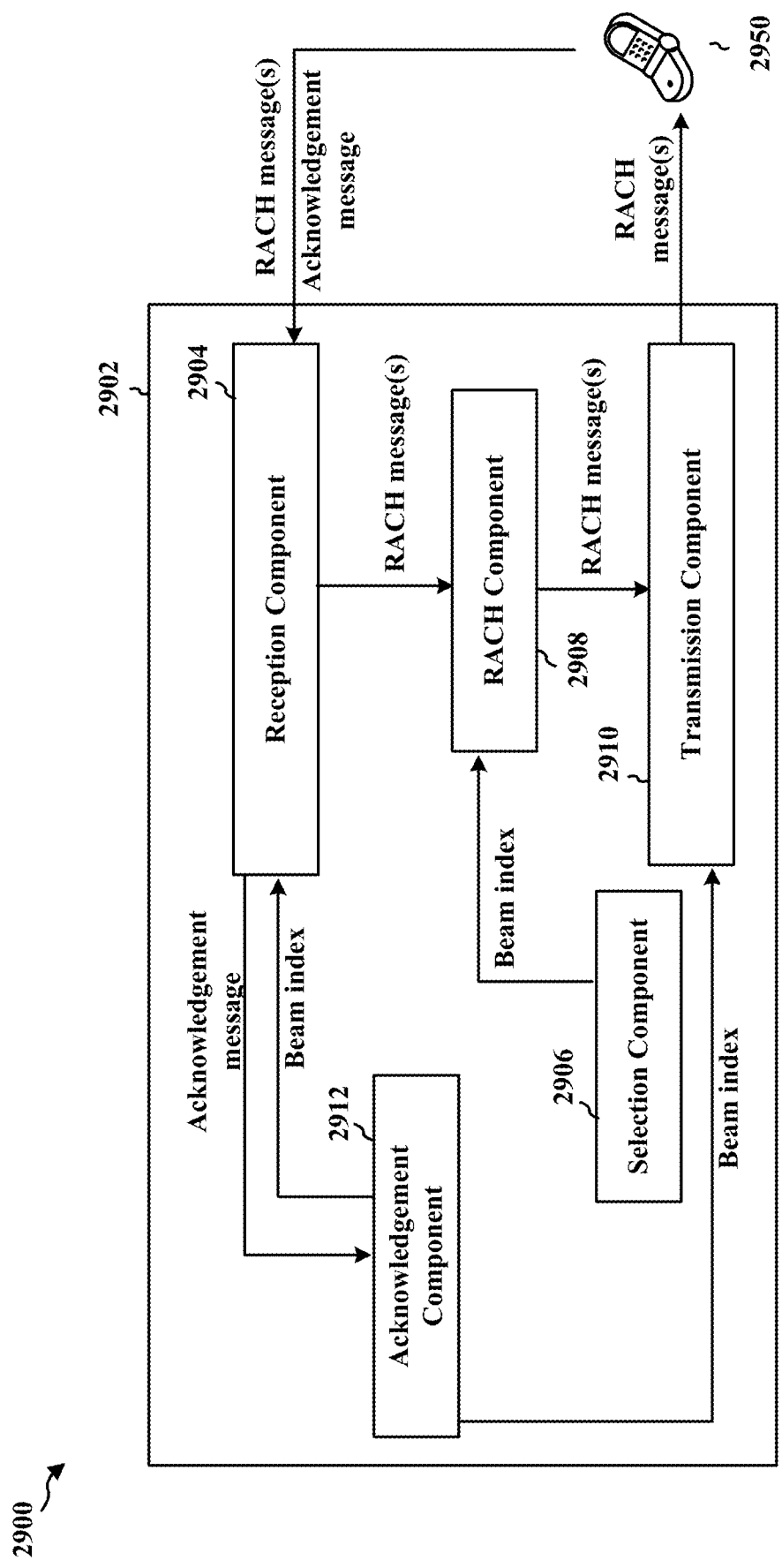
FIG. 29 is a conceptual data flow diagram illustrating the data flow between different means/components in an exemplary apparatus.

FIG. 29 is a conceptual data flow diagram 2900 illustrating the data flow between different means/components in an exemplary apparatus 2902. The apparatus may be a base station. The data flow illustrated in the diagram 2900 is to be regarded as illustrative. Therefore, one or more additional means/components may be present, and one or more illustrated means/components may be absent, according to various aspects. Further, various data flow may occur between means/components in addition to and/or instead of the illustrated data flow.

The apparatus 2902 may include a reception component 2904 configured to receive signals from a UE (e.g., the UE 2950, a mmW UE, etc.). The apparatus 2902 may further include a transmission component 2910 configured to transmit signals to a UE (e.g., the UE 2950, a mmW UE, etc.).

The apparatus 2902 may include a RACH component 2908 that may be configured to perform a RACH procedure with the UE 2950. In an aspect, the RACH component 2908 may perform a RACH procedure that includes communication of a plurality of RACH messages between the apparatus 2902 and the UE 2950. For example, the RACH procedure may include reception of a random access preamble (e.g., a MSG1) from the UE 2950, transmission of an RAR message (e.g., a MSG2) to the UE 2950 based on the random access preamble, reception of a connection request message (e.g., a MSG3) from the UE 2950 based on the RAR message, and transmission of a contention resolution message (e.g., a MSG4) to the UE 2950 based on the connection request message.

In an aspect, a selection component 2906 may be configured to determine a beam index applicable to the UE 2950, such as a beam index to be used for communication between the apparatus 2902 and the UE 2950. In one aspect, the selection component 2906 may be configured to determine the beam index based on feedback from the UE 2950 (e.g., feedback based on one or more BRSs transmitted by the apparatus 2902). The selection component 2906 may provide the beam index to the RACH component 2908.

In an aspect, the selection component 2906 may determine one or more channels associated with the beam index, for example, to be indicated by the contention resolution message. The selection component 2906 may provide an indication of the one or more channels to the RACH component 2908 (e.g., for inclusion in a contention resolution message).

The RACH component 2908 may be configured to include, in a contention resolution message, an indication of the beam index (and, optionally, an indication of one or more channels). In an aspect, the RACH component 2908 may indicate that the beam index is applicable to the UE 2950. For example, the RACH component 2908 may scramble the contention resolution message based on an RNTI associated with the UE 2950 (e.g., an RNTI determined as part of a RACH procedure). The RACH component 2908 may cause transmission, to the UE 2950, of the contention resolution message indicating the beam index corresponding to the beam and indicating that the beam index is applicable to the UE 2950.

An acknowledgement component 2912 may be configured to determine whether to feedback (e.g., acknowledgement/non-acknowledgement feedback) is received from the UE 2950. In an aspect, the acknowledgement component 2912 may receive an acknowledgement message from the UE 2950, which may indicate that the UE 2950 acknowledges that communication between the apparatus 2902 and the UE 2950 is to occur on the beam corresponding to the beam index indicated by the contention resolution message. The acknowledgement component 2912 may provide an indication of the beam index to the reception component 2904 and/or the transmission component 2910 (e.g., based on one or more channels on which communication is to occur). The reception component 2904 and/or the transmission component 2910 may then communicate with the UE 2950 through the beam corresponding to the beam index on the one or more channels.

If the acknowledgement component 2912 does not receive an acknowledgement message, communication with the UE 2950 may occur through a serving beam that is used for communication before transmission of the contention resolution message.

The apparatus may include additional components that perform each of the blocks of the algorithm in the aforementioned flowcharts of FIG. 17. As such, each block in the aforementioned flowcharts of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 30:
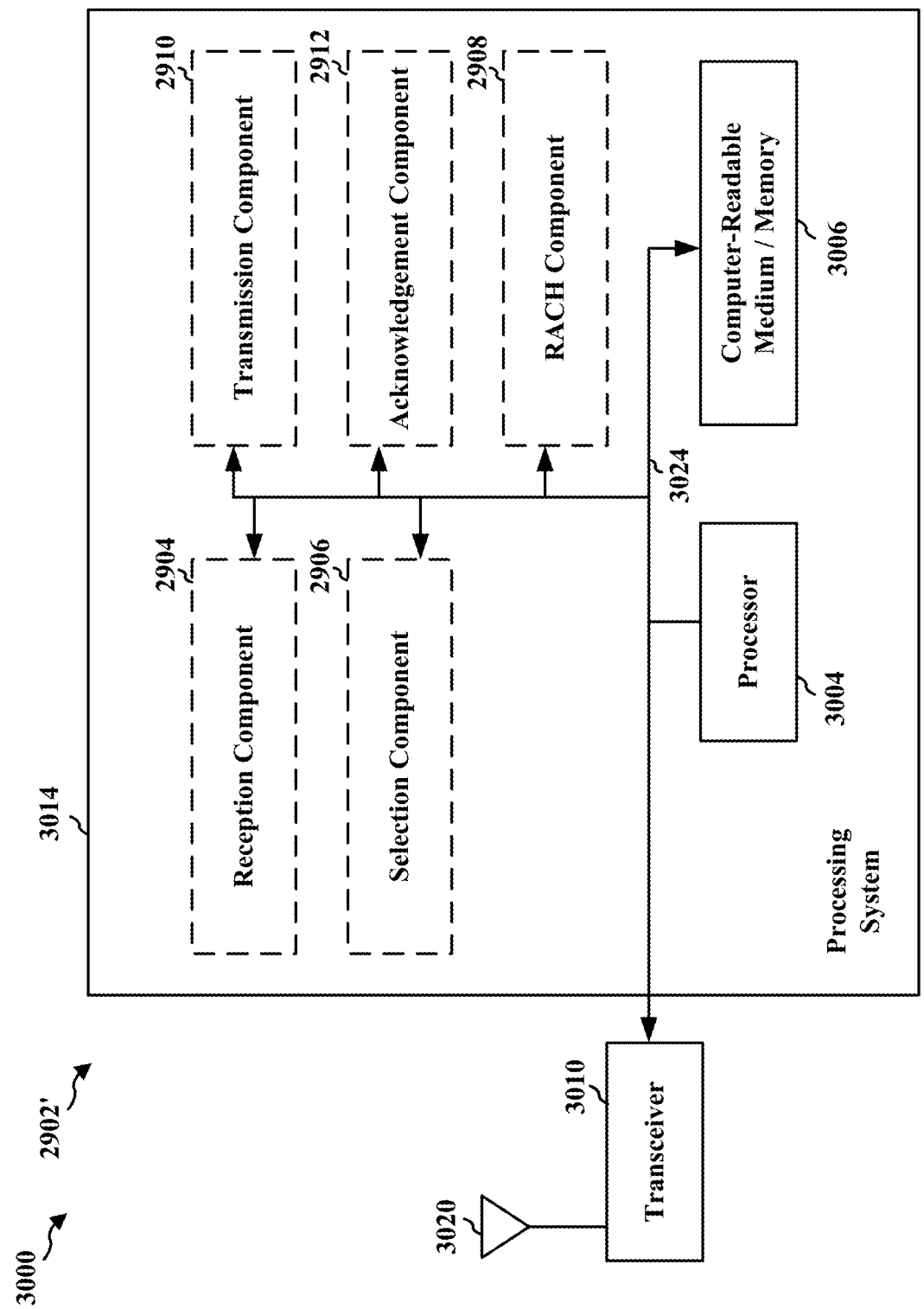
FIG. 30 is a diagram illustrating an example of a hardware implementation for an apparatus employing a processing system.

FIG. 30 is a diagram 3000 illustrating an example of a hardware implementation for an apparatus 2902' employing a processing system 3014. The processing system 3014 may be implemented with a bus architecture, represented generally by the bus 3024. The bus 3024 may include any number of interconnecting buses and bridges depending on the specific application of the processing system 3014 and the overall design constraints. The bus 3024 links together various circuits including one or more processors and/or hardware components, represented by the processor 3004, the components 2904, 2906, 2908, 2910, 2912 and the computer-readable medium/memory 3006. The bus 3024 may also link various other circuits such as timing sources, peripherals, voltage regulators, and power management circuits, which are well known in the art, and therefore, will not be described any further.

The processing system 3014 may be coupled to a transceiver 3010. The transceiver 3010 is coupled to one or more antennas 3020. The transceiver 3010 provides a means for communicating with various other apparatus over a transmission medium. The transceiver 3010 receives a signal from the one or more antennas 3020, extracts information from the received signal, and provides the extracted information to the processing system 3014, specifically the reception component 2904. In addition, the transceiver 3010 receives information from the processing system 3014, specifically the transmission component 2910, and based on the received information, generates a signal to be applied to the one or more antennas 3020. The processing system 3014 includes a processor 3004 coupled to a computer-readable medium/memory 3006. The processor 3004 is responsible for general processing, including the execution of software stored on the computer-readable medium/memory 3006. The software, when executed by the processor 3004, causes the processing system 3014 to perform the various functions described supra for any particular apparatus. The computer-readable medium/memory 3006 may also be used for storing data that is manipulated by the processor 3004 when executing software. The processing system 3014 further includes at least one of the components 2904, 2906, 2908, 2910, 2912. The components may be software components running in the processor 3004, resident/stored in the computer readable medium/memory 3006, one or more hardware components coupled to the processor 3004, or some combination thereof. The processing system 3014 may be a component of the base station 310 and may include the memory 376 and/or at least one of the TX processor 316, the RX processor 370, and the controller/processor 375.

In one configuration, the apparatus 2902/2902' for wireless communication includes means for means for transmitting, to a UE, a contention resolution message, the contention resolution message indicating at least a beam index corresponding to a beam and indicating that the beam index is applicable to the UE. The apparatus 2902/2902' may further includes means for determining whether an acknowledgement message is received from the UE in response to the contention resolution message. The apparatus 2902/2902' may further include means for communicating with the UE through the beam corresponding to the beam index when the acknowledgement message is determined to be received from the UE.

In an aspect, the contention resolution message is associated with a random access procedure. In an aspect, the apparatus 2902/2902' may further include means for scrambling at least a portion of the contention resolution message using an RNTI associated the UE. In an aspect, the contention resolution message further includes an indication of one or more channels associated with the beam index, and the communication with the UE through the beam corresponding to the beam index is performed on the one or more indicated channels.

In an aspect, the apparatus 2902/2902' may further include means for communicating with the UE through a serving beam before transmission of the contention resolution message, and the communication with the UE continues through the serving beam based on an absence of an acknowledgement message from the UE.

In an aspect, the apparatus 2902/2902' may further include means for receiving, from the UE, a random access preamble. The apparatus 2902/2902' may further include means for transmitting, to the UE, a random access response based on the random access preamble. The apparatus 2902/2902' may further include means for receiving, from the UE, a connection request message based on the random access response, and the contention resolution message is transmitted based on the connection request message.

The aforementioned means may be one or more of the aforementioned components of the apparatus 2902 and/or the processing system 3014 of the apparatus 2902' configured to perform the functions recited by the aforementioned means. As described supra, the processing system 3014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 31:
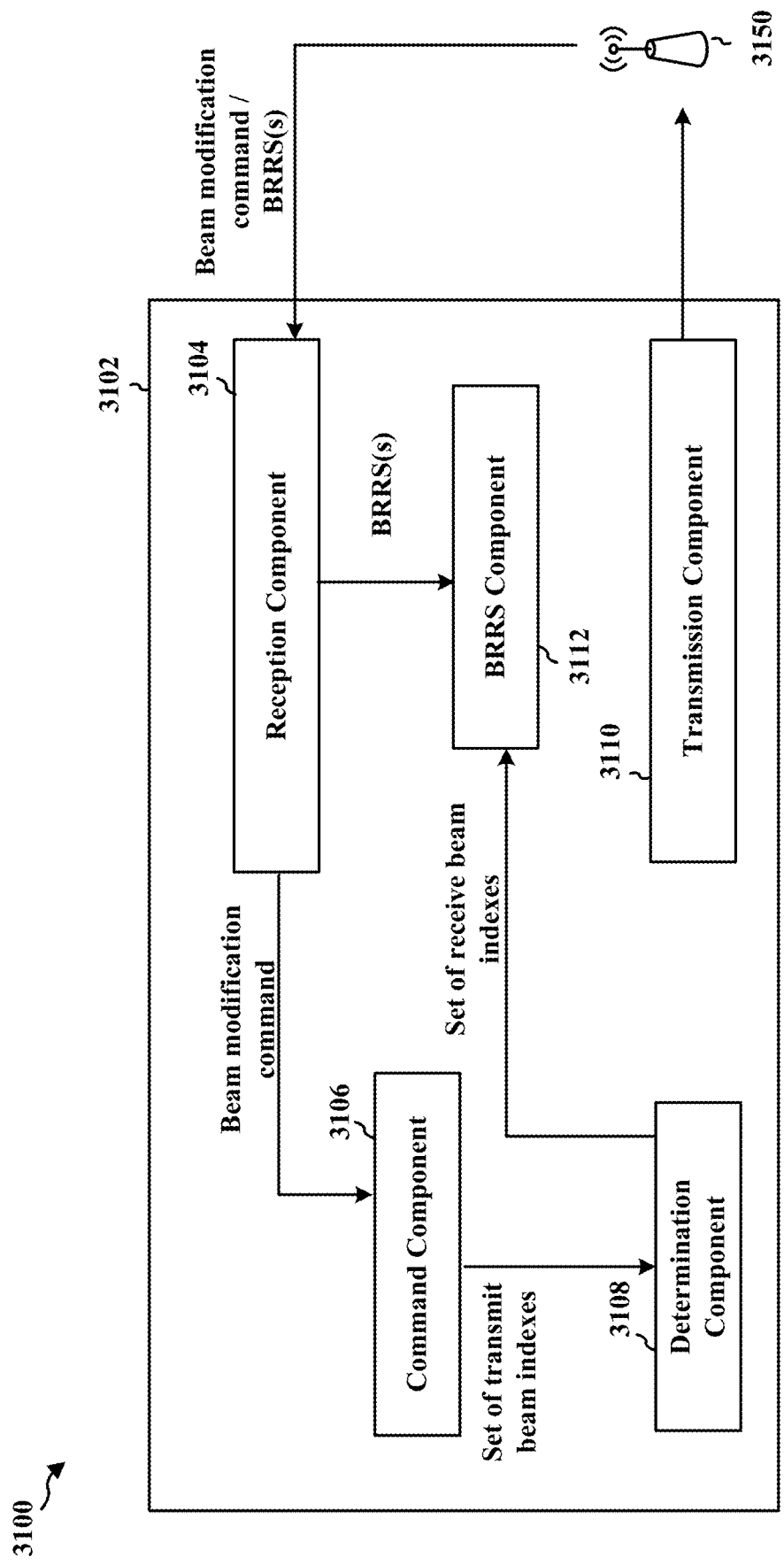
FIG. 31 is a conceptual data flow diagram illustrating the data flow between different means/components in an exemplary apparatus.

FIG. 31 is a conceptual data flow diagram 3100 illustrating the data flow between different means/components in an exemplary apparatus 3102. The apparatus may be a UE. The data flow illustrated in the diagram 3100 is to be regarded as illustrative. Therefore, one or more additional means/components may be present, and one or more illustrated means/components may be absent, according to various aspects. Further, various data flow may occur between means/components in addition to and/or instead of the illustrated data flow.

The apparatus 3102 may include a reception component 3104 configured to receive signals from a base station (e.g., the base station 3150, a mmW base station, an eNB, etc.). The apparatus 3102 may further include a transmission component 3110 configured to transmit signals to a base station (e.g., the base station 3150, a mmW base station, an eNB, etc.).

In aspects, the reception component 3104 may receive, from the base station 3150, a set of signals (e.g., a signal may be an aspect of a BRS) through a set of beams. Each signal of the set of signals may correspond to a beam, and each beam may correspond to a beam index (ergo, each signal may correspond to a beam index). Each signal may be received through a respective beam that may be used for communication between the apparatus 3102 and the base station 3150. The reception component 3104 may provide the set of BRSs to a command component 3106. The command component 3106 may determine transmit beam indexes corresponding to transmit beams of the base station 3150 based on a respective BRS received through a receptive transmit beam. The command component 3106 may provide the transmit beam indexes to a determination component 3108. The determination component 3108 may maintain a mapping of transmit beam indexes to receive beam indexes.

In various aspects, the command component 3106 may receive, through the reception component 3104 from the base station 3150, a beam modification command. The beam modification command may indicate a set of transmit beam indexes corresponding to a set of transmit beams of a base station, and each transmit beam index of the set of transmit beam indexes may indicate at least a transmit direction for transmitting a transmit beam by the base station 3150. The command component 3106 may be configured to determine the set of transmit beam indexes indicated by the beam modification command.

In an aspect, the beam modification command may be received in a MAC CE. In an aspect, the beam modification command may be received in a DCI message. In an aspect, the beam modification command may be received via RRC signaling. In an aspect, the beam modification command may be carried on a PDCCH.

In aspects, the command component 3106 may provide the set of transmit beam indexes to a determination component 3108. The determination component 3108 may determine a set of receive beam indexes corresponding to a set of receive beams of the apparatus 3102 based on the set of transmit beam indexes. Each receive beam index of the set of receive beam indexes indicating at least a receive direction for receiving a beam by the apparatus 3102. In an aspect, the determination component 3108 may determine the set of receive beam indexes by accessing a mapping that maps transmit beam indexes to receive beam indexes. The determination component 3108 and/or the command component 3106 may be configured to populate this mapping.

The determination component 3108 may provide the set of receive beam indexes to a BRRS component 3112. Accordingly, the BRRS component 3112 may cause the reception component 3104 to receive through a receive beam corresponding to a receive beam index included in the set of receive beam indexes, for example, during a symbol in which a BRRS is to be received. In one aspect, the BRRS component 3112 may generate a receive beam corresponding to the at least one receive beam index, for example, when the apparatus 3102 is not actively maintaining that beam.

In one aspect, the BRRS component 3112 may receive the BRRS through the set of transmit beams from the base station 3150 corresponding to the set of transmit beam indexes. In another aspect, the BRRS component 3112 may receive the BRRS through a different set of transmit beam from the base station 3150 than the set of transmit beams corresponding to the transmit beam indexes indicated by the beam modification command. For example, obstruction and/or reflection may cause the apparatus 3102 to receive the BRRS through the determined set of received beams, but through a different set of transmit beams than the set of transmit beams corresponding to the set of transmit beam indexes indicated by the beam modification command.

In one aspect, the BRRS component 3112 may receive the BRRS in one or more symbols corresponding to one or more symbol indexes. For example, the BRRS component 3112 may receive (e.g., listen) through the at least one receive beam corresponding to the at least one receive beam index during one or more symbols corresponding to the one or more symbol indexes. In an aspect, the one or more symbol indexes may be predetermined (e.g., defined by one or more standards promulgated by 3GPP). In another aspect, the one or more symbol indexes may be indicated by the beam modification command (e.g., determined by the command component 3106 and provided to the BRRS component 3112). In one aspect, the beam modification command further indicates a corresponding transmit beam index of the set of transmit beam indexes for each symbol of the one or more symbol indexes.

In an aspect, the BRRS component 3112 may receive a first portion of the BRRS in a first set of symbols through a first receive beam corresponding to a first receive beam index included in the determined set of receive beam indexes. The BRRS component 3112 may receive a second portion of the BRRS in a second set of symbols through a second receive beam corresponding to a second receive beam index included in the determined set of receive beam indexes.

In one aspect, the BRRS component 3112 may generate a BRI report based on one or more received BRRSs. In an aspect, the BRI report may be similar to a BSI report, but may be used by the base station 3150 to determine a best fine beam. The BRRS component 3112 may transmit a BRI report to index a transmit beam index that is best (e.g., has a highest signal quality or power based on a received BRRS).

The apparatus may include additional components that perform each of the blocks of the algorithm in the aforementioned flowcharts of FIG. 18. As such, each block in the aforementioned flowcharts of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 32:
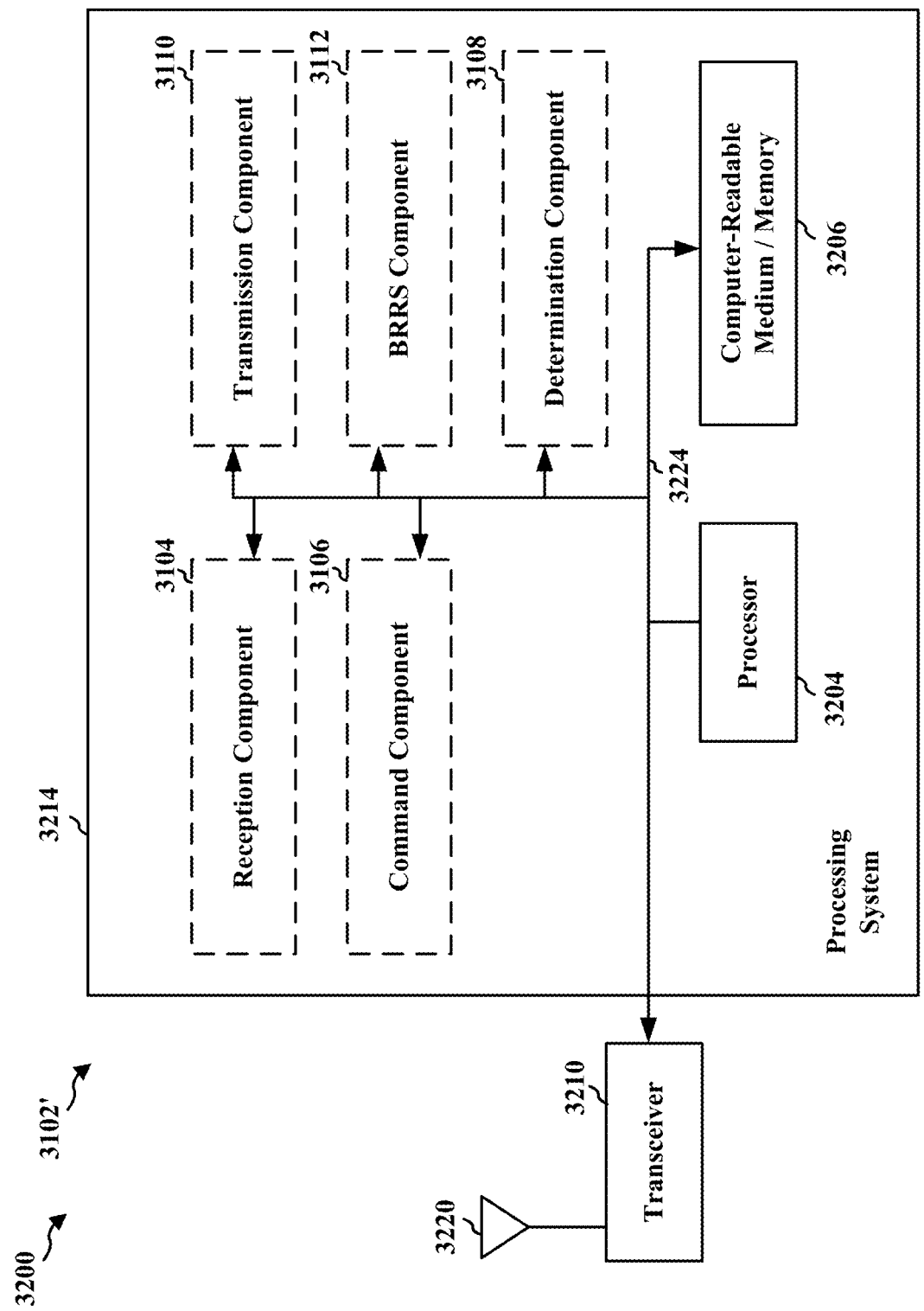
FIG. 32 is a diagram illustrating an example of a hardware implementation for an apparatus employing a processing system.

FIG. 32 is a diagram 3200 illustrating an example of a hardware implementation for an apparatus 3102' employing a processing system 3214. The processing system 3214 may be implemented with a bus architecture, represented generally by the bus 3224. The bus 3224 may include any number of interconnecting buses and bridges depending on the specific application of the processing system 3214 and the overall design constraints. The bus 3224 links together various circuits including one or more processors and/or hardware components, represented by the processor 3204, the components 3104, 3106, 3108, 3110, 3112 and the computer-readable medium/memory 3206. The bus 3224 may also link various other circuits such as timing sources, peripherals, voltage regulators, and power management circuits, which are well known in the art, and therefore, will not be described any further.

The processing system 3214 may be coupled to a transceiver 3210. The transceiver 3210 is coupled to one or more antennas 3220. The transceiver 3210 provides a means for communicating with various other apparatus over a transmission medium. The transceiver 3210 receives a signal from the one or more antennas 3220, extracts information from the received signal, and provides the extracted information to the processing system 3214, specifically the reception component 3104. In addition, the transceiver 3210 receives information from the processing system 3214, specifically the transmission component 3110, and based on the received information, generates a signal to be applied to the one or more antennas 3220. The processing system 3214 includes a processor 3204 coupled to a computer-readable medium/memory 3206. The processor 3204 is responsible for general processing, including the execution of software stored on the computer-readable medium/memory 3206. The software, when executed by the processor 3204, causes the processing system 3214 to perform the various functions described supra for any particular apparatus. The computer-readable medium/memory 3206 may also be used for storing data that is manipulated by the processor 3204 when executing software. The processing system 3214 further includes at least one of the components 3104, 3106, 3108, 3110, 3112. The components may be software components running in the processor 3204, resident/stored in the computer readable medium/memory 3206, one or more hardware components coupled to the processor 3204, or some combination thereof. The processing system 3214 may be a component of the UE 350 and may include the memory 360 and/or at least one of the TX processor 368, the RX processor 356, and the controller/processor 359.

In one configuration, the apparatus 3102/3102' for wireless communication includes means for receiving a beam modification command that indicates a set of transmit beam indexes corresponding to a set of transmit beams of a base station, and each transmit beam index of the set of transmit beam indexes may indicate at least a transmit direction for transmitting a transmit beam by the base station. The apparatus 3102/3102' may include means for determining a set of receive beam indexes corresponding to receive beams of the apparatus based on the set of transmit beam indexes, each receive beam index of the set of receive beam indexes indicating at least a receive direction for receiving a receive beam by the apparatus 3102/3102'. The apparatus 3102/3102' may further include means for receiving, from the base station, a BRRS through at least one receive beam corresponding to at least one receive beam index included in the set of receive beam indexes.

In an aspect, the means for receiving, from the base station, the BRRS through the at least one receive beam corresponding to the at least one receive beam index included in the set of receive beam indexes is configured to receive a first portion of the BRRS in a first set of symbols through a first receive beam corresponding to a first receive beam index included in the set of receive beam indexes, and further configured to receive a second portion of the BRRS in a second set of symbols through a second receive beam corresponding to a second receive beam index included in the set of receive beam indexes.

In an aspect, the BRRS is received in one or more symbols corresponding to one or more symbol indexes. In an aspect, the beam modification command indicates the one or more symbol indexes, and a corresponding transmit beam index of the set of transmit beam indexes for each symbol index of the one or more symbol indexes. In an aspect, the one or more symbol indexes in which the BRRS is received are predetermined. In an aspect, the BRRS is received through the set of transmit beams from the base station corresponding to the set of transmit beam indexes. In an aspect, the BRRS is received through a different set of transmit beams from the base station than the set of transmit beams corresponding to the set of transmit beam indexes, the different set of transmit beams corresponding to a second set of transmit beam indexes different from the set of transmit beam indexes.

In an aspect, the beam modification command is received in a MAC CE. In an aspect, the beam modification command is received in a DCI message. In an aspect, the beam modification command is received via RRC signaling. In an aspect, beam modification command is carried on a PDCCH.

The aforementioned means may be one or more of the aforementioned components of the apparatus 3102 and/or the processing system 3214 of the apparatus 3102' configured to perform the functions recited by the aforementioned means. As described supra, the processing system 3214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at Least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
    receiving, after receiving a random access response for a random access channel (RACH) procedure with a base station, a contention resolution message for the RACH procedure, the contention resolution message including information indicating at least a beam index corresponding to a beam;
    determining whether the beam index is applicable to the UE; and
    communicating with the base station through the beam corresponding to the beam index when the beam index is applicable to the UE.

2. The method of claim 1, further comprising:
    transmitting, to the base station, an acknowledgement message when the beam index is determined to be applicable to the UE.

3. The method of claim 1, wherein the contention resolution message is associated with a random access procedure.

4. The method of claim 1, wherein the determining whether the beam index is applicable to the UE comprises:
attempting to decode the contention resolution message based on a radio network temporary identifier (RNTI) associated with the UE,
wherein the beam index is determined to be applicable to the UE when the contention resolution message is successfully decoded.

5. The method of claim 1, further comprising:
refraining from transmitting a non-acknowledgement message to the base station when the beam index is determined to be inapplicable to the UE or if the contention resolution message is unsuccessfully decoded.

6. The method of claim 1, wherein the contention resolution message further includes an indication of one or more channels associated with the beam index, and the communication with the base station through the beam corresponding to the beam index is performed on the one or more indicated channels.

7. The method of claim 1, further comprising:
transmitting, to the base station, a random access preamble;
receiving, from the base station, the random access response based on the random access preamble; and
transmitting, to the base station, a connection request message based on the random access response,
wherein the contention resolution message is received based on the connection request message.

8. A method of wireless communication by a base station, comprising:
transmitting, after transmitting a random access response for a random access channel (RACH) procedure with a user equipment (UE), a contention resolution message for the RACH procedure, the contention resolution message including information indicating at least a beam index corresponding to a beam and the contention resolution message indicating that the beam index is applicable to the UE;
determining whether an acknowledgement message is received from the UE in response to the contention resolution message; and
communicating with the UE through the beam corresponding to the beam index when the acknowledgement message is determined to be received from the UE.

9. The method of claim 8, wherein the contention resolution message is associated with a random access procedure.

10. The method of claim 9, further comprising:
scrambling at least a portion of the contention resolution message using a radio network temporary identifier (RNTI) associated the UE.

11. The method of claim 8, wherein the contention resolution message further includes an indication of one or more channels associated with the beam index, and the communication with the UE through the beam corresponding to the beam index is performed on the one or more indicated channels.

12. The method of claim 8, further comprising:
communicating with the UE through a serving beam before transmission of the contention resolution message,
wherein the communication with the UE continues through the serving beam based on an absence of an acknowledgement message from the UE.

13. The method of claim 8, further comprising:
receiving, from the UE, a random access preamble;
transmitting, to the UE, the random access response based on the random access preamble; and
receiving, from the UE, a connection request message based on the random access response,
wherein the contention resolution message is transmitted based on the connection request message.

14. An apparatus for wireless communication, the apparatus comprising:
means for receiving, after receiving a random access response for a random access channel (RACH) procedure with a base station, a contention resolution message for the RACH procedure, the contention resolution message including information indicating at least a beam index corresponding to a beam;
means for determining whether the beam index is applicable to the apparatus; and
means for communicating with the base station through the beam corresponding to the beam index when the beam index is applicable to the apparatus.

15. The apparatus of claim 14, further comprising:
means for transmitting, to the base station, an acknowledgement message when the beam index is determined to be applicable to the apparatus.

16. The apparatus of claim 14, wherein the contention resolution message is associated with a random access procedure.

17. The apparatus of claim 14, wherein the means for determining whether the beam index is applicable to the apparatus is configured to:
attempt to decode the contention resolution message based on a radio network temporary identifier (RNTI) associated with the apparatus,
wherein the beam index is determined to be applicable to the apparatus when the contention resolution message is successfully decoded.

18. The apparatus of claim 14, further comprising:
means for refraining from transmitting a non-acknowledgement message to the base station when the beam index is determined to be inapplicable to the apparatus or if the contention resolution message is unsuccessfully decoded.

19. The apparatus of claim 14, wherein the contention resolution message further includes an indication of one or more channels associated with the beam index, and the communication with the base station through the beam corresponding to the beam index is performed on the one or more indicated channels.

20. The apparatus of claim 14, further comprising:
means for transmitting, to the base station, a random access preamble;
means for receiving, from the base station, the random access response based on the random access preamble; and
means for transmitting, to the base station, a connection request message based on the random access response,
wherein the contention resolution message is received based on the connection request message.

21. An apparatus for wireless communication, the apparatus comprising:
means for transmitting, after transmitting a random access response for a random access channel (RACH) procedure with a user equipment (UE), a contention resolution message for the RACH procedure, the contention resolution message including information indicating at least a beam index corresponding to a beam and the contention resolution message indicating that the beam index is applicable to the UE;

means for determining whether an acknowledgement message is received from the UE in response to the contention resolution message; and means for communicating with the UE through the beam corresponding to the beam index when the acknowledgement message is determined to be received from the UE.

22. The apparatus of claim 21, wherein the contention resolution message is associated with a random access procedure.

23. The apparatus of claim 22, further comprising:

means for scrambling at least a portion of the contention resolution message using a radio network temporary identifier (RNTI) associated the UE.

24. The apparatus of claim 21, wherein the contention resolution message further includes an indication of one or more channels associated with the beam index, and the communication with the UE through the beam corresponding to the beam index is performed on the one or more indicated channels.

25. The apparatus of claim 21, further comprising:

means for communicating with the UE through a serving beam before transmission of the contention resolution message, wherein the communication with the UE continues through the serving beam based on an absence of an acknowledgement message from the UE.

26. The apparatus of claim 21, further comprising:

means for receiving, from the UE, a random access preamble;

means for transmitting, to the UE, the random access response based on the random access preamble; and means for receiving, from the UE, a connection request message based on the random access response, wherein the contention resolution message is transmitted based on the connection request message.

27. An apparatus for wireless communication, the apparatus comprising:

a memory; and at least one processor coupled to the memory and configured to:

receive, after reception of a random access response for a random access channel (RACH) procedure with a base station, a contention resolution message for the RACH procedure, the contention resolution message including information indicating at least a beam index corresponding to a beam;

determine whether the beam index is applicable to the apparatus; and communicating with the base station through the beam corresponding to the beam index when the beam index is applicable to the apparatus.

28. The apparatus of claim 27, wherein the at least one processor is further configured to:

transmit, to the base station, an acknowledgement message when the beam index is determined to be applicable to the apparatus.

29. An apparatus for wireless communication, the apparatus comprising:

a memory; and at least one processor coupled to the memory and configured to:

transmit, after transmission of a random access response for a random access channel (RACH) procedure with a user equipment (UE), a contention resolution message for the RACH procedure, the contention resolution message including information indicating at least a beam index corresponding to a beam and the contention resolution message indicating that the beam index is applicable to the UE;

determine whether an acknowledgement message is received from the UE in response to the contention resolution message; and communicate with the UE through the beam corresponding to the beam index when the acknowledgement message is determined to be received from the UE.

\* \* \* \* \*